Dec. 31, 1940.    J. B. RETALLACK    2,227,380
ROUTINE TESTING CIRCUIT
Filed Aug. 18, 1939    18 Sheets-Sheet 1

INVENTOR
J. B. RETALLACK
BY
P. C. Smith
ATTORNEY

Dec. 31, 1940.   J. B. RETALLACK   2,227,380
ROUTINE TESTING CIRCUIT
Filed Aug. 18, 1939   18 Sheets-Sheet 6

INVENTOR
J. B. RETALLACK
BY
P. C. Smith
ATTORNEY

Dec. 31, 1940.   J. B. RETALLACK   2,227,380
ROUTINE TESTING CIRCUIT
Filed Aug. 18, 1939   18 Sheets-Sheet 8

INVENTOR
J.B. RETALLACK
BY
P. C. Smith
ATTORNEY

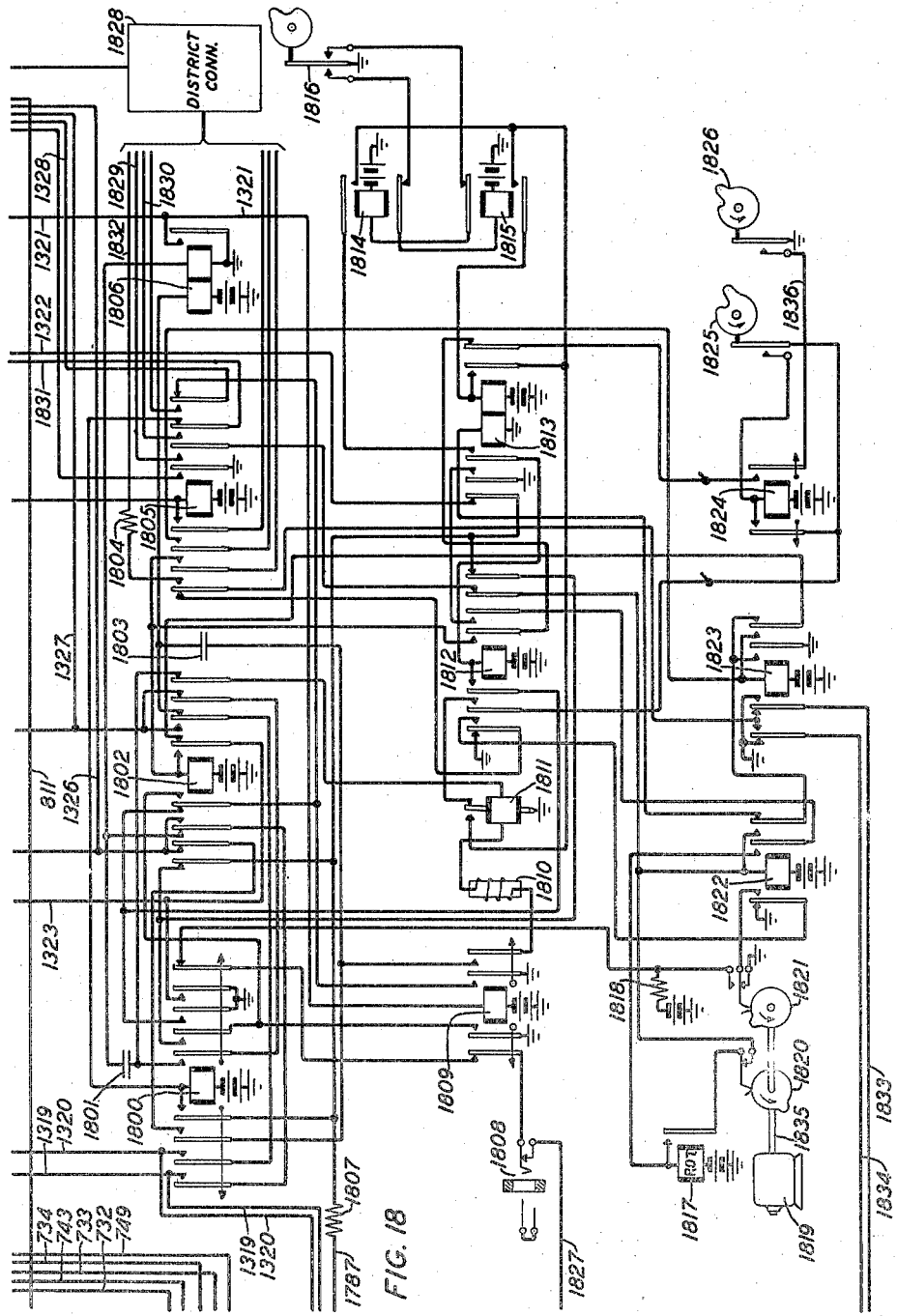

Patented Dec. 31, 1940

2,227,380

UNITED STATES PATENT OFFICE 2,227,380

ROUTINE TESTING CIRCUIT

John B. Retallack, Maplewood, N. J., assignor to Bell Telephone Laboratories, Incorporated, New York, N. Y., a corporation of New York Application August 18, 1939, Serial No. 290,764

15 Claims. (Cl. 179—175.2)

This invention relates to automatic telephone systems and has for its object to maintain the efficiency thereof by providing test equipment which causes the automatic apparatus to function as in service and reacts thereto to detect faults in such functions.

More specifically, originating telephonic connections in the cross-bar system are extended through district junctors which control the connection in the originating office. They vary in accordance with the manner in which calls are to be charged, being associable with different charging means and controlling the charging means in a variety of ways.

Testing systems have been designed heretofore for testing similar circuits in the panel system. The present invention is concerned with tests particularly applicable to the cross-bar system.

In accordance with the present invention, the test circuit is associated with the junctors to be tested over a set of cross-bar switches and means is provided for progressively operating the crosspoints of the switches, together with means for insuring the release of one junctor before the next junctor is seized.

The district junctors maintain a busy condition as long as the junctors are in use and in accordance with the present invention the test circuit maintains a continuous test for this busy condition while testing other features of the junctor, as well as testing for its absence before starting tests. In a similar manner, district junctors associable with lines having message registers, maintain a guarding condition on the charging circuit except when the circuit is in use, and the test circuit also makes a continuous test for this guarding condition.

Charge current must be applied for a minimum length of time in order to insure the operation of the register or coin box. The test circuit of the present invention tests for a sufficient duration of charge current and varies the action of the timing means in accordance with the type of junctor being tested.

Figure 1:
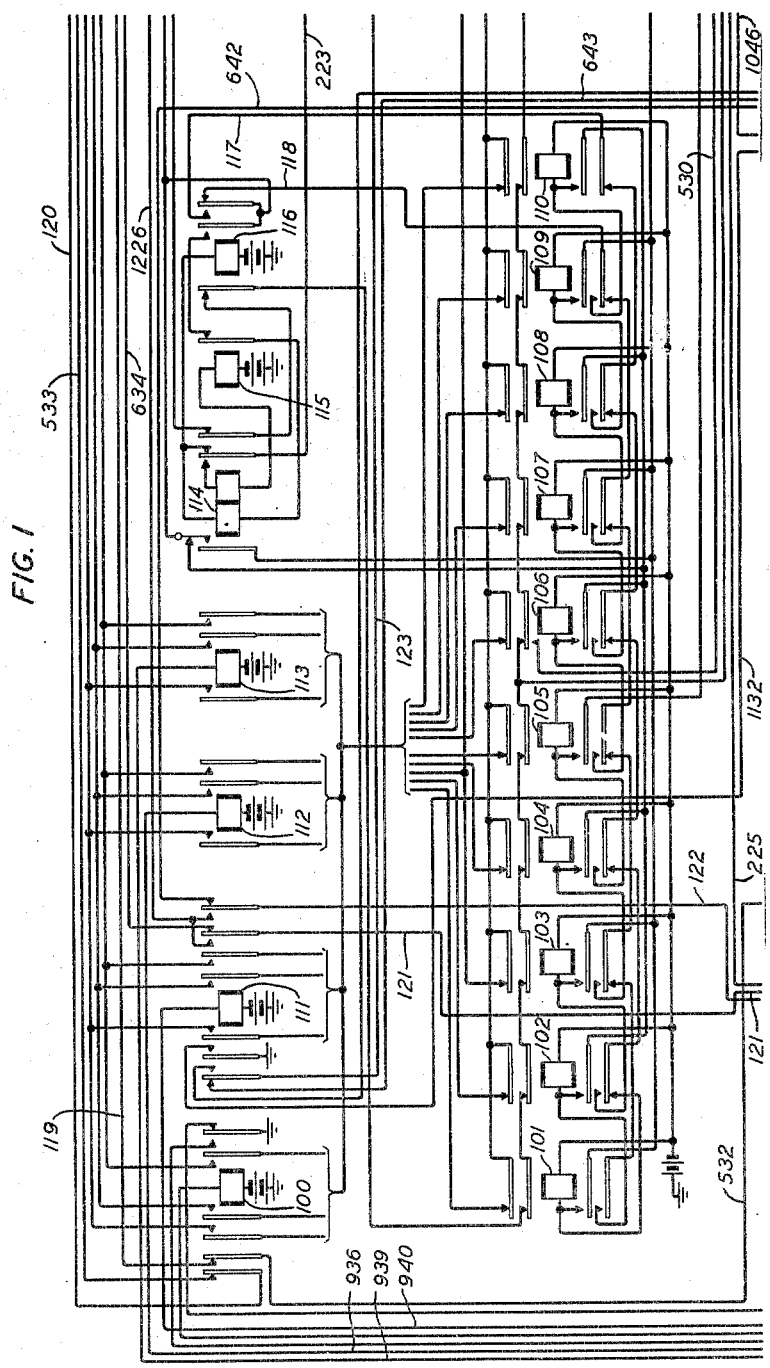
Figure 2:
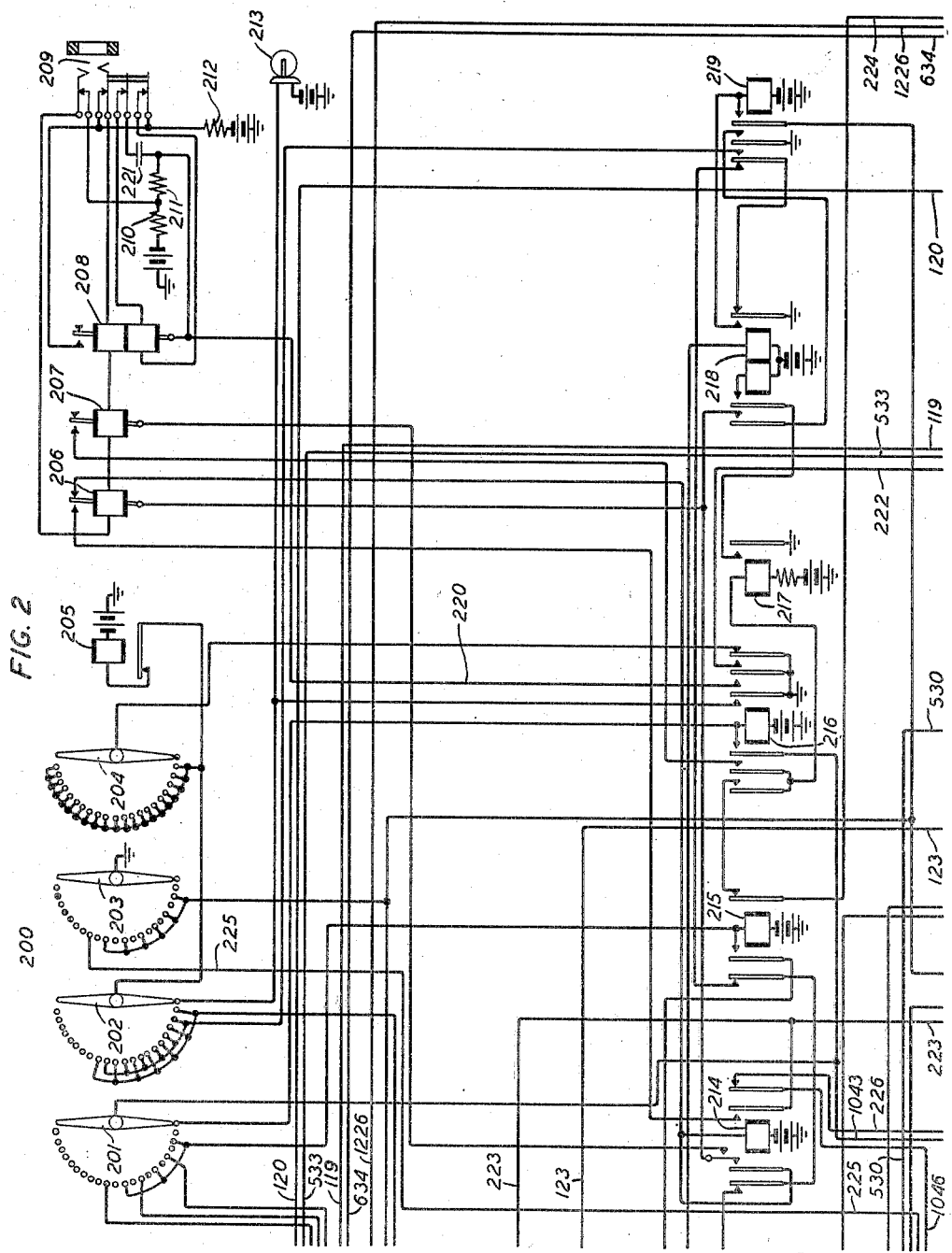
Figure 3:
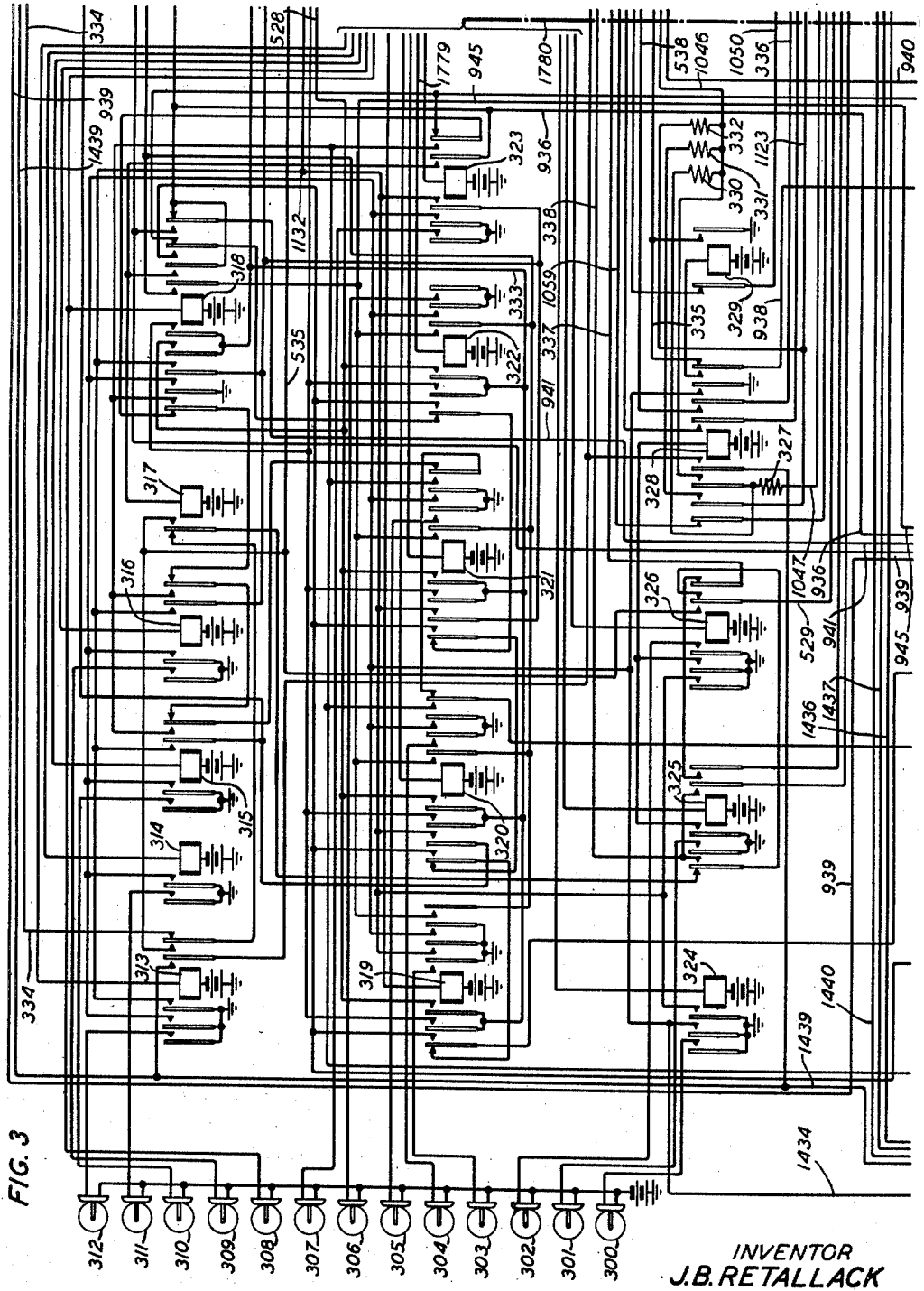
Figure 4:
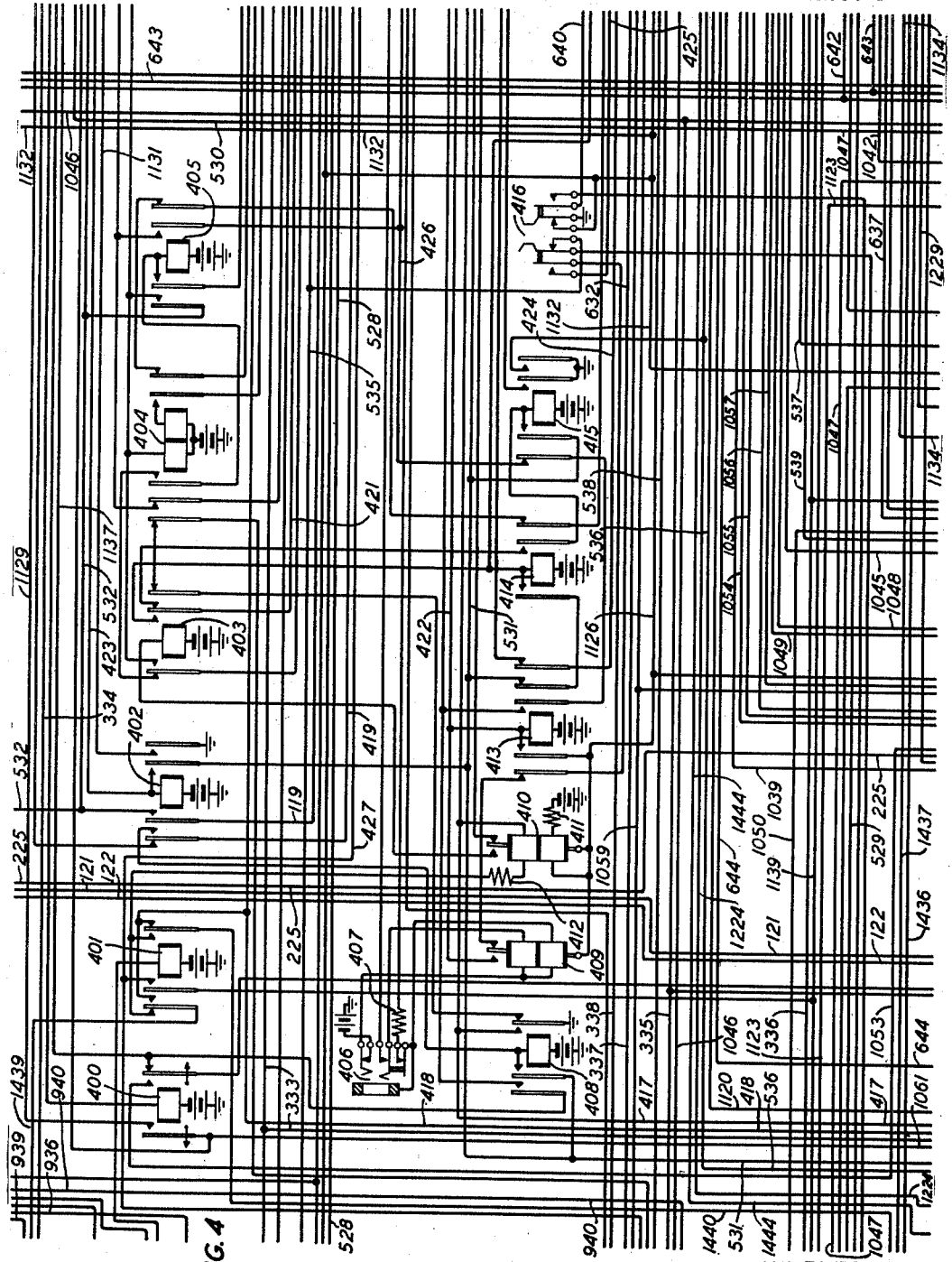
Figure 5:
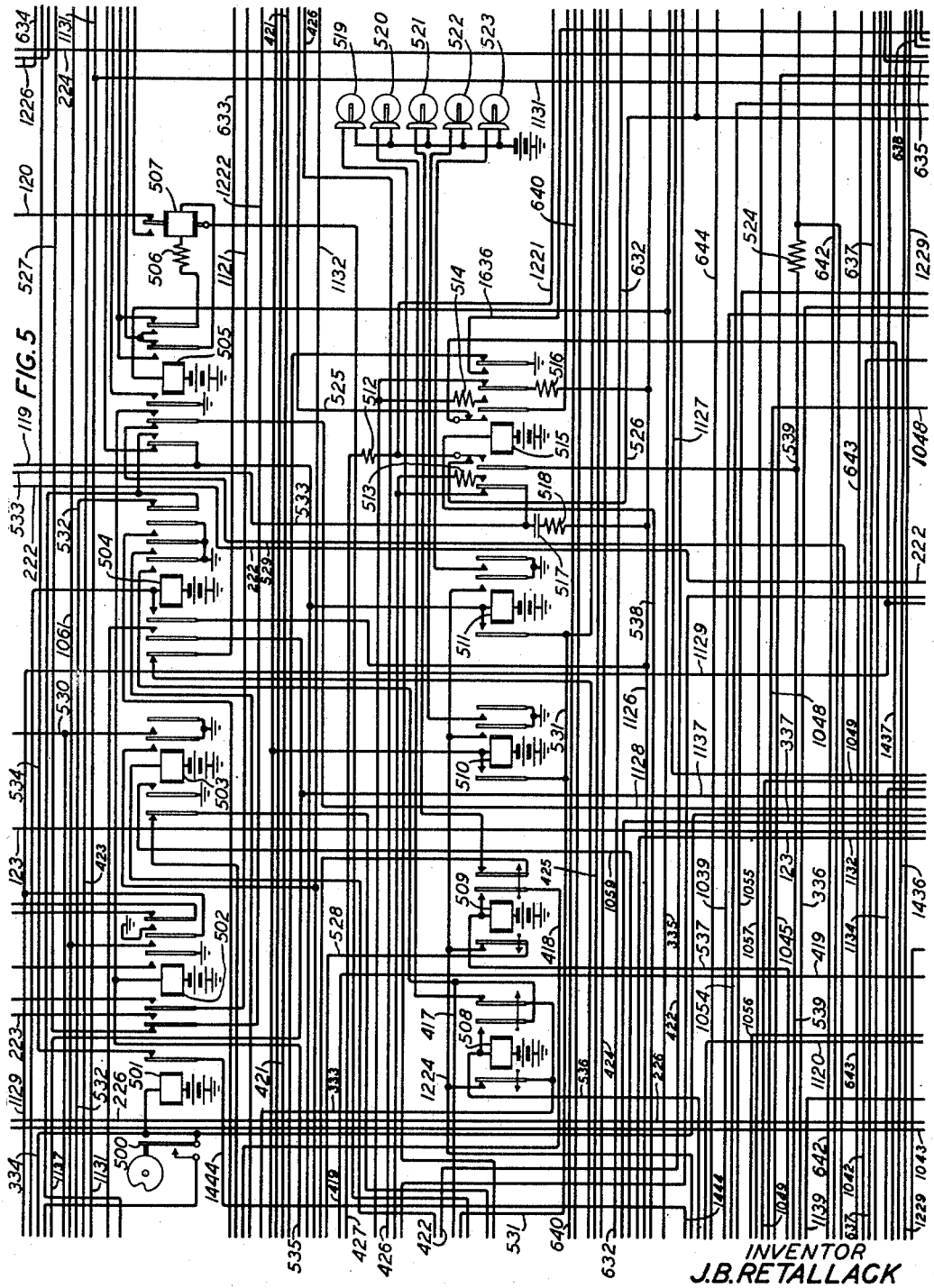
Figure 6:
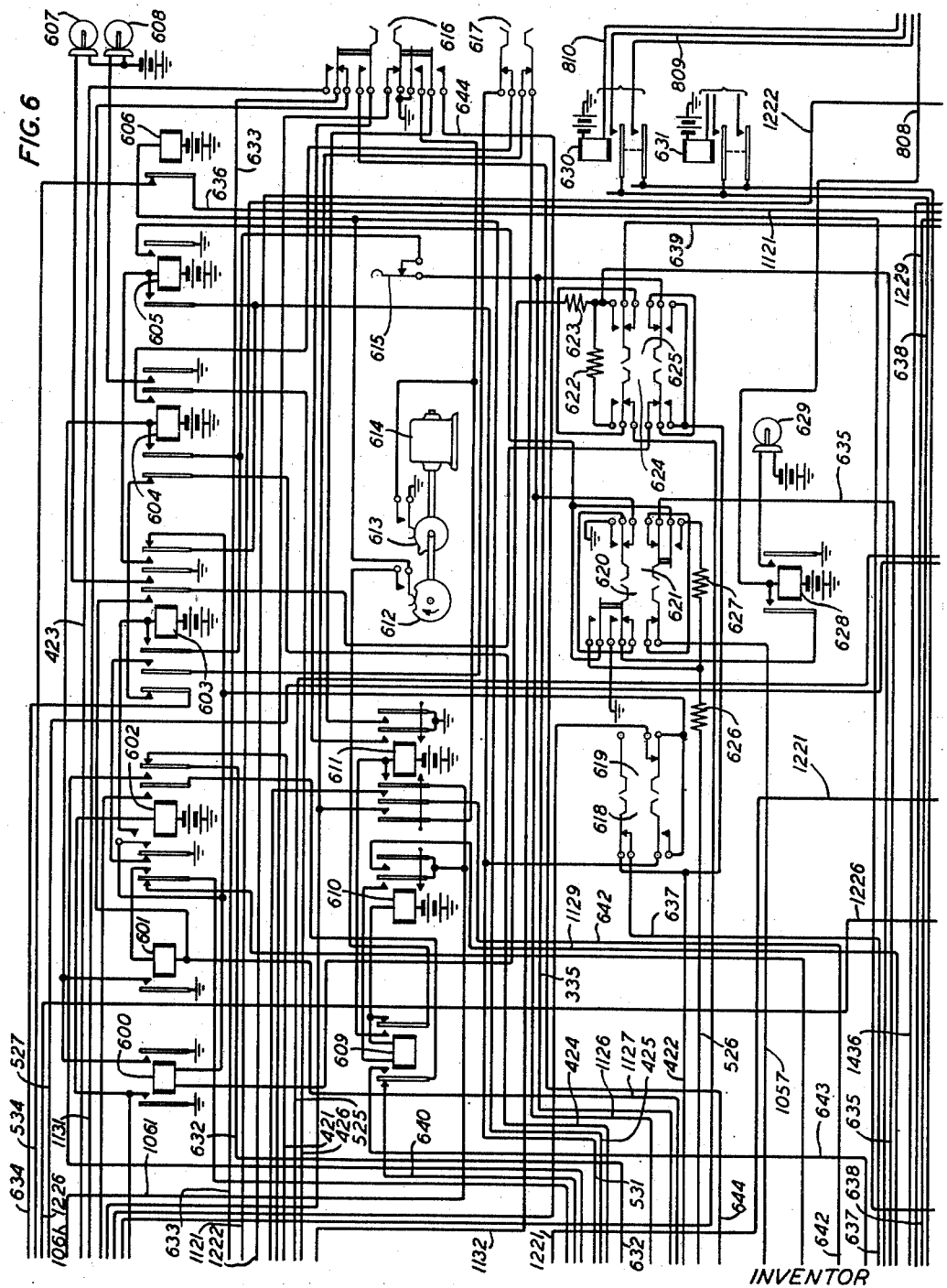
Figure 7:
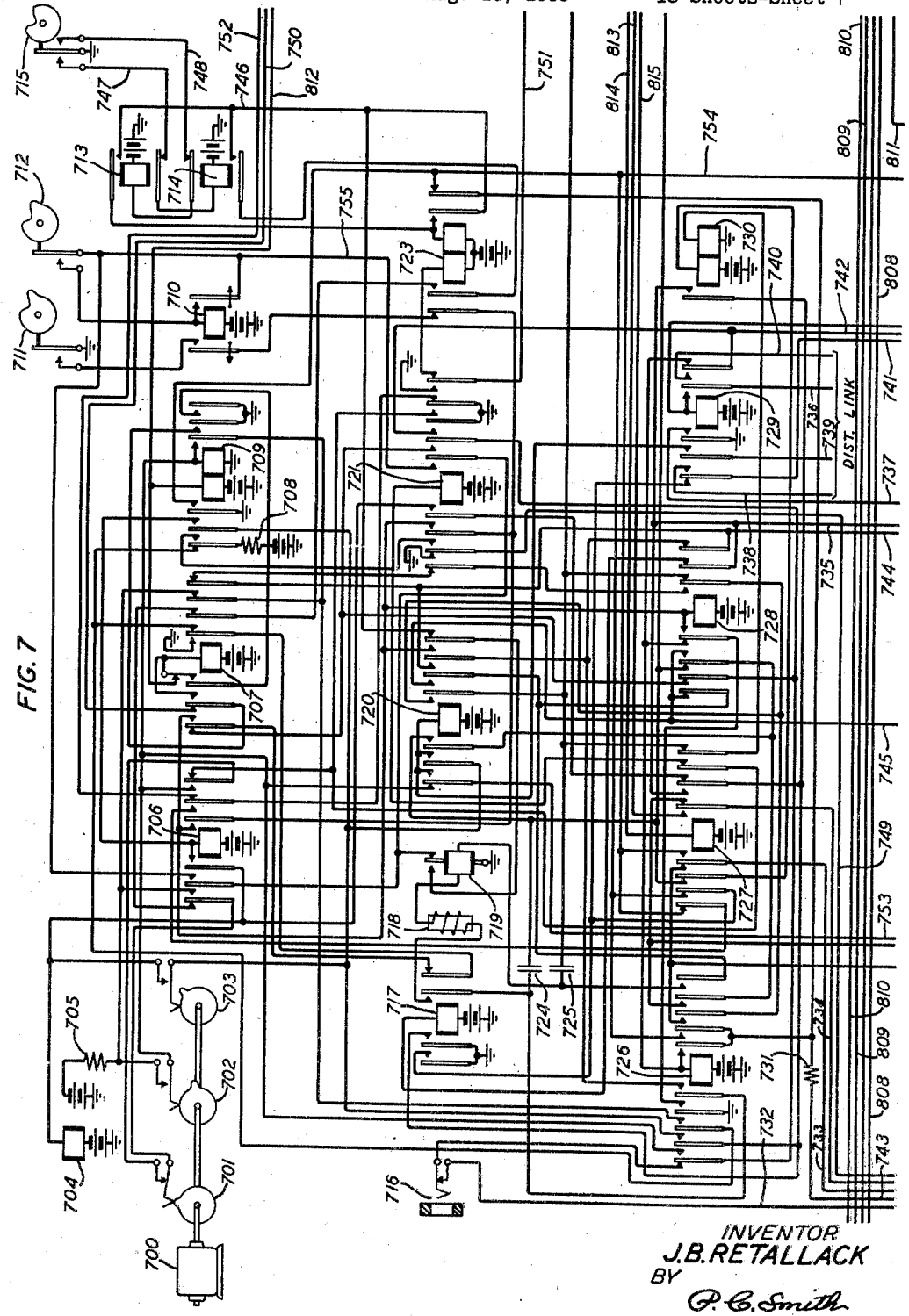
Figure 8:
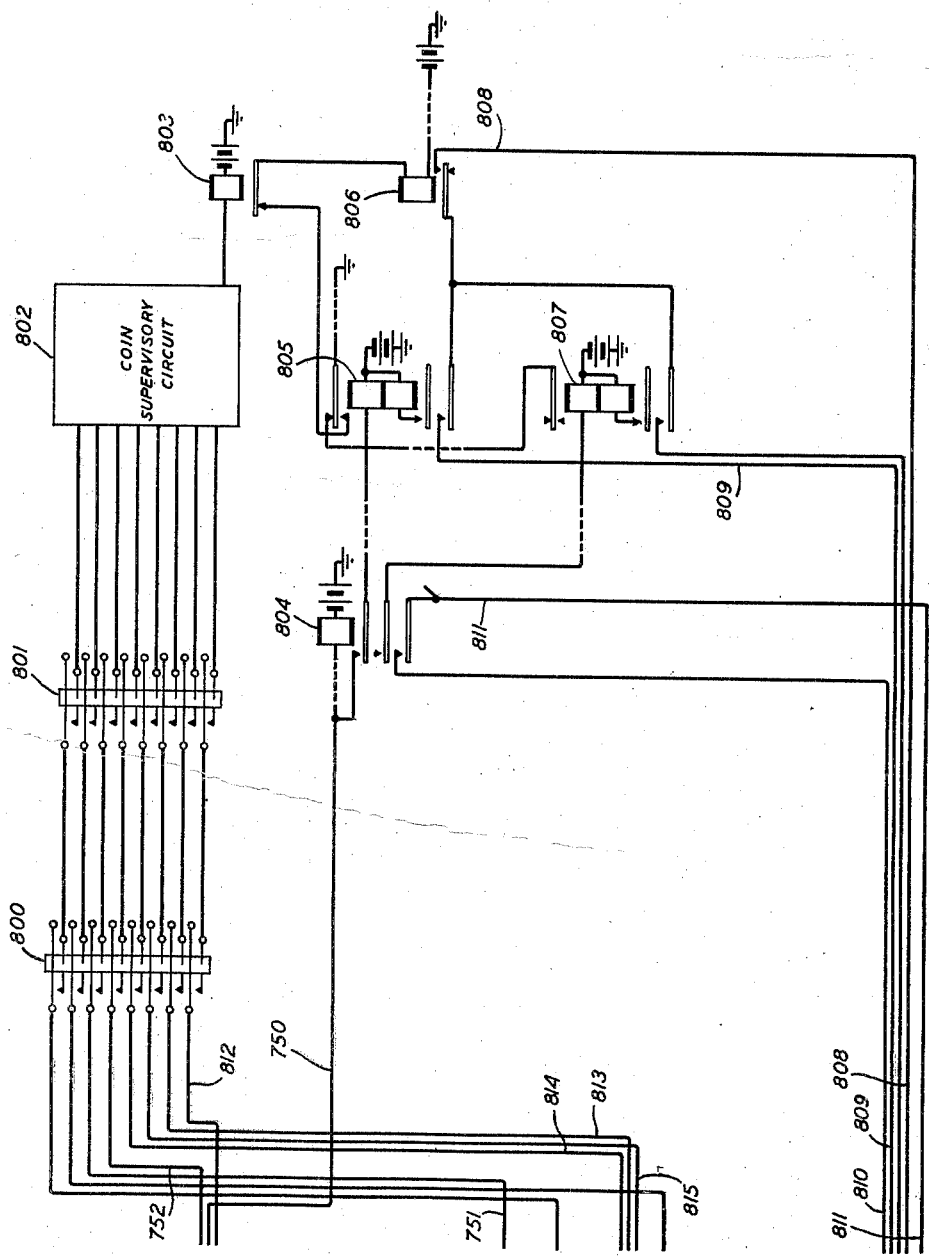
Figure 9:
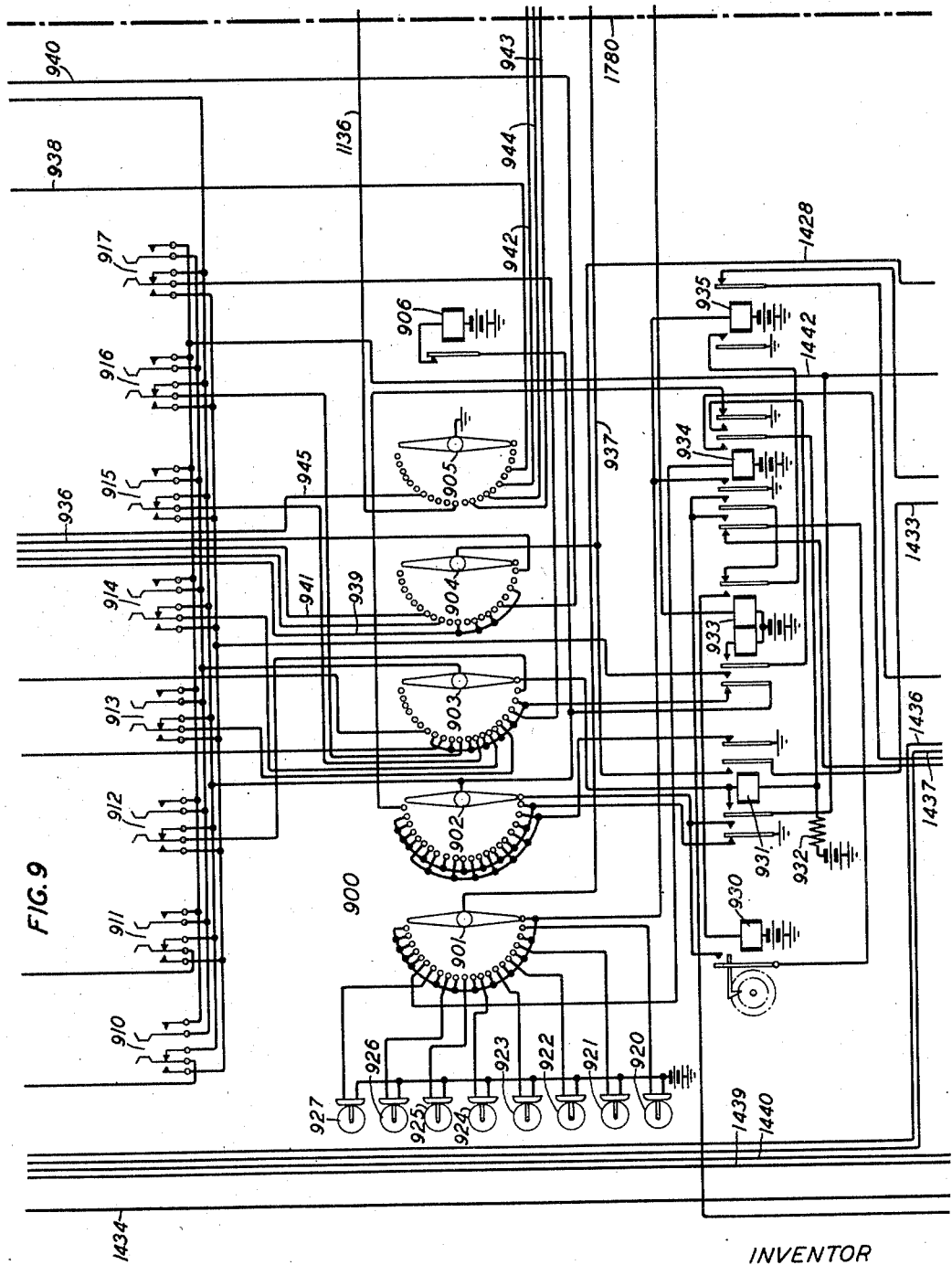
Figure 10:
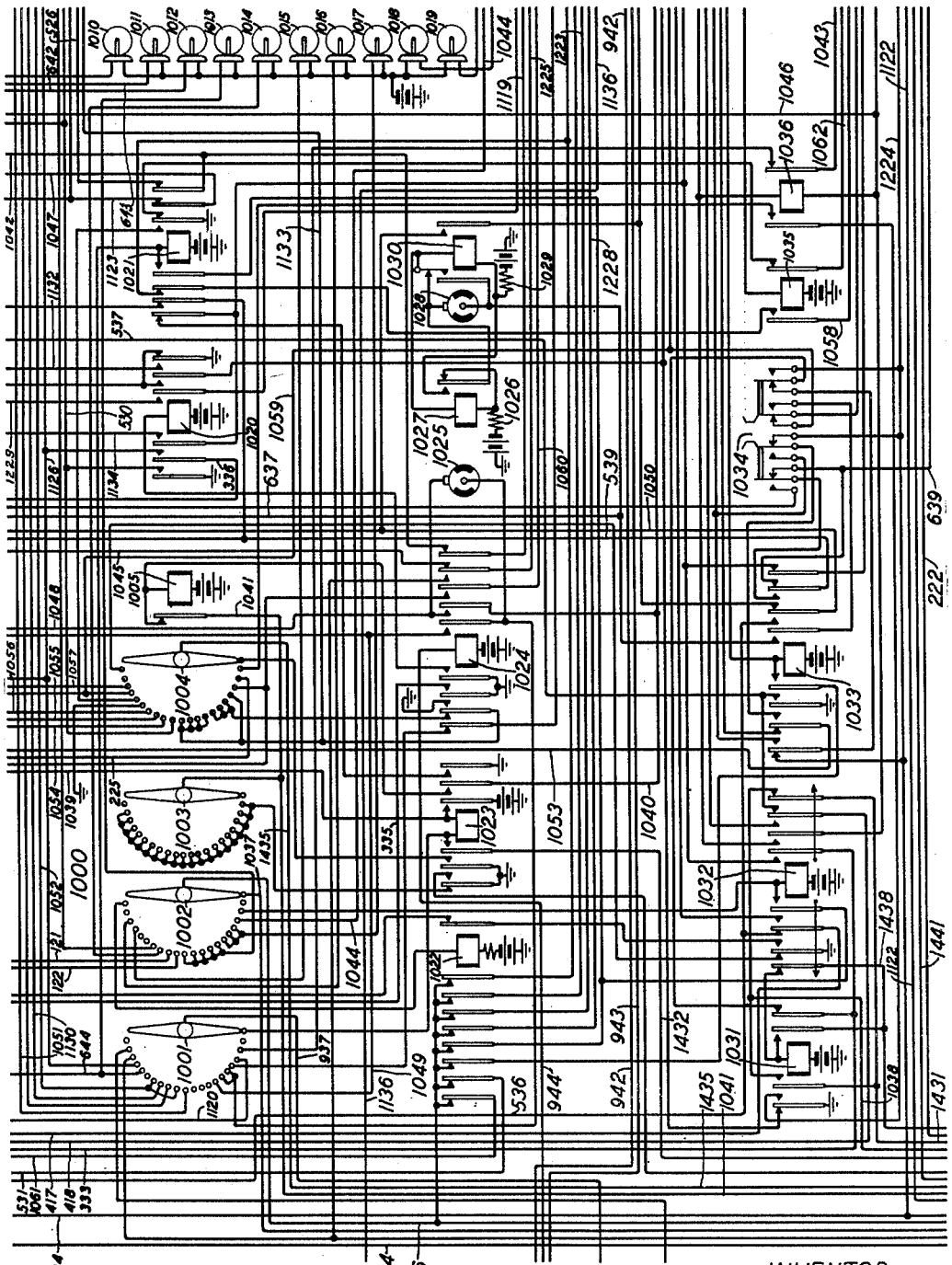
Figure 11:
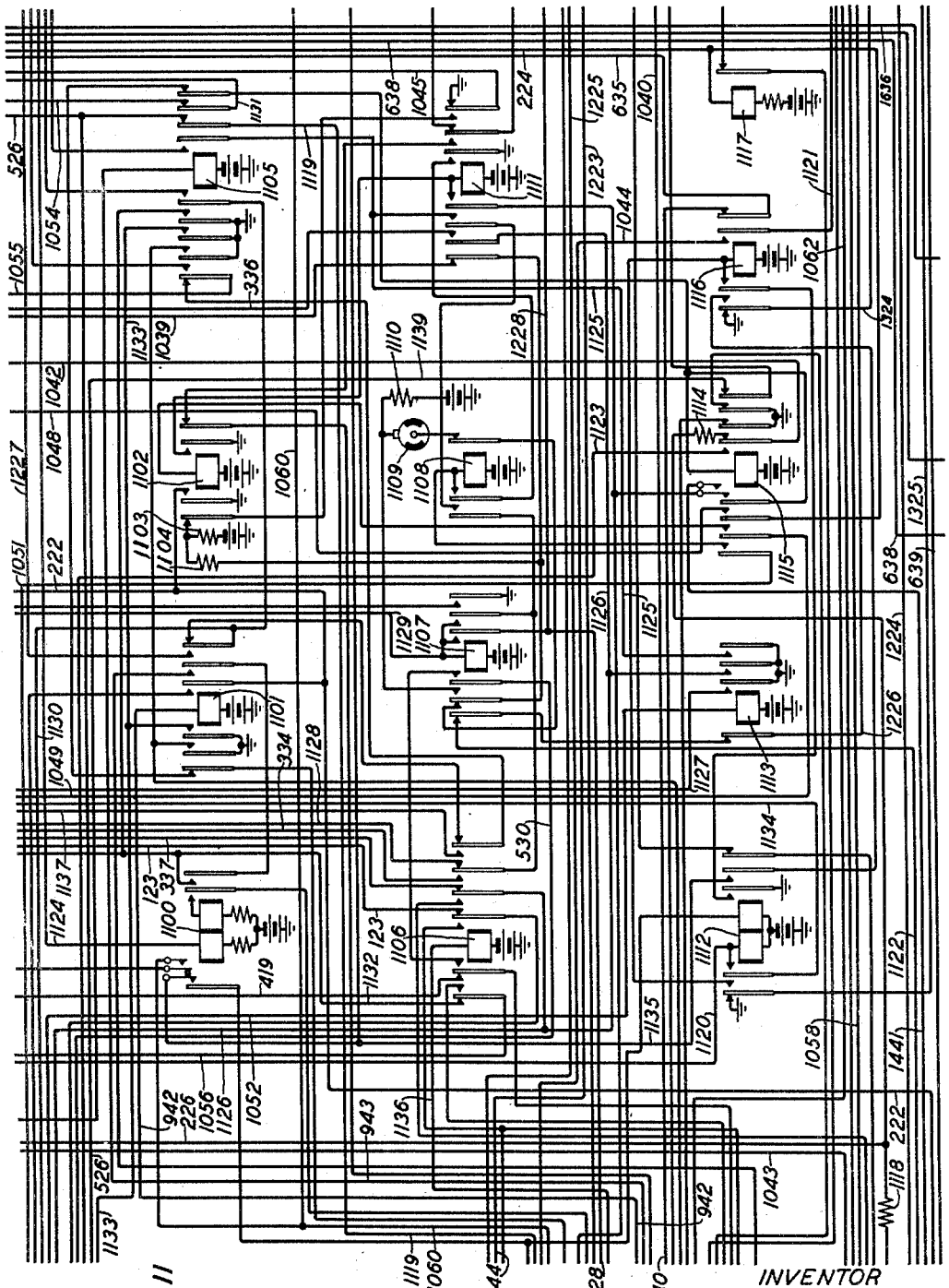
Figure 12:
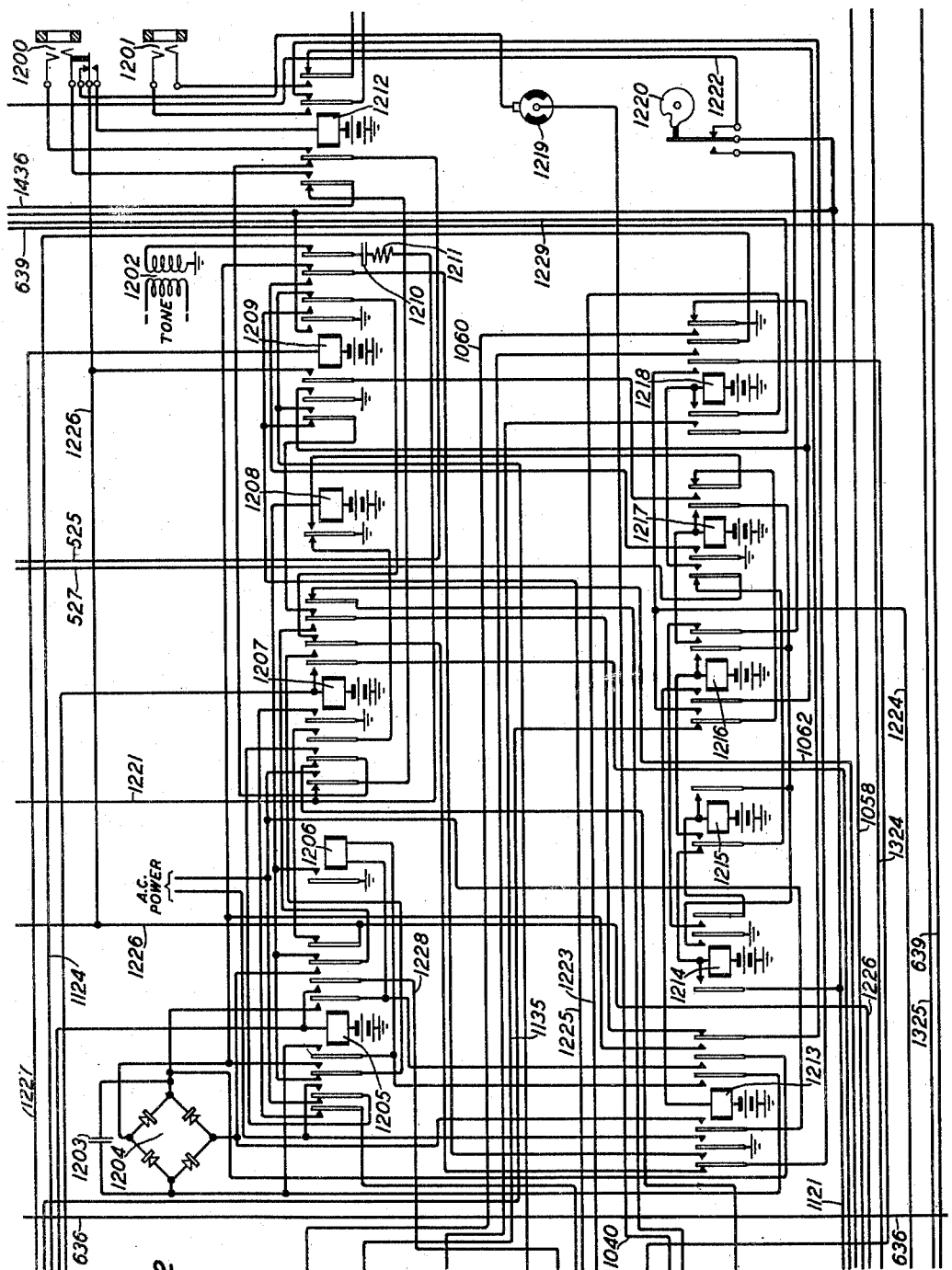
Figure 13:
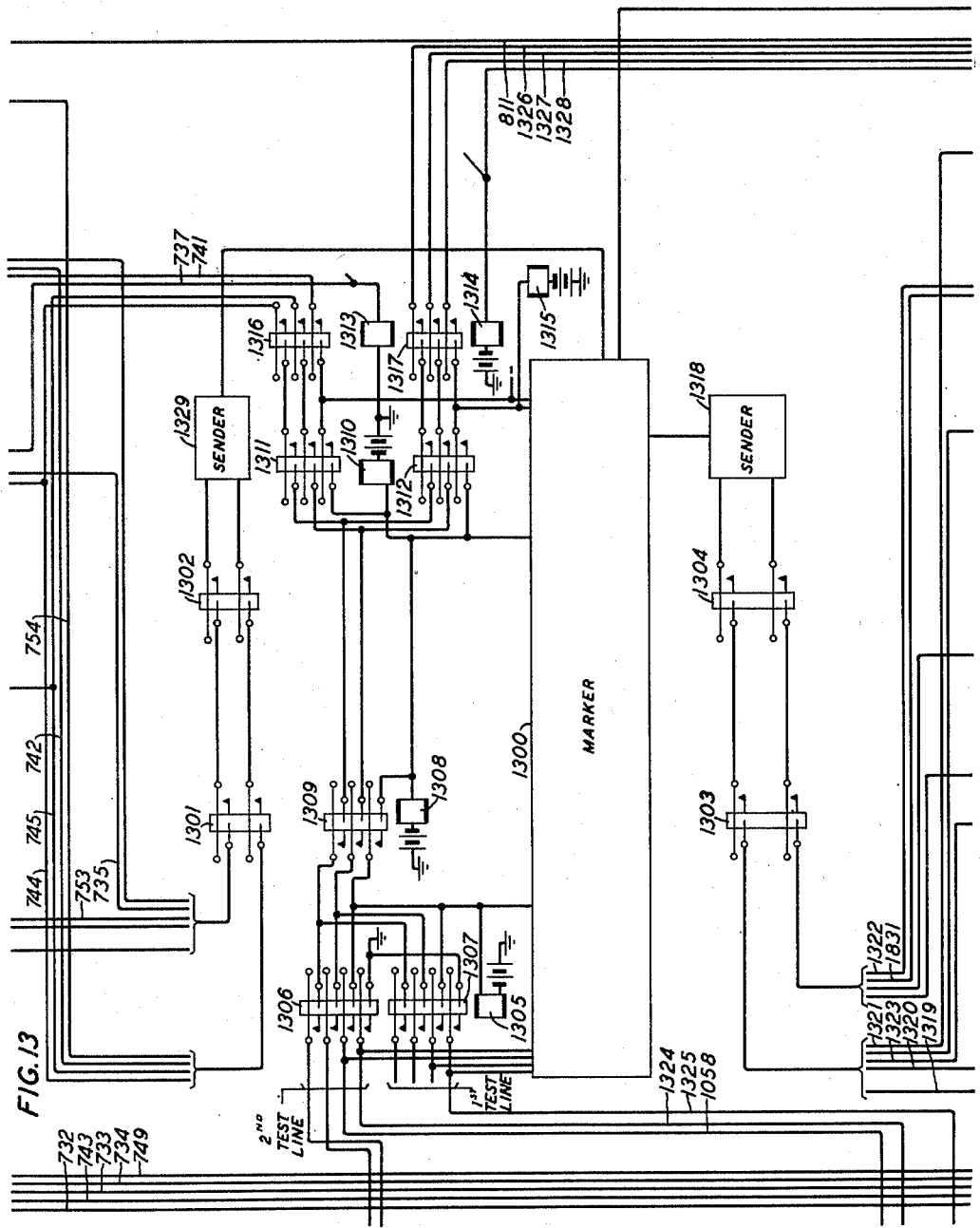
Figure 14:
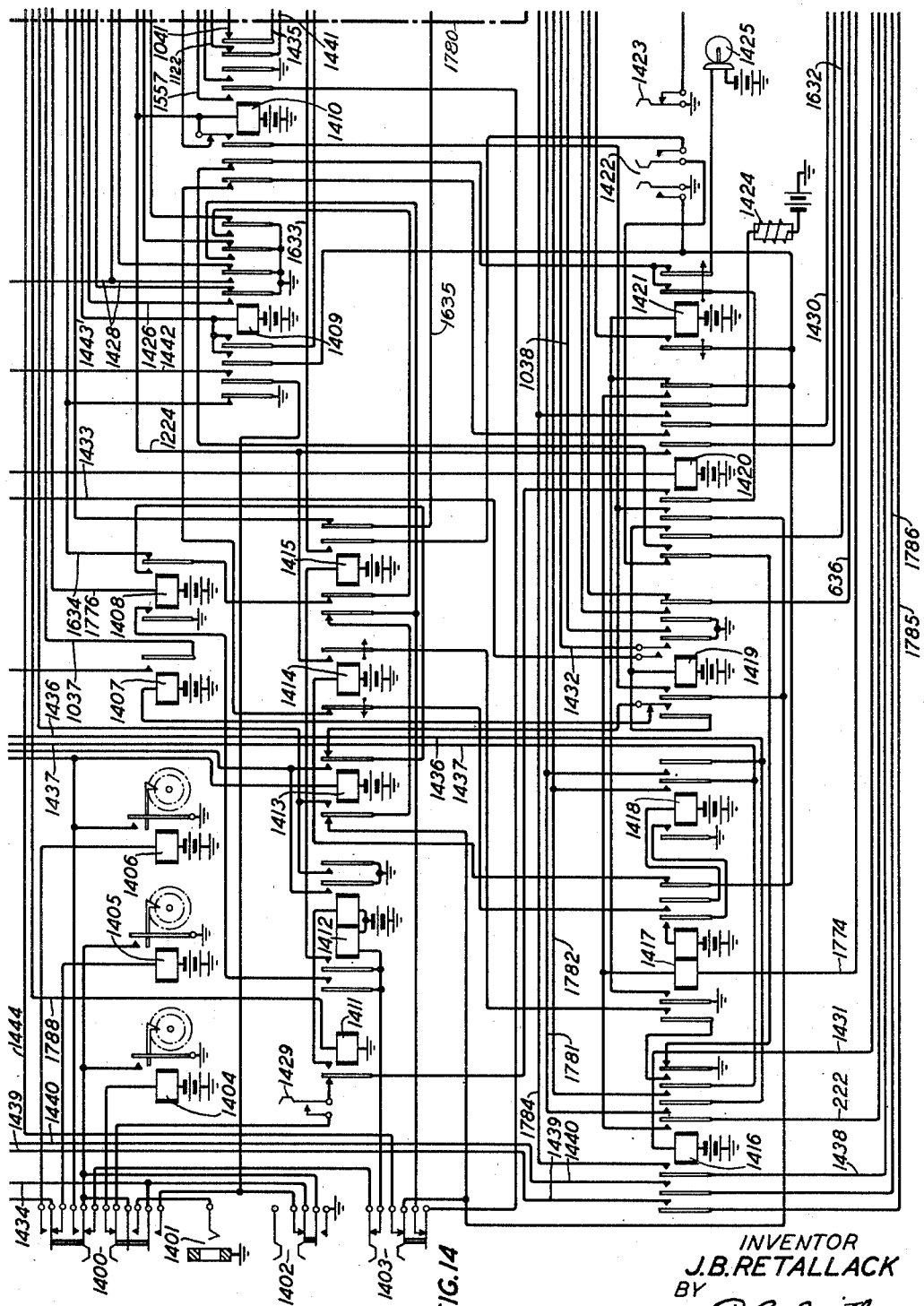
Figure 15:
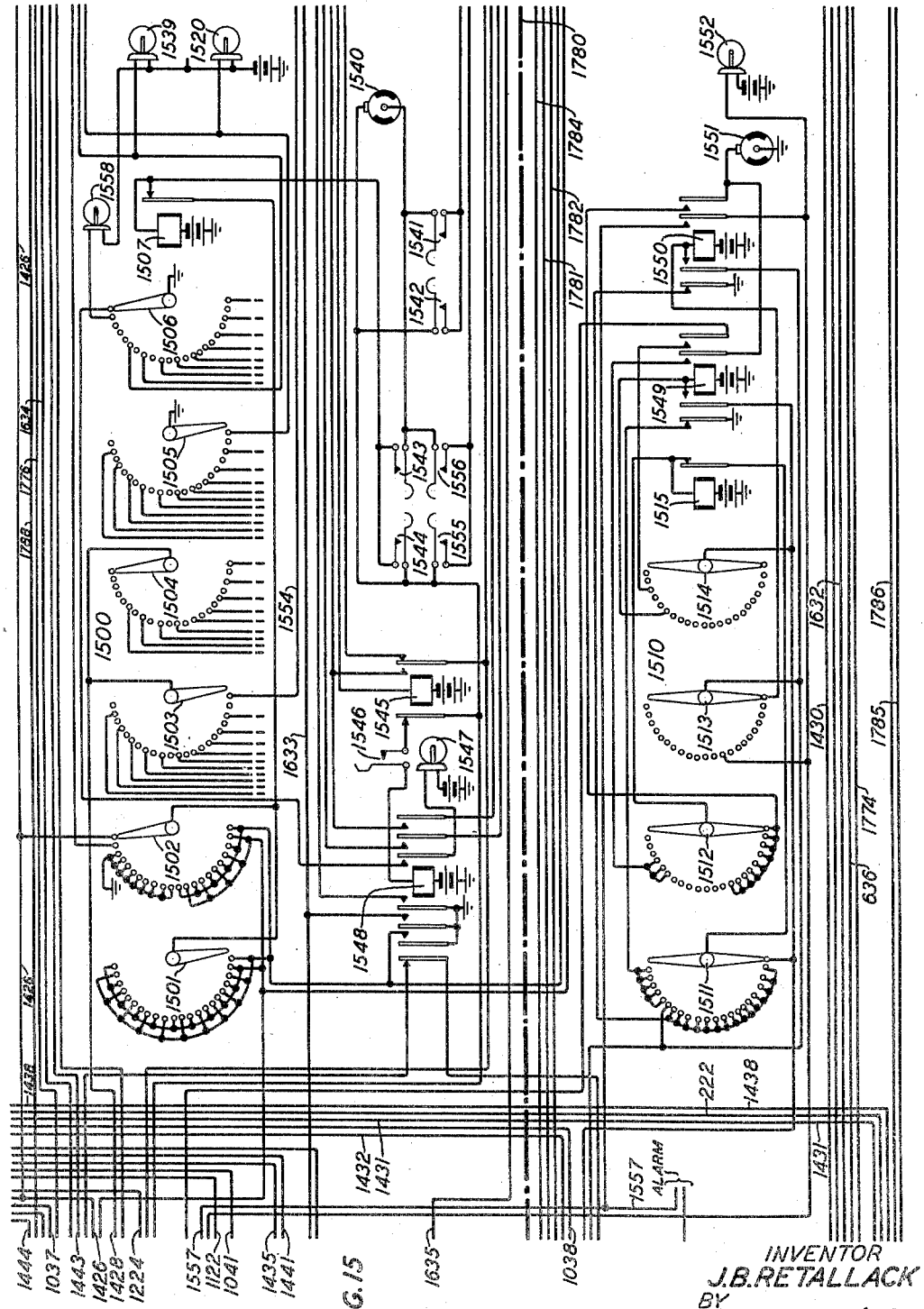
Figure 16:
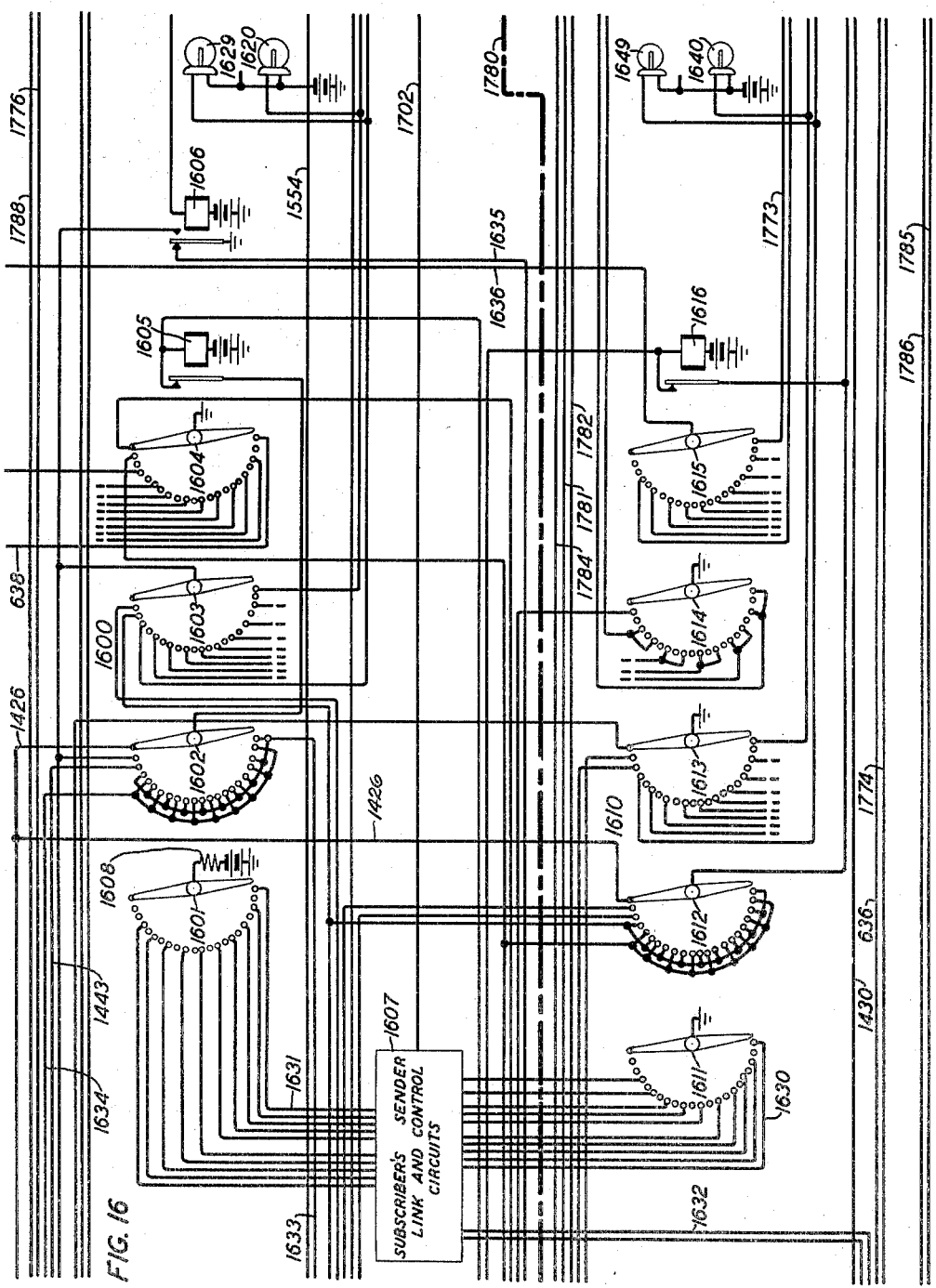
Figure 17:
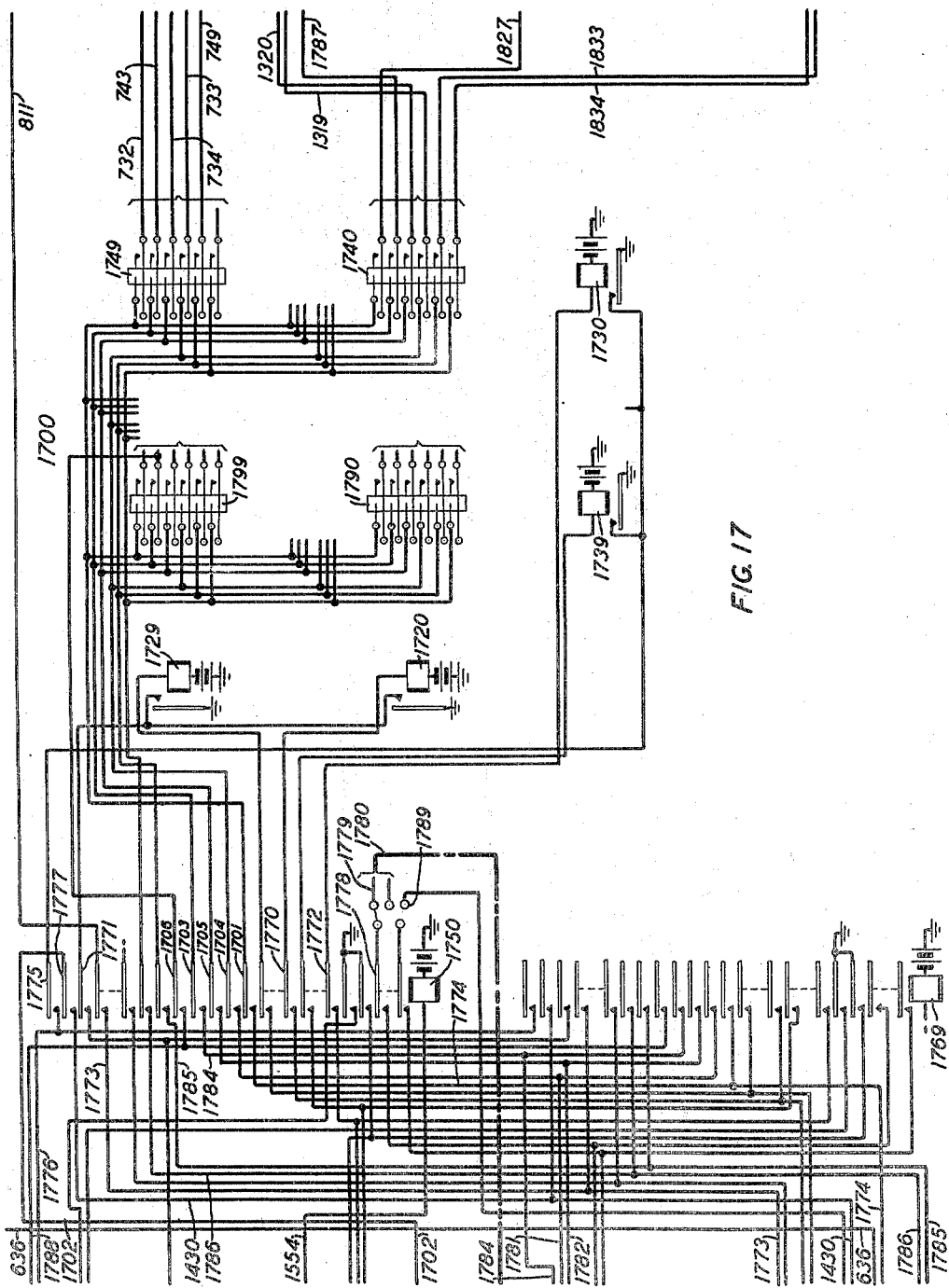

These and other features of the invention will be more apparent from a consideration of the following description in connection with the attached drawings, in which:

Figs. 1 to 6, 8 to 12 and 14 to 17 disclose the test circuit;
Figs. 1 and 2 show a dial pulsing circuit;
Figs. 3 and 9 show a class circuit;
Figs. 4, 5 and 6 show charge testing equipment;
Figs. 10, 11 and 12 show supervisory test equipment;

Figs. 14 to 17 show connection control equipment;
Fig. 7 shows a coin type district;
Fig. 8 shows in diagrammatic form a coin control circuit;
Fig. 13 shows a schematic marker, sender and switches for connecting the junctors therewith and with the test lines;
Fig. 18 shows a message rate type district, and
Fig. 19 shows the manner in which the other figures should be arranged.

Briefly, the operation of the test circuit is as follows: In accordance with the type of test to be made, one or more of the keys of Fig. 9 is operated, each key representing a particular test. The start key is then operated, causing the switches 1500, 1600 and 1610 to advance to select the first cross-bar junctor switch and the first level and the first horizontal position thereof. Thereupon, the cross-point leading to the first district junctor is closed. In general, the junctor is given a busy test and if idle, is directed to a test line. Then the supervisory relays are tested and finally the charging equipment. The test class switch 900 is then advanced to the next class of test and that test is made on the same junctor. After the tests corresponding to all operated keys have been made, the switch 1600 is advanced to release the cross-point and then further advanced to operate the next crosspoint. After the ten cross-points in the first level have been used, switch 1610 is advanced to release the select magnet of the first level and is then stepped to the next position where it operates the select magnet of the second level, and switch 1600 is reoperated to close the cross-points of that level in succession. When the last junctor accessible through the first cross-bar switch is tested, switch 1500 is advanced to select another switch.

As above indicated the keys of Fig. 9 determine the tests to be made and the off-normal positions of switch 900 correspond thereto. The tests which may be made, with the key and position of switch 900, are as follows:

| Position | Key | Lamp | Test |
|---|---|---|---|
| 1 | 912 | 920 | Local charge. |
| 3 | 917 | 921 | Free call. |
| 5 | 913 | 922 | Call to operator. |
| 7 | 914 | 923 | Disconnect. |
| 9 | 915 | 924 | Condenser test. |
| 11 | 916 | 925 | Automatic release. |
| 13 | 910 | 926 | Zone. |
| 15 | 911 | 927 | Tip party charge. |

The tests made in positions 13 and 15 are applicable only to certain types of junctors and therefore these keys should not be operated alone.

Relays 313 to 326 are individual to the various types of district junctors and are operated under the joint control of the group relay and the level switch, cross-connections being provided to accommodate the test circuit to the arrangement of the particular office in which it is installed. Each relay has a corresponding lamp 300 to 312 which is lighted to indicate the type of district junctor under test. For zone and two party tests it is necessary that the proper district class relay be operated to permit the test to be made.

Switch 900 also controls the dial pulsing circuit by operating one of the relays 100, 111, 112, or 113 to control the code transmitted, in order to give the marker the proper indication.

For convenience, only two types of district junctors have been shown, namely, that of Fig. 18 which is arranged for use with two party lines having message rate local and overtime service but no zone service and that of Fig. 7 which is arranged for use with lines equipped with coin boxes and is also arranged for collecting for overtime calls.

The district junctor of Fig. 18 is marked idle by battery on conductor 1827 and holds the line switches by connecting ground to conductor 1787 and the district and office switches by connecting ground to conductor 1328 under the control of the incoming supervisory relay 1806. The outgoing supervisory relay 1811 controls the charging by means of cams 1820 and 1821 and controls the automatic release by means of interrupters 1825 and 1826. During the establishment of a connection the junctor is connected with a marker and relay 1805 is operated to permit a record to be made for controlling the charge. In the message rate district the charge is made at the beginning of each conversational period.

In the coin junctor of Fig. 7, relays 730, 719 and 729 have the same functions as relays 1806, 1811 and 1805, respectively. In this junctor the coin is collected near the termination of the conversational period.

Connection with district junctor

An automatic test of all of the district junctors in the cross-bar office is started by the operation of the start key 1422. The operation of this key closes a circuit from battery through the winding of relay 1421, right back contact of relay 1420 to ground at the left contact of key 1422. Relay 1421 operates in this circuit and extends this same ground over its left contact, left back contact of relay 1548 to the winding of relay 1409 and battery. Relay 1409 locks over its middle left front contact to ground over the left contact of start key 1422 and also prepares a holding circuit for itself under the control of relay 1023 by which it is prevented from releasing prior to the completion of a test call. The operation of the start key 1422 also closes a circuit over the right back contact of relay 1417 to the winding of relay 1414 and battery, in which circuit relay 1414 operates.

The district junctors are connected to the test circuit by means of the cross-points of cross-bar switches such as switch 1700. In order to control the successive closure of the various cross-points, and thereby the successive seizure of the district junctors, three control switches 1500, 1600 and 1610 are provided. At the beginning of the test these switches should be in normal position and the operation of relay 1409 advances these switches into position to control the selection of the first district junctor to be tested. To this end the operation of relay 1409 closes three circuits, namely, from ground at its inner right contact to conductor 1426 and thence in parallel over the normal contact of brush 1502 to the back contact and winding of stepping magnet 1507 and battery; over the normal contact of brush 1602 to the back contact and winding of magnet 1605 and battery; over the normal contact of brush 1612 and the back contact and winding of magnet 1616 and battery. Due to the closure of these circuits, switches 1500, 1600 and 1610 are simultaneously stepped to their first working positions.

Switch 1500 controls the selection of a group of district junctors by the selection of a particular cross-bar switch having access to that group of junctors. In its first off-normal position a circuit is closed from ground at the second right front contact of relay 1409, conductor 1428, brush 1503 and its first off-normal contact, conductor 1554, to the winding of multicontact group relay 1750 and battery. This relay is associated with cross-bar switch 1700 to which the first group of one hundred district junctor circuits are connected for test. In other positions of group switch 1500 other group relays, such as relay 1769, are operated, which relays are each associated with cross-bar switches to which other groups of district junctor circuits are connected.

With relay 1750 operated, a circuit is closed from ground over the first off-normal contact of brush 1613 to lamp 1640 and battery and in parallel therewith over armature 1770 of relay 1750 to the winding of select magnet 1720 and battery. The select magnet 1720 operates, preparing the first row of cross-points of switch 1700. As an indication that the cross-points have been prepared, magnet 1720 also closes its left contact, completing a circuit over armature 1771 of relay 1750, winding of relay 1606 and battery. Relay 1606 operates, closing a circuit over its front contact and brush 1603 in its first off-normal position to lamp 1620 and battery, and in parallel therewith over armature 1772 of relay 1750 to the winding of hold magnet 1730 and battery. Magnet 1730 closes cross-point 1740, thereby connecting the first district junctor circuit which is shown in Fig. 18 to the test circuit in preparation for test.

Magnet 1730 also connects ground over its front contact, armature 1775 of relay 1750, conductor 1776, winding of relay 1408 to battery, as an indication that the cross-point has been closed. With relay 1408 operated, a circuit is closed from ground at the outer right front contact of relay 1409, inner left back contact of relay 1415, right front contact of relay 1408, right back contact of relay 1413, left normal contact of relay 1419 to the winding of relay 1407 and battery. Relay 1407 operates, closing a circuit from grounded conductor 1426, over the normal contact of test switch brush 1002, conductor 1037, front contact of relay 1407, right back contact of relay 935 to the winding of relay 1420 and battery. With relay 1420 operated, the circuit is ready to make the busy test of the selected district junctor.

Busy test of district junctor

In order not to interfere with service connections, a test can only be started while the district junctor is idle, and the test circuit having selected a district junctor, first makes a test to determine whether that junctor is free.

The junctor of Fig. 18 which has been selected, if idle, is so marked by the presence of battery on conductor 1827, connected thereto over the normal contact of the make-busy jack 1808, left back contact of relay 1809, right back contact of relay 1800 and through resistance 1818. With cross-point 1740 closed, this battery is extended over the uppermost contact of the cross-point, armature 1701 of relay 1750, conductor 1774, left winding of relay 1417, outer right front contact of relay 1420 to ground at the left contact of start key 1422.

The operation of relay 1420, in addition to completing the busy test circuit above traced, opens the circuit of relay 1421 which is slow to release. If the district junctor tested is busy, so that battery is absent from the circuit of relay 1417, relay 1421 releases completely, lighting the busy lamp 1425 over the outer right back contact of relay 1421, middle left contact of relay 1410, outer left front contact of relay 1420, to ground at the outer right back contact of relay 1416. Relay 1421 also prepares a circuit for causing the test circuit to release the busy junctor and select the subsequent junctor under control of the pass busy key 1429 as will be hereinafter described.

Assuming that the junctor is idle, however, the operation of relay 1417 connects ground over its inner left front contact to the winding of relay 1421 to prevent its release. At its right back contact, relay 1417 opens the circuit of slow-release relay 1414, which, after an interval, closes a circuit for causing the sender control circuit 1607 to select an idle sender and connect it with the district junctor to be tested. This circuit may be traced from battery through the winding of relay 1418, outer right front contact of relay 1417, left back contact of relay 1414, outer left back contact of relay 1410, second right front contact of relay 1420, conductor 1430, armature 1777 of relay 1750, conductor 1702, to the sender link control circuit 1607. This circuit extends in the sender link control circuit to a relay which operates as a signal for setting up a connection between the district junctor circuit under test and a subscriber's sender. Relay 1418 operates in this circuit, closing a locking circuit for relay 1417 from battery through the right winding and inner right contact of relay 1417 to ground at the left contact of relay 1418. The test circuit indicates to the sender link control circuit 1607 the identity of the district selector with which the sender is to be connected by grounding conductor 1630, over brush 1611 of switch 1610 to identify the group of district junctors and by connecting battery through resistance 1608 over brush 1601 to conductor 1631 to indicate the particular junctor in the group above identified. In response to these three signals the sender link control circuit 1607 causes a connection to be established from the district junctor of Fig. 18 through primary sender selector 1303 and secondary sender selector 1304, to an idler sender indicated by rectangle 1318.

Upon the establishment of this connection the operation of primary sender selector hold magnets connects ground to conductors 1321 and 1322. Ground on conductor 1321 operates relay 1809 which disconnects battery from conductor 1827, removing the idle indication from the junctor. Ground connected to conductor 1322 completes a circuit which may be traced over the left back contact of relay 1813, resistance 1807, to conductor 1787 to mark the junctor busy.

When the control circuit 1607 has completed its functions it connects ground to conductor 1632, completing a circuit over the third left front contact of relay 1420 to the winding of relay 1419 and battery as an indication to the test circuit that the sender is ready.

Relay 1419 operates in this circuit and locks over its left alternate contact, right back contact of relay 1413, right front contact of relay 1408, inner left contact of relay 1415 to ground at the outermost right front contact of relay 1409. The opening of the left normal contact of relay 1419 opens the circuit of relay 1407 which releases, in turn releasing relay 1420. With relay 1420 released, the circuit of relay 1421 is reclosed under the control of start key 1422 in preparation for testing the next district junctor, and relays 1418 and 1417 are released. Relay 1419 also closes a circuit from battery through the winding of relay 1416, conductor 1431, outer right back contact of relay 1032, conductor 1038 to ground at the third right front contact of relay 1419. In addition, relay 1419 connects ground to conductors 1432 and 1433 to prepare the class and test circuits for operation, while relay 1416 prepares the circuits between the district selector and the supervisory test equipment. In addition, the operation of relay 1416 extends the ground connected to conductor 1787 over the cross-point 1740, contact 1703 of group relay 1750, conductor 1784, inner left front contact of relay 1416, conductor 1438, left back contact of relay 1032 to the winding of relay 1031 and battery. Relay 1031 operates and locks to conductor 1438 independent of relay 1032. Since the ground is maintained on conductor 1322 as long as connection between the district junctor and the sender 1318 is maintained, the operation of relay 1031 is an indication to the test circuit of that fact.

As above described, the terminals over which the brush 1614 moves are cross-connected over the contacts of the group relays to the class relays of Fig. 3 to indicate the type of district connected to the level indicated by the position of switch 1600 in the cross-bar switch identified by the operated group relay. The district junctor shown in Fig. 18 to which this test circuit has been connected is one which is capable of serving two-party message rate lines with overtime registration on non-zone messages. Therefore, it may be assumed that armature 1778 of group relay 1750 is cross-connected to conductor 1779 so that with brush 1614 in position 1 a circuit is completed from ground over brush 1614, armature 1778, conductor 1779, through cable 1780, to the winding of relay 322 and battery. Relay 322 is operated, lighting lamp 306 to indicate the type of district undergoing test and closing other circuits for modifying the testing circuits in accordance therewith.

Under the assumption that it is desired to make all possible tests, each of the test class keys 910 to 917 will be operated. Therefore when relay 322 is operated following the selection of a district junctor, a circuit is closed from battery through resistance 932, winding of relay 931, brush 903 in normal position, over the right closed contact of any of the keys 910 to 917, conductor 1442, outer left front contact of relay 1409, normal contact of key 1402, conductor 1434 to ground at the middle right front contact of relay 322. Relay 931 operates in this circuit, locking to ground over conductor 1442 independent of switch 900 and the test class key. Relay 931 closes a circuit from ground over its outer left front contact, brush 902 in normal position, back contact and winding of stepping magnet 906 and battery. Magnet 906 advances switch 900 to position 1. In this position, lamp 920 is lighted in a circuit from battery through the lamp 920, brush 901 in position 1, to ground over conductor 1428 as an indication that a local charge test is to be made of the selected district junctor.

With relay 931 operated, ground connected to conductor 1433 by relay 1419, is extended over the right front contact of relay 931, brush 904 in position 1, conductor 936 to the winding of relay 112 and battery, operating relay 112 to control the transmission of an office code to the sender attached to the district junctor which will be characteristic of a call for which a charge would be made. A branch of this circuit extends over conductor 937, brush 1001 in normal position, through the winding of relay 1023, conductor 1039, left back contact of relay 1111 to battery through resistances 1104 and 1103.

Relay 1023 operates in this circuit to indicate the start of the testing operation and locks to battery over its inner right contact and to ground over its inner left contact and conductor 1432. At its outer left contact relay 1023 closes a locking circuit for relay 1409 to hold that relay operated until the completion of the test, should the start key be opened while the test is in progress. In addition, relay 1023 closes a circuit from battery through the winding of stepping magnet 1005, which controls the test switch 1000, back contact of magnet 1005, conductor 1041, outer right back contact of relay 1410, conductor 1435, brush 1004 in its normal position to ground at the middle left front contact of relay 1023. Magnet 1005 advances switch 1000 to position 1.

With the test switch in position 1 and the sender 1318 ready to receive a registration, the dialing tip and ring conductors 1319 and 1320 which connect the sender with the district junctor are extended over cross-point 1740, armatures 1704 and 1705 of group relay 1750 to conductors 1781 and 1782, over the right contacts of relay 1416, to conductors 1436 and 1437. From conductor 1436 the circuit may be traced over the outer left back contact of relay 1212, outer left back contact of relay 1207, conductor 1221, left normal contact of relay 515, conductor 526, outer right back contact of relay 1021, to conductor 1042, inner right back contact of relay 1115, resistance 1114, conductor 226, right back contact of relay 214, conductor 1046, winding of relay 1036, back contact of relay 1117, inner left back contacts of relays 1207 and 1212, conductor 525, right normal contact of relay 515 to conductor 1437. Battery and ground supplied from the sender 1318, cause relay 1036 to operate, closing a circuit from battery through the winding of magnet 1005 and its back contact, and as above traced to brush 1004 in position 1, left front contact of relay 1036 to ground at the outer left front contact of relay 1031. Magnet 1005 operates in this circuit, advancing the test switch 1000 in position 2.

In position 2 a circuit is closed from battery through the winding of relay 1032, brush 1002 in position 2 to grounded conductor 1426. Relay 1032 operates in this circuit, locking over its inner left front contact and the fifth left back contact of relay 1022 to grounded conductor 1426. Relay 1032 at its middle right front contact closes a shunt around the winding of relay 1036 causing that relay to release. With switch 1000 in position 2 and relay 1036 released, a circuit is closed from ground at the inner right front contact of relay 1419, conductor 1433, right front contact of relay 931, conductor 937, brush 1001 in position 2, right back contact of relay 1036, conductor 1043, brush 201 of dial pulsing switch 200 in normal position, to the winding of relay 216 and battery. Relay 216 locks over its inner left front contact to conductor 1043, preparing the dial pulsing circuit for operation.

Relay 216 in operating closes a circuit from ground at its inner right front contact, brush 202 of dial pulsing switch 200 in normal position, back contact and winding of stepping magnet 205 and battery. Magnet 205 operates in this circuit advancing switch 200 to position 1.

In position 1 of the pulsing switch a test is made to determine that all of the dial pulse relays are normal. This circuit may be traced from battery through the winding of magnet 205 and its back contact, brush 202 in position 1, over the outer right back contact of relay 114, left back contact of relay 116, inner upper back contacts of relays 101 to 110, left back contacts of relays 214, 215 and 219 to ground at the right back contact of relay 218. If all of these relays are normal, the above-traced circuit will be closed and magnet 205 will operate to advance switch 200 to position 2.

When relay 216 operated it connected ground over its inner right contact to lamp 213 to indicate that dialing is in progress. At its middle right contact relay 216 connected ground to conductor 220, to start pulsing relays 206, 207 and 208.

Relay 208 is a polarized, condenser-timed, pulsing relay of the well-known type. Normally its lower winding is included in a circuit from battery through resistance 212, lowermost contact of jack 209, lower winding of relay 208, middle lower contact of jack 209, condenser 221, resistances 211 and 210 to battery, while the upper winding is included in a circuit from battery through resistance 212, inner lower contact of jack 209, upper winding of relay 208 in series with the windings of polarized relays 207 and 206, upper contact of jack 209 to battery through resistance 210. With ground connected to conductor 220, the upper winding of relay 208 and relays 206 and 207 are energized and condenser 221 is charged through the lower winding of relay 208 causing that relay to operate and close its contact. The closure of this contact connects ground on conductor 220 over the contact of relay 208 in shunt of the operating windings of relays 206, 207 and 208, and discharging condenser 221 through the lower winding thereby causing relay 208 to open its contact, and the cycle to repeat itself as long as ground is held on conductor 220. The contacts of relays 206 and 207 operate in synchronism with that of relay 208.

With switch 200 in position 2, ground over conductor 1043 is extended over brush 201 in position 2 through the winding of relay 215 and battery. Relay 215 operates extending its operating ground over its left front contact, outer upper back contact of relay 103, to the right winding of relay 218 and battery. Relay 218 operates in this circuit.

With relay 216 operated, ground is connected over the outer right front contact of relay 216, conductor 222, inner right front contact of relay 1416 and thence through the winding of relay 1417 to conductor 1827 of the district junctor to detect a false release of the district junctor during pulsing.

The operation of relay 218 closes an obvious circuit through the winding of relay 219. Relay 219 operates, locking to ground over brush 203 in position 2. When relays 219 and 218 operate, ground is connected over the middle left front contact of relay 219 and the outer left front contact of relay 218 to the armature of relay 206. If the armature of relay 206 is engaging its right contact or when it next engages that contact, a circuit is closed for relay 214 which operates and locks over its outer left front contact under the control of relays 218 and 219 and connects this locking circuit over its inner left contact to the armature of relay 207. Relay 214 in operating opens the shunt around resistance 1118 in the circuit of relay 1036 to improve the pulsing condition for the sender. When relay 214 operates, the left contact of relay 206 is connected over the right front contact of relay 214 to conductor 223 thereby intermittently grounding that conductor and controlling relays 114, 115 and 116. At the first grounding of conductor 223, relay 116 operates, locking through the left winding of relay 114, back contact of relay 115, inner right front contact of relay 116, to ground over brush 203 in position 2. Relay 114 does not operate, being shunted by the operating circuit for relay 116. When relay 206 removes ground from conductor 223 relay 114 operates. At the next connection of ground to conductor 223 a holding circuit is closed for relay 114 over the right front contact of relay 114 and its right winding to the winding of relay 115 and battery. Relay 115 operates and opens the locking circuit of relay 116 which now releases. When relay 206 again removes ground from conductor 223, relays 114 and 115 also release. As relay 116 operates and releases, ground over brush 203 in position 2, which is connected to the outer right armature of relay 116, is alternately connected to conductors 117 and 118. The first closure of ground to conductor 117 completes a circuit over the lower back contacts of relays 110, 108, 106, 104 and 102 to the winding of relay 101 and battery. Relay 101 locks over its inner lower front contact, left front contact of relay 114 to ground over brush 203 in position 2. With relay 101 operated, the connection of ground to conductor 118 by the release of relay 116 closes a circuit over the lower back contacts of the odd-numbered relays 109, 107, 105 and 103, outer lower front contact of relay 101, winding of relay 102 and battery. Relay 102 locks over its inner lower front contact, normal contact of relay 114 to ground supplied by brush 203 in position 2.

From the foregoing and an inspection of Fig. 1, it will appear that each time that relay 116 operates, an odd-numbered relay of the group 101 to 110 is operated, this relay locking over the front contact of relay 114, when that relay operates at the termination of the pulse on conductor 223. Each time that relay 116 releases an even-numbered relay of the group 101 to 110 is operated. When relay 114 releases at the termination of the pulse, the odd-numbered relay releases and the even-numbered relay locks. The even-numbered relays are released when relay 114 operates. Therefore relay 206 functioning through relays 114 and 116 causes the successive operation of relays 101 to 110, only one relay remaining operated at the termination of each pulse by relay 206.

At the same time that relay 206 closes its left contact, relay 207 also closes its contact, thereby completing a circuit from ground over the middle left contact of relay 219, outer left front contact of relay 218, inner left front contact of relay 214, contact of relay 207, middle left front contact of relay 216, winding of relay 217 to battery. Relay 217 closes a holding circuit for relay 218 through the left winding and inner left contact of relay 218 to ground at the front contact of relay 217. When relay 103 operates under the control of relay 206 it opens the energizing circuit for relay 218 but that relay remains operated until relay 207 opens its contact, in turn releasing relay 217, in order to insure that the left pulse is not curtailed. When relay 218 releases, ground is removed from the armature of relay 206 and from the locking circuit of relay 214, causing relay 214 to release. With relay 214 released, ground is also removed from the armature of relay 207. With relay 218 released and relay 219 operated, a circuit is closed from ground at the back contact of relay 218, outer left front contact of relay 219, brush 202 in position 2, back contact and winding of stepping magnet 205 and battery. Magnet 205 steps dial pulsing switch 200 into position 3, thereby opening the locking circuit of relay 219 which releases. The advance of switch 200 also opens the locking circuit of relays 114 and 116 and, in turn, those for relays 101 to 103. These relays also restore to normal.

With switch 200 in position 3 the previously traced circuit for determining that all of the dial pulsing relays have returned to normal is closed, extending this time over brush 202 in position 3 to the stepping magnet 205 which operates and advances switch 200 into position 4. The purpose of the foregoing operation is to insure that the pulsing relays 206, 207 and 208 have reached their standard rate of pulsing before any dial pulses are sent out.

With switch 200 in position 4, relay 112 which was operated, as previously described, controls the number of the counting relays to be operated. The armatures of this relay as well as of relays 100, 111 and 113 are cross-connected to the back contacts of relays 101 to 110 in accordance with codes which, when registered in the sender and transferred to the marker, will cause the marker to prepare the district junctor for the corresponding type of charging operation. For example, relay 100 is cross-connected to set up a code which will require the use of zone metering apparatus. Relay 111 is cross-connected to control the transmission of the code for a call to an operator. Relay 112 causes the transmission of a code for a call requiring a local charge, while relay 113 sets up a code within which a non-charge call may be made.

Assuming that the left armature of relay 112 is connected to the back contact of relay 104, that the inner right armature is cross-connected to the back contact of relay 107 and that the outer right armature is cross-connected to relay 106, the advance of switch 200 to position 4 closes a circuit from battery through the right winding of relay 218, outer upper back contact of relay 106, outer right armature of relay 112, brush 201 in position 4 to ground over conductor 1043. Relay 218 operates as before, in turn operating relay 219. Relays 219 and 218, as before, supply ground to the armature of relay 206 which at the first closure of its right contact operates relay 214 as before. Relay 214 operates and locks, supplying ground to the armature of relay 207. Relay 214 also connects the left contact of relay 206 to conductor 223, to cause the operation of relays 114, 115 and 116 as previously described. These relays operate relays 101 to 106 in succession. With switch 200 in position 4 relay 215 is not operated and the closure of the contact of relay 207 in addition to operating relay 217 connects ground over the middle and outer left front contacts of relay 216, right back contact of relay 215, conductor 224, to the winding of relay 1117 and battery, thereby operating relay 1117 each time that relay 206 transmits a pulse to the counting arrangement of Fig. 1. Relay 1117, in operating, opens the pulsing circuit connecting the test circuit with the sender and causes a dial pulse to be registered in the sender for each operation of this relay.

Since the outer right armature of relay 112 is connected to the back contact of relay 106 and the circuit of relay 218 extends over the back contact of relay 106, after six pulses have been recorded on relays 101 to 106 and a corresponding sixth pulse is recorded in the sender, the operating circuit of relay 218 is opened, and at the termination of the pulse relay 218 releases, disconnecting ground from the armature of relay 206, releasing relay 214 and thereby disconnecting ground from the armature of relay 207. The release of relay 218 advances switch 200 to position 5 where the locking circuit for relay 219 and the relays of Fig. 1 is opened. When relays 219, 101 to 106 and 114 to 116 have released, switch 200 is advanced to position 6.

In position 6 relay 215 operates and an interval is measured between digits in the manner described before the start of dial pulsing after which switch 200 is advanced to position 8. With relay 215 operated no pulses are sent to the sender.

In position 8 relay 218 is operated over the back contact of relay 107, inner right armature of relay 112 and brush 201 in position 8. The dial pulsing circuit acts as before, causing seven operations of relay 1117 to transmit seven dial pulses to the sender. Following this digit, the switch is advanced to position 10. With switch 200 in position 10 another interval is measured by the operation of relays 101 to 103 and the switch is advanced to position 12.

In position 12 relay 218 operates over the back contact of relay 104, left contact of relay 112 and brush 201 in position 12, causing the transmission of four dial pulses to the sender. At the termination of this digit, switch 200 is advanced to position 13 and following the release of the pulse controlling relays is advanced to position 14. In this position ground over brush 203 is extended over conductor 225, brush 1004 of the test switch 1000, conductor 1435, outer right back contact of relay 1410, conductor 1041, back contact and winding of stepping magnet 1005 to battery, thereby advancing the test switch to position 3.

The advance of switch 1000 from position 2 disconnects ground from conductor 1043 thereby releasing relay 216. At its outer right back contact relay 216 connects ground to brush 204 thereby completing a circuit over the strapped off-normal terminals of that brush and the back contact and winding of stepping magnet, restoring switch 200 to normal.

With switch 1000 in position 3 the test circuit ordinarily waits for the sender and marker to complete their functions. The registration of the code in the sender 1318 causes the sender 1318 to summon a marker, such as marker 1300, which from information given to it by the sender attempts to seize a test line.

The marker also seizes the district connector 1828 and through the sender 1318 and the sender link switches 1303 and 1304 operates relay 1805 which connects the district junctor with the marker.

With switch 1000 in position 3, a circuit is closed from battery through the left winding of relay 1112, conductor 1120, brush 1001 in position 3, conductor 937 to ground over the right front contact of relay 931, conductor 1433 and the inner right front contact of relay 1419. Relay 1112 at its left back contact disconnects ground from conductor 1325 which removes the busy condition on the first test line in the secondary office frame. The operation of relay 1112 connects conductor 1325 to the winding of relay 1116.

When the marker tests the two test lines it finds ground on conductor 1324 over the back contact of relay 1116 and battery through the winding of relay 1116 on conductor 1325. It therefore selects the first test line and after making this selection, makes a test for a possible double connection and in so doing connects ground to conductor 1325 thereby operating relay 1116 which locks over its inner left front contact to ground at the inner right front contact of relay 1112. Relay 1116 removes ground from conductor 1324 and extends that conductor to the outer right contact of relay 1112 whence it is further extended to contacts of relays 1100 and 1218 which are open at this time. Relay 1116 also closes a circuit from grounded conductor 1426, brush 1002 in position 3, conductor 1044, right front contact of relay 1116, conductor 1121, to interrupter 1220, the function of which will appear hereinafter. The locking ground for relay 1116 extends back over the conductor 1325 to the marker where it causes the marker to ground the trouble release conductor which is connected through district connector 1828 to conductor 1830 and over the third right front contact of relay 1805 to conductor 1831 leading to the sender 1318. In response to this signal the sender dismisses the marker and then calls in another marker and sets up the designation therein to cause a second trial. Under this condition the marker finds the second test line idle.

Relay 1805 when operated as above described locks under the control of the marker and operates the ten primary select magnets including the magnet 1314 which identify the ten district links serving this district junctor. The marker also grounds conductor 1829, completing a circuit over the second right front contact of relay 1805, inner right back contact of relay 1812, winding of relay 1822 and battery as an indication to the district junctor circuit that the call is to be registered. Relay 1822 locks over its outer right front contact, outer right back contact of relay 1823, inner right back contact of relay 1802 to ground connected to conductor 1323 by the sender 1318.

The foregoing test which causes the marker to make a second trial is furnished to test the trouble release lead through the sender, district junctor and link circuits.

During the time that the marker is connected with the district junctor and relay 1805 is operated, conductor 1832 is extended through resistance 1804, outer left front contact of relay 1805, over a contact of relay 1823 to conductor 1833 or 1834. Conductor 1833 is normally extended to the message register of the individual calling line or of the ring party on a party line. With relay 1823 operated to indicate that the tip party on the party line is calling, it transfers this connection to conductor 1834 which leads to the message register of the tip party. Since there is no calling line, the test circuit extends conductors 1833 and 1834 over the contacts of cross-point 1740, contacts of relay 1750, conductors 1785 and 1786, outer left front contacts of relay 1416 to conductors 1439 and 1440, respectively. Conductor 1439 extends over the left back contact of relay 401, resistance 412, upper winding of relay 410, conductor 417, middle left front contact of relay 1032 to ground at the second right back contact of relay 1115, while conductor 1440 extends over the right back contact of relay 401, conductor 418, outer right front contact of relay 1032 to ground at the third right back contact of relay 1115, thereby satisfying the marker when it tests for the condition of the message register circuit.

With interrupter 1220 grounded, the first closure of its right contact completes a circuit over conductor 1220, left back contact of relay 502, conductor 527, left back contact of relay 1217, left back contact of relay 1215, to the winding of relay 1214 and battery. Relay 1214 locks directly to conductor 1121. With relay 1214 operated, the closure of the left contact of interrupter 1220 connects ground over this contact, right back contact of relay 1216, outer right front contact of relay 1214, winding of relay 1215 and battery. Relay 1215 locks over its right front contact to ground at the inner right front contact of relay 1214. The next closure of the right contact of relay 1220, grounding conductor 527, completes a circuit over the left back contact of relay 1217, left front contact of relay 1215 to the winding of relay 1216. Relay 1216 operates, also locking under the control of relay 1214. Similarly, relay 1217 is operated by the closing of the left contact of interrupter 1220 and relay 1218 is operated by the closure of the right contact of interrupter 1220. Relay 1217 also locks under the control of relay 1214 while relay 1218 locks over its inner left front contact, conductor 1223, third left back contact of relay 1022 to grounded conductor 1426, independent of test switch 1000. When relay 1216 operates, it closes a circuit from battery through the winding of relay 1213, inner left front contact of relay 1216 to ground at the right back contact of relay 1218. Therefore, relay 1213 is operated during a complete cycle of interrupter 1220. During this interval, relay 1213 at its middle left front contact connects ground to the alternating current power supply and at its inner left front contact connects the other side of the supply to the varistor 1204. At its inner right front contacts relay 1213 connects relay 1206 across the varistor 1204 and at its outer right front contact connects the other side of the varistor over the outer right back contact of relay 1212 to the ring conductor of the second test line and connects the same side of the varistor over the middle right back contact of relay 1209, outer left front contact of relay 1213, inner right back contact of relay 1212 to the tip conductor of the second test line.

At this time the marker should have caused the closure of cross-points 1306, 1309, 1312 and 1317, extending the tip conductor of the second test line to conductor 1326, third left back contact of relay 1802 and the second left front contact of relay 1800, and the ring conductor of the second test line to conductor 1327, third right back contact of relay 1802 and the inner right front contact of relay 1800. Relay 1800 is not operated at this time and therefore the test line should be open at its front contacts if the circuit is in standard condition. If a ground or battery connection to either of these conductors, either direct or through a condenser, should exist due to cross-contacts on relays 1801 or 1802 in the district junctor, the alternating current relay 1206 will operate.

Relay 1206 in operating closes an obvious circuit for relay 1208. With relay 1208 operated, a circuit is closed from ground at the left front contact of relay 1208, right back contact of relay 1217, left front contact of relay 1216, to conductor 1224 and the winding of relay 1410 and battery. Relay 1410 opens the circuit over which test switch 1000 is advanced to position 4 and thereby blocks the test.

If no such crossed contacts exist, relays 1217 and 1218 operate as above described. The operation of relay 1217 opens the circuit of relay 1410 and the operation of relay 1218 opens the circuit of relay 1213, causing that relay to release and remove the test from the trunk conductors.

With relay 1213 released, the tip conductor of the test line is extended over the inner right back contact of relay 1212, left back contact of relay 1213, inner right back contact of relay 1207, inner right back contact of relay 1209, inner right back contact of relay 1111, middle right front contact of relay 1218, conductor 1124, left winding of relay 1100 to battery. The ring conductor of the test line is extended over the outer right back contact of relay 1212, right back contact of relay 1213, middle right back contact of relay 1207, left back contact of relay 1209, conductor 1225, inner right back contact of relay 1024, conductor 1045, to ground at the right back contact of relay 1111.

After the marker 1300 has completed its functions, it releases relay 1805, thereby connecting ground over the inner right contact of relay 1809, over the outer right back contact of relay 1805, conductor 1328, over the sleeve contacts of the cross-points 1317, 1312, 1309 and 1306, to hold magnets 1315, 1310, 1308 and 1305. When the sender has completed its functions it connects ground to conductor 1831 which, with relay 1805 released, extends over the inner right back contact of relay 1805 to the winding of relay 1800 and battery. Relay 1800 operates, locking over its inner left front contact and the left back contact of relay 1802, second right front contact of relay 1800 to ground at the left front contact of relay 1809. With relay 1800 operated, the incoming tip and ring conductors 1319 and 1320 are extended over the outer left front contacts of relay 1800, the second left and right back contacts of relay 1802 to ground and battery, respectively, through the windings of relay 1806. Relay 1806 connects ground to conductor 1321 to hold relay 1809 operated. The operation of relay 1800 also connects the windings of relay 1811 and coil 1810 over the outer right front contact of relay 1809, second left front contact of relay 1800 and the third left back contact of relay 1802 to the tip conductor of the connection through the district and office links to the test line, and over the outer right back contact of relay 1802, inner right front contact of relay 1800, and the third right back contact of relay 1802 to the ring conductor of the links and the test line. In addition, relay 1800 provides locking ground for relay 1822.

The connection of relay 1811 and coil 1810 across the test line causes the operation of relay 1100 which locks through its right winding and inner right contact, second left back contact of relay 1022 to grounded conductor 1426. With relay 1100 operated, the right winding of relay 1112 is connected over the outer left contact of relay 1100, outer right front contact of relay 1112, and left front contact of relay 1116 to conductor 1324 and thence to ground over the auxiliary sleeve contact of cross-point 1306.

Relay 1100 in operating also closes a circuit from battery through the winding and back contact of magnet 1005 and as before to brush 1004 which is in position 3, inner left contact of relay 1100, conductor 1060, to ground at the outer right front contact of relay 1218. Magnet 1005 advances test switch 1000 to position 4. The advance of the test switch 1000 to position 4 permits relays 1214 to 1217 to release, but relay 1218 remains locked under the control of relay 1022. With switch 1000 in positions 4, 5 and 6, lamp 1017 is lighted over brush 1002 and conductor 1426.

*Supervisory relay test*

The incoming supervisory or battery feed relay 1806 is first tested, except in certain classes of test which will be described hereinafter.

With test switch 1000 in position 4, a circuit is closed from grounded conductor 937, brush 1001 in position 4, outer left back contact of relay 1024, left back contact of relay 1101, outer right back contact of relay 1105, winding of relay 1115 and battery. Relay 1115 locks through its second left front contact, inner left contact of relay 1022 to grounded conductor 1426. With relay 1115 operated, the ground which simulated the presence of a message register to the marker is removed. Relay 1115 also extends its locking ground over its inner left front contact, conductor 1441, inner right back contact of relay 1410, conductor 1122, outer left back contact of relay 1107, left back contact of relay 1113, conductor 1226, auxiliary contact of jack 1200, interrupter 1219, conductor 1040, middle right contact of relay 1023 to the winding of stepping magnet 1005 and battery. The test switch 1000 is advanced through positions 4, 5, 6 and 7 by the intermittent closure of this circuit by interrupter 1219.

With relay 1115 operated, the dialing loop circuit which was extended to the windings of relay 1806 in the district junctor by the operation of relay 1800 and extended through resistance 1114 with relays 1115 and 214 normal, is now transferred over the right front contact of relay 1115, conductor 1123 and thence through resistance 332 to conductor 1046 and in parallel with resistance 332 from conductor 1123 over the middle right back contact of relay 1021, conductor 1047, through resistances 327 and 330 to conductor 1046. This circuit change increases the resistance in the dialing loop to the value which is equivalent to the operate test requirement for relay 1806. With relay 1115 operated, when brush 1001 reaches its fifth terminal, a circuit is closed from grounded conductor 937, brush 1001 in position 5, interrupter 1025, conductor 1048, middle left contact of relay 1115, to the winding of relay 1117 and battery. Relay 1117, operating each time that interrupter 1025 closes its contact, opens the dialing loop, thereby allowing relay 1806 to release and forcing it to reoperate each time on the minimum operating current. This cycle is continued while switch 1000 is advanced out of position 6 under the control of interrupter 1219. Should relay 1806 fail to reoperate after releasing as just described, the district selector will be released as will be described hereinafter resulting in the removal of ground from conductor 1784 and the release of relay 1031 in the test circuit. If relay 1031 releases during a test call it opens the circuit of relay 1416 thereby disconnecting the district junctor from the test circuit. Relay 1031 in releasing also closes a circuit from battery through the winding of relay 1410, conductor 1224, outer left back contact of relay 1033, outer right normal contact of key 1034, right back contact of relay 1031, inner right front contact of relay 1032, outer left back contact of relay 1021 to ground at the outer right front contact of relay 1023. The operation of relay 1410 in this circuit prevents the further functioning of the test circuit at this time and sounds an alarm.

*Outgoing supervisory relay test*

During the test of relay 1806 a soaking current is applied to the outgoing supervisory relay 1811. The circuit for this purpose may be traced from battery through the left winding of relay 1100, conductor 1124, middle right front contact of relay 1218, inner right back contact of relay 1111, inner right back contact of relays 1209 and 1207, left back contact of relay 1213, inner right back contact of relay 1212 over the tip contacts of selector cross-points 1306, 1309, 1312 and 1317, conductor 1326, third left back contact of relay 1802, second left front contact of relay 1800, outer right front contact of relay 1809, coil 1810, winding of relay 1811, outer right back contact of relay 1802, inner right front contact of relay 1800, third right back contact of relay 1802, conductor 1327, ring contacts of selector cross-points 1317, 1312, 1309 and 1306, outer right back contact of relay 1212, right back contact of relay 1213, middle right back contact of relay 1207, left back contact of relay 1209, conductor 1225, inner right back contact of relay 1024, conductor 1045, to ground at the outer right back contact of relay 1111. This circuit is maintained until relay 1111 operates. The direction of current flow, however, is not such as will operate relay 1811.

When switch 1000 is advanced to position 7 under the control of interrupter 1219 lamp 1017 is extinguished and lamp 1013 lighted. Likewise a circuit is closed from grounded conductor 937, brush 1001 in position 7, conductor 1049, fourth left contact of relay 1115, winding of relay 1102 and battery. Relay 1102 operates in this circuit and closes a circuit from battery through the winding of relay 1111 to ground. Relay 1111 operates in this circuit and locks over its inner left front contact and the inner left back contact of relay 1022 to grounded conductor 1426. Relay 1111 in operating disconnects the outgoing ring conductor from ground and extends it to the outer left armature of relay 1102 and disconnects the outgoing tip conductor from the winding of relay 1100 and extends it to the right back contact of relay 1102, thereby opening the circuit of relay 1811 for an interval. When switch 1000 advances to position 8, the circuit of relay 1102 is opened and that relay releases extending the ring conductor to battery through resistance 1103 and in parallel therewith through resistance 1104, inner left back contact of relay 1107, right back contact of relay 1108, to interrupter 1109 and battery through resistance 1110. The tip conductor is extended over the right back contact of relay 1102, inner right back contact of relay 1033, conductor 1050, back contact of relay 329, outer left back contact of relay 404, outer right back contact of relay 403 to ground at the right back contact of relay 408. The current in this circuit is of the proper polarity for operating relay 1811 and when the interrupter 1109 is closed is also of the proper strength. The current flowing through relay 1811 is therefore increased and decreased under the control of interrupter 1109 as a test of the functioning of the relay and of the district junctor circuits in connection with interrupter 1816.

When the circuit of relay 1811 is closed by the release of relay 1102 and the closure of interrupter 1109, relay 1811 closes a circuit from ground over its alternate contact to the contacts of relays 1814 and 1815. Interrupter 1816 is common to a plurality of relays 1814 and 1815 and these relays are common to a plurality of district junctor circuits. Each relay 1814 carries a front contact individual to each of the district junctors to which it is common, only the one individual to the junctor of Fig. 18 being shown. When interrupter 1816 closes its left contact it completes a circuit for relay 1815 over the back contact of relay 1814. With relay 1811 operated, ground over the left contact of relay 1811 is extended over the front contact of relay 1815 to battery through the right winding of relay 1813, which locks over its right front contact under the control of relay 1811. Interrupter 1816 then opens this contact, releasing relay 1815 for a period of two seconds at the end of which interrupter 1816 closes its right contact operating relay 1814 over the back contact of relay 1815. If at this time relay 1811 is still operated, ground over the front contact of relay 1811 is extended over the upper front contact of relay 1814, inner left contact of relay 1813 to the winding of relay 1812 and battery. Relay 1812 if operated, locks over its inner left front contact to ground at the third right contact of relay 1800. With relay 1812 operated, metering takes place. To this end a circuit is closed from ground over the outer left front contact of relay 1813, outer right front contact of relay 1812, inner right front contact of relay 1822 to the winding of magnet 1817 which controls the timing and charging mechanism. Magnet 1817 acts as a clutch which engages relays 1820 and 1821 with the drive shaft 1835 being driven by a telechron motor 1819 which is common to a plurality of district junctors. Magnet 1817 is held energized over its local contact and over the contact of cam 1820 throughout one revolution of shaft 1835.

When cam 1821 closes its contact battery through resistance 1818 is connected over the alternate contact of cam 1821 and the left front contact of relay 1822, outer left front contact of relay 1812, left back contact of relay 1805, inner left back contact of relay 1823 to conductor 1833.

Normally, the district junctor extends message register lead 1833 over the inner right back contact of relay 1823, left back contact of relay 1805, left back contact of relay 1812 to ground and message register lead 1834 to ground at the outer left back contact of relay 1823.

In the test circuit, after the district selector has been seized, but before the sender has been seized, a circuit is closed from battery through the winding of relay 508, conductor 536, inner left back contact of relay 1032, conductor 417, through the upper winding of relay 410, resistance 412, outer left back contact of relay 401, conductor 1439, outer left front contact of relay 1416, conductor 1785, over contact of relay 1750 and cross-point 1740 to conductor 1833 and ground. A similar circuit is closed from battery through the winding of relay 509, conductor 537, inner right back contact of relay 1032, conductor 418, right back contact of relay 401, conductor 1440, middle left front contact of relay 1416, conductor 1786, over a contact of relay 1750 and cross-point 1740 to conductor 1834 and ground. These two relays operate if a ground is present and relay 508 locks over its right front contact through the upper winding of relay 410 to ground as above traced while relay 509 locks over its right front contact and the right back contact of relay 401 to ground as above traced. These locking circuits are independent of relay 1032. When relay 1032 operates as above described, ground over the second and third right contacts of relay 1115 is connected to conductors 417 and 418, respectively, holding relays 508 and 509 operated and providing the necessary ground for the marker test. When relay 1115 operates, relays 508 and 509 are again dependent upon the grounds supplied by the district junctor. The operated periods of relay 1811 under the control of interrupter 1109 should not be of sufficient duration to permit relay 1812 to operate and therefore no metering pulse should be received at this time. However, if, due to unstandard conditions in the junctor during the test of relay 1811, relay 1812 does operate and cause cam 1821 to connect battery to conductor 1833 the holding circuit of relay 508 is opened. When relay 508 releases, it closes a circuit from battery through the winding of relay 1410, conductor 1224, left back contact of relay 508, conductor 333, inner right front contact of relay 1032, outer left back contact of relay 1021 to ground at the outer right front contact of relay 1023. The operation of relay 1410 prevents the completion of the test.

Assuming that no premature metering occurs, during the test of relay 1811, selector 1000 is advanced under the control of interrupter 1219, during which time several cycles of interrupter 1109 occur. When selector 1000 reaches position 11, a circuit is closed from ground over conductor 937, brush 1001 at its No. 11 terminal, conductor 1051, outer left front contact of relay 1115 to battery through the winding of relay 1108. Relay 1108 locks under the control of relay 1111 and opens the circuit for interrupter 1109, thereby reducing the current flow through relay 1811 to its release value.

At the next closure of interrupter 1219 switch 1000 is advanced to position 12 where lamp 1012 is lighted and a circuit is closed from grounded conductor 937, brush 1001 and its No. 12 terminal, conductor 1052, winding of relay 1113 and battery. Relay 1113 at its three right contacts connects ground to conductors 1125, 1126 and 1127. The functions of conductors 1126 and 1127 will appear hereinafter. Ground on conductor 1125 completes a circuit to determine whether the charge testing circuit of Figs. 4, 5 and 6 is in normal condition. This circuit may be traced from conductor 1125 over the middle left front contact of relay 1111, outer left front contact of relay 1108, third right back contact of relay 1106, conductor 1128, inner left back contact of relay 505, conductor 529, inner right back contact of relay 326, left back contact of relay 325, back contact of relay 317, right back contact of relay 313, conductor 334, to battery through the winding of magnet 501 of the timer which drives cam 500. When cam 500 is closed, the ground connected to conductor 334 as above traced is extended over the contact of cam 500, to the winding of relay 400 and battery. Relay 400 operates and closes a circuit from battery through the winding of relay 1107, conductor 1129, left front contact of relay 400, conductor 1061, outermost left contact of relay 1022 to grounded conductor 1426. Relay 1107 operates in this circuit and locks over its inner right contact, conductor 1228, and the fourth left contact of relay 1022 to grounded conductor 1426.

The operation of relay 1107 connects battery through resistance 1110 over the outer left front contact to resistance 1104 independent of interrupter 1109, providing a circuit for relay 1811 in which the relay should operate.

The operation of relays 1113 and 1107 disconnects ground from interrupter 1219 thereby preventing the further advance of the test selector 1000 until the charge tests have been made. Following the operation of relay 1107, timer 501 measures off a sufficient length of time in which to receive a charge impulse from a district junctor before reclosing cam 500.

When relay 400 operated in response to the closure of the timing cam 500, it completed a circuit from battery through the winding of relay 504, left back contact of relay 402, conductor 419, inner left back contact of relay 1106, inner left back contact of relay 1033, conductor 1053, right front contact of relay 400, right back contact of relay 1022 to ground at the outer left front contact of relay 1032. Relay 504 locks over its inner left front contact to grounded conductor 1126. Relay 504 at its inner right front contact connects ground to the upper winding of relay 410 to place it in readiness to receive the registration and at the same contact provides a locking ground for relay 508 should this relay be operated.

In the junctor with relay 1811 held operated, interrupter 1816 functions to bring about the operation of relay 1812 as previously described. With relay 1812 operated, when cam 1821 closes, battery is connected through resistance 1818, cam 1821, left front contact of relay 1822, outer left front contact of relay 1812, left back contact of relay 1805, inner left back contact of relay 1823, conductor 1833, contact of cross-point 1740, contact of relay 1750, conductor 1785, outermost left front contact of relay 1416, conductor 1439, left back contact of relay 401, resistance 412, upper winding of relay 410 to ground at the inner right front contact of relay 504.

The operation of relay 410 closes a circuit from ground on conductor 1126, left contact of relay 410, winding of relay 403 and battery. Relay 403 closes a circuit from battery through the left winding of relay 404, left front contact of relay 403, to ground at the outer right back contact of relay 515. Relay 404 locks in a circuit from battery through its right winding and right front contact to ground at the middle right front contact of relay 504. At the termination of the registration relay 410 releases, in turn releasing relay 403 which now closes a circuit from ground at the outer right back contact of relay 515, left back contact of relay 403, left front contact of relay 404 to the winding of relay 405 and battery. Relay 405 locks over its inner left front contact to ground at the outer right front contact of relay 504.

The operation of relay 410 in addition to operating relay 403 initiates the operation of relays 409, 413, 414 and 415 in order to determine that the message register pulse is of sufficient length to properly operate the subscriber's message register. When test selector 1000 reached position 12, the operation of relay 1113 to ground conductor 1126, energized relay 409 through its upper winding in a circuit which may be traced from battery from the tip contact of jack 406, upper winding of relay 409, ring contact of jack 406, middle right back contact of relay 515, resistance 516 to grounded conductor 1126. At the same time a circuit is closed from battery over the tip contact of jack 406, lower winding of relay 409, auxiliary ring contact of jack 406, resistance 407, outer left back contact of relay 515, conductor 533, outer left back contact of relay 109, conductor 120, right contact of relay 507, right contact of relay 410 to grounded conductor 1126. The first of these circuits is in a direction to operate relay 409 while the second is in a direction to prevent its operation. Ground is also connected to the lower winding of relay 409 over the auxiliary ring contact of jack 406, resistance 407, outer left back contact of relay 515, condenser 517, resistance 518 and grounded conductor 1126. When relay 410 operates, it disconnects ground from the lower winding of relay 409, but condenser 517 must be charged before the current in that winding of relay 409 can decrease to a point where the relay can close its left contact due to the energization of the upper winding. Relay 409 therefore will not close its left contact until a time has elapsed which is determined by the capacity of condenser 517 and the resistances associated with this condenser and relay 409. This operating time for relay 409 is adjusted to be equivalent to the minimum length of time during which a message register pulse must be applied to the subscriber's register in order to insure its operation. When relay 409 operates, it closes a circuit from battery through the winding of relay 413, left contact of relay 409 to grounded conductor 1126. Relay 413 locks directly to conductor 1126, independent of relay 409. When relay 403 operates, immediately after the start of the register pulse, it closes a circuit for relay 414 from battery through the winding of relay 414, right front contact of relay 403, conductor 421, right back contact of relay 602, conductor 632, left back contact of relay 413, back contact of relay 409 to grounded conductor 1126. Relay 414 locks over its left front contact and the inner right back contact of relay 413 to ground over conductor 531. If the pulse is terminated, releasing relay 403 before relays 409 and 413 operate, a circuit is closed from grounded conductor 1126, over the right contact of relay 409, left back contact of relay 413, conductor 632, right back contact of relay 602, conductor 421, right back contact of relay 403, inner right front contact of relay 414 to the winding of relay 415 and battery. Relay 415 locks to ground over conductor 531, connects ground to conductor 1224 to block the progress of the test and lights lamp 519 to indicate that the pulse is too short. If the pulse is sufficiently long, the operation of relays 409 and 413 opens the operating circuit for relay 414 before relay 403 is released, and relay 415 cannot operate.

When timing contact 500 opens, relay 400 releases, closing a circuit from ground at the outer left front contact of relay 1032, right back contact of relay 1022, back contact of relay 400, conductor 1137, outer left front contact of relay 504, right front contact of relay 405, conductor 426, left back contact of relay 415, right front contact of relay 413 to battery through the winding of relay 503. With relay 503 operated, a circuit is closed from ground over the outer right front contact of relay 503, conductor 530, brush 1004 in position 12, and thence to the back contact and winding of magnet 1005 and battery, advancing the test selector 1000 to position 13.

If no charge has been received by the time that relay 400 is released, relays 410, 403, 404 and 405 will not have been operated and the circuit above traced extends from the outer left front contact of relay 504, to the inner left back contact of relay 404 and the winding of relay 510 and battery. Relay 510 locks over its left front contact, conductor 531, seventh left back contact of relay 1022 to grounded conductor 1426. Relay 510 at its inner right contact grounds conductor 1224 to operate relay 1410 and block the progress of the test and at its outer right contact lights lamp 522 to indicate that no charge had been received.

If relays 410 and 403 operate prior to the operation of relay 504 a circuit is closed in parallel with the circuit for relay 404 over the right back contact of relay 504, conductor 532, inner left back contact of relay 100, conductor 119, winding of relay 511 and battery. Relay 511 is also operated if relays 410 and 403 are reoperated, while relay 504 is operated, in a circuit which extends as before to the left front contact of relay 403, outer left front contact of relay 405, conductor 532 and thence as above traced to the winding of relay 511 and battery. Relay 511 locks to conductor 531, grounds conductor 1224 to block the progress of the test and lights lamp 523 to indicate an overcharge.

The advance of test selector 1000 to position 13 as above described, opens the circuit of relay 1113 which releases, in turn disconnecting ground from conductors 1125, 1126 and 1127, releasing relays 504 and 413. Relay 504 in turn opens the locking circuit of relays 405 and 404 and the operating circuit of relay 503 thereby restoring these relays to normal. When all of these relays have released, a circuit is closed from battery through the winding of magnet 1005 and its back contact, thence to brush 1004 in position 13, conductor 1054, middle right back contact of relay 1105, conductor 1131, upper normal contact of key 616, conductor 633, outer left back contact of relay 504, right back contacts of relays 414, 405 and 404, left back contact of relay 503, outer right back contact of relay 413, conductor 424, left back contacts of relays 604 and 603, conductor 634, inner right back contact of relay 111, conductor 121, brush 1002 in position 13 to grounded conductor 1426. Test selector 1000 is advanced to position 14 by the operation of magnet 1005 in this circuit.

With switch 1000 in position 14, lamp 1014 is lighted and magnet 1005 is reoperated in a circuit from battery through the winding of magnet 1005 and its back contact, to brush 1004 in position 14, conductor 1055, left back contact of relay 1115, outer right back contact of relay 1106, right back contact of relay 1101, conductor 1130, brush 1001 in position 14, to ground over conductor 937. Test selector 1000 is advanced to position 15, where lamp 1011 is lighted.

With key 416 normal, test selector 1000 is immediately advanced to position 16 over a circuit extending from battery through the winding of magnet 1005 to brush 1004 as previously traced, fifteenth terminal of brush 1004, conductor 1056, outer left back contact of relay 1106 to ground at the right normal contact of key 416.

If it is desired to test the junctors for the correct measurement of an overtime period and the application of overtime charge, key 416 is operated and the test selector remains in position 15.

In this position relay 1113 is reoperated. Timer 500 measures off the correct time interval after which relay 400 is operated and the charge testing circuit is prepared for receiving the first overtime registration. As above, relay 511 is operated if the registration is made prematurely, relay 503 if the registration is made accurately and relay 510 if the charge is not received. The length of the pulse is again tested by relays 409, 413 and 415. Relay 503 advances switch 1000 to position 16.

Test switch 1000 is advanced from position 16 by ground connected to the sixteenth terminal of brush 1004. When the test selector reaches position 17, a circuit is closed from battery through the winding of relay 1021, brush 1001 in position 17, to grounded conductor 937. Relay 1021 operates in this circuit locking over its inner left front contact, fifth left back contact of relay 1022 to grounded conductor 1426. With relay 1021 operated, the circuit of relay 1806 is opened at the back contact of relay 1021. However, a parallel path extending from conductor 1123 through resistance 332 to conductor 1046 is maintained, but the resistance in this circuit reduces the current through relay 1806 to its release test value.

At the same time relay 1021 connects ground to the seventeenth terminal of brush 1004 completing a circuit for advancing the test selector 1000 to position 18 where lamp 1015 is lighted. Test selector 1000 is advanced from position 18 to position 19 in a circuit from battery through the winding of magnet 1005, to brush 1004 in position 18 as previously traced, conductor 1059, outer left back contact of relay 328, outer right back contact of relay 1020 to ground.

In the district junctor circuit, the release of relay 1806 opens the circuit of relay 1809 which also releases after an interval. Relay 1809 opens the circuit of relay 1811, and disconnects ground from the holding conductor 1787 thereby also opening the locking circuit for relay 1800. Relay 1800 is also slow to release in order to mark the sleeve of the outgoing trunk circuit for a brief interval after relay 1809 has opened the circuit through relay 1811, so that the trunk cannot be reselected for another call too soon. When relay 1800 releases it releases relays 1812 and 1822 and also disconnects ground from conductor 1328, thereby opening the locking circuit for hold magnets 1305, 1308, 1310 and 1315, releasing the switches connecting this junctor with the test line. The release of relay 1822 causes the charge timer to restore to normal. When relays 1809 and 1800 restore, battery through resistance 1818 is again connected to conductor 1827 to mark the district selectable.

With the test selector 1000 in position 19, the release of the district junctor is awaited with lamp 1016 lighted. It will be remembered that relay 1031 locked to the originating sleeve conductor 1787 of the district junctor, relay 1112 was locked under the control of relays 1100 and 1116 to the test line sleeve conductor 1324, while relay 1116 was locked under the control of relay 1112. Therefore when ground is removed from these originating and terminating sleeve conductors by the district junctor, relays 1031, 1112 and 1116 release and close a circuit from battery through the winding of magnet 1005, as before to brush 1004 in position 19, conductor 1057, lower normal contacts of keys 620 and 621, conductor 635, right back contact of relay 1116, left back contact of relay 1031 to ground. Test selector 1000 advances to position 20 in this circuit.

When test selector 1000 reaches position 20, it signals the completion of the test to the multitest switch 900 by connecting ground from conductor 937, over brush 1001, in position 20, right winding of relay 933 and battery. The operation of relay 933 closes a circuit from battery through the winding of magnet 906 and its back contact, left front contact of relay 933 through the closed contact of key 912 corresponding to the test just completed, brush 903 in position 1, closed right contact of any subsequent test key, conductor 1442, outer left front contact of relay 1409, contact of key 1402, conductor 1434, to ground at the middle right contact of relay 322. Multitest switch 900 is advanced to position 2 in this circuit and in this position a circuit is closed from battery through the winding of relay 935, brush 901 in position 2, to grounded conductor 1428. Relay 935 at its right back contact opens the circuit over which the district junctor is given the busy test. At its left front contact relay 935 closes a circuit from ground over the right front contact of relay 933 to the winding of message register magnet 930 to indicate the completion of one single test. The message register in operating closes a circuit from ground at the outer left front contact of relay 931, contact of meter 930, left back contact of relay 934 to battery through the winding of relay 1413.

The operation of relay 1413 opens the circuit of relay 1419 which disconnects ground from the locking circuit of relay 1023 and causes that relay to release. The release of relay 1023 connects ground at its left back contact to the strapped off-normal contacts of brush 1003 and over brush 1003 to the back contact and winding of magnet 1005 thereby advancing test selector 1000 to position 21. With the test selector in position 21, a circuit is closed from battery through the winding of relay 1022, brush 1002 in position 21 to ground over conductor 1426. The operation of relay 1022 releases all of the relays which have been locked up in the test circuit, including relay 1032. The release of relay 1032 closes a circuit from ground at its middle left back contact, brush 1004 in position 21, and thence to the winding of magnet 1005 and battery. The test selector is restored to normal in this circuit, releasing relay 1022 to prepare the locking circuits for use in the next test.

The advance of test switch 1000 also opens the operating circuit for relay 933 which now releases, closing a circuit from battery through the winding of magnet 906 and the back contact of that magnet, left back contact of relay 933, brush 903 in position 2, closed contact of one of the test class keys, conductor 1442, outer left front contact of relay 1409, normal contact of key 1402, conductor 1434 to ground at the middle right contact of relay 322. The release of relay 933 in turn releases meter 930 and relay 1413. With relay 1413 normal, the district junctor is again tested for a busy condition.

*Free call test*

Assuming that key 917 is operated, switch 900 will remain in position 3 until the corresponding test has been completed. With switch 900 in position 3 a circuit is closed from ground over brush 905, conductor 938, right back contact of relay 328, conductor 335, winding of relay 505 and battery. A circuit is also closed from grounded conductor 937, over brush 904 in position 3, conductor 939, winding of relay 113 and battery. Relay 113 controls the dialing of a designation which will indicate to the marker that no charge is to be made by the district junctor.

The test class switch in position 3 prepares for a test call in which the district junctor will complete a connection without operating the subscriber's message register. Under these conditions the test call proceeds as above described until test switch 1000 reaches position 12. In this position, with relay 1113 operated as previously described, a circuit is closed from grounded conductor 1125, middle left front contact of relay 1111, outer left front contact of relay 1108, third right back contact of relay 1106, conductor 1128, middle left front contact of relay 505, winding of relay 502 and battery. Relay 502 closes a circuit from battery through the winding of relay 116, right back contact of relay 114, conductor 223, outer left front contact of relay 502, conductor 1222, right contact of interrupter 1220, conductor 1121, inner left front contact of relay 502, back contacts of relays 106 to 110, 214, 215, 219 and 218 to ground. Relays 114, 115 and 116 function as previously described but under the control of interrupter 1220 to operate the counting relays 101 to 106. The operation of relay 106 disconnects ground from interrupter 1220 and extends it over the upper front contact of relay 106, conductor 530, brush 1004 in position 12 and thence to the winding of magnet 1005, advancing the test switch 1000 to position 13. This series of operations provides sufficient time for the reception of a false registration which would result in the operation of overcharge relay 511, in turn operating relay 1410 to block the test.

In the district junctor the operation is the same as previously described except that the marker does not operate relay 1822. Therefore the operation of relay 1812 is ineffective to operate relay 1817 to start the timer or to close the metering circuit.

Relay 505 in operating opens the operating circuit for relay 501 and therefore the operating circuit for relay 400. With relay 400 non-operated, relay 504 cannot operate. Therefore, assuming that no charge is received to cause the operation of relays 404, 405, etc., the test selector 1000 will be advanced immediately from position 13 over the circuit previously traced for advancing the test switch 1000 from this position.

The advance of the test switch 1000 to position 20 is the same as described for the previous test.

*Operator call*

With test selector 1000 in position 20, ground is again connected to the winding of relay 933 causing test class switch 900 to advance to position 5. In advancing from position 3, the circuit of relay 113 is opened. With brush 904 in position 5, the operation of relay 1419, following connection with the district junctor again grounds conductor 937 thereby completing a circuit over brush 904 in position 5, conductor 940, winding of relay 111 and battery. Relay 111 prepares a dialing circuit for transmitting a code to the sender which will represent a call to an operator's position.

For the operator class of test call with switch 900 in position 6, a circuit is closed from ground over brush 905, conductor 942, through the winding of relay 1101 to battery. Relay 1101 opens the circuit for operating relay 1115.

In the junctor circuit, while relay 1805 is operated, the marker operates relay 1802 to indicate that the call is to an operator's position. Relay 1802 locks over its inner right front contact to conductor 1323 and, after relay 1800 operates to the outer right contact of relay 1800. Relay 1802 also opens the locking circuits of relays 1820 and 1823 to prevent a charge being made. When the marker and sender release, relay 1800 connects the incoming tip and ring conductors 1319 and 1320 over the fourth and third left contacts of relay 1800, second left and right front contacts of relay 1802, to the outgoing tip and ring conductors 1326 and 1327.

In the test circuit, the incoming tip and ring conductors extend as previously traced over the back contact of relay 1115. The outgoing tip and ring conductors extend as traced over the back contacts of relay 1111 to battery through the winding of relay 1100 and ground, respectively. If the connection through the junctor is complete, relay 1100 operates, locking through its right winding to ground over the second left contact of relay 1022 and conductor 1426. When relay 1100 operates, it closes a circuit from battery through the winding of relay 1035, middle right front contact of relay 1101, outer right front contact of relay 1100, conductor 1132, to ground at the middle left front contact of relay 111. With relay 1035 operated, ground from conductor 1426 over the innermost left contact of relay 1022, inner left back contact of relay 1021, left front contact of relay 1035 is connected to conductor 1058 to hold the connection with the district junctor and to hold relay 1800 of the junctor operated in simulation of the operator's cord.

With relay 1101 operated, ground over the inner left front contact of relay 1101 is connected over conductor 1133 to the strapped contacts of brush 1004 in positions 5 to 7 over the inner left back contact of relay 1024 and directly to the contacts of brush 1004 in positions 4 and 8 to 11, thereby advancing the test selector through the positions for making the supervisory relay tests. Test switch 1000 is advanced out of position 12 under the control of interrupter 1219, the circuit extending from the winding of magnet 1005, middle right front contact of relay 1023, conductor 1040, interrupter 1219, auxiliary contact of jack 1200, conductor 1226, over the fourth right front contact of relay 111, conductor 122 to brush 1002 in position 12 and grounded conductor 1426. A similar circuit extending over the third right front contact of relay 111 and conductor 121 to brush 1002 in position 13 advances switch 1000 to position 14.

With switch 1000 in position 14, a circuit is closed from battery through the winding of relay 1209, conductor 1227, outer right front contact of relay 1101, conductor 1130, brush 1001 in position 14 to grounded conductor 937 causing relay 1209 to operate. Relay 1209 connects ground over its inner right front contact to interrupter 1220. Relays 1214, 1215, 1216, 1217 and 1218 operate in succession under the control of interrupter 1220. When relay 1216 operates, relay 1213 operates over the inner left front contact of relay 1216 and the middle left front contact of relay 1209.

When relay 1213 operates, the top point of varistor 1204 is connected over the outer right front contact of relay 1213, outer right back contact of relay 1212 to the ring conductor of the test line. Relay 1206 is connected over the inner and middle right front contacts of relay 1213 to the side terminals of varistor 1204. At its middle left front contact relay 1213 connects ground to one side of the alternating current power supply and at its inner left front contact connects the other side of the power supply to the lower point of the varistor 1204. Between the operation of relay 1213 and the operation of relay 1217 the current applied to the test line tests for false grounds or crosses on the circuit which may be traced from the ring conductor of the test line, through the cross-points 1306, 1309, 1312 and 1317, conductor 1327, outer right front contact of relay 1802, third left front contact of relay 1800, conductor 1320, and thence as previously traced through the test circuit with relay 1115 unoperated to tip conductor 1319, outer left front contact of relay 1800, outer left front contact of relay 1802, conductor 1326, tip contacts of crosspoints 1317, 1312, 1309 and 1306, to the tip conductor of the test line, inner right back contact of relay 1212, outer left front contact of relay 1213, outer right front contact of relay 1209, to the inner left contact of relay 1217. When relay 1217 operates, ground is connected to this circuit thereby operating relay 1206.

If relay 1206 operates before relay 1217, ground will be connected over the front contact of relay 1206 to the winding of relay 1208 and battery. Relay 1208 in operating connects ground over its front contact and the outer right back contact of relay 1217, outer left front contact of relay 1216, to conductor 1224 to operate relay 1410 and block the test. If relay 1206 fails to operate, no circuit is closed for advancing test switch 1000 and the test circuit remains in position 14 indicating that the test line is open. With relay 1217 operated, the operation of relay 1206 operates relay 1208 which, in turn, closes a circuit over the front contact of relay 1208, outer right front contact of relay 1217, inner left front contact of relay 1209 to conductor 1226, grounding interrupter 1219 to step switch 1000 to position 15. Switch 1000 is advanced to position 17 in the manner previously described after which the test continues as in the previous test, since no charge should be made.

When test switch 1000 reaches position 20, ground is again connected to the winding of relay 939, causing the advance of the test class switch 900 to position 7.

*Abandoned call*

In advancing from position 5, the circuit for relay 111 is opened causing that relay to release. When relay 1419 reoperates to ground on conductor 937, the operating circuit for relay 113 is reclosed thereby again indicating to the marker that no charge is to be made for this call. In this position the district selector is tested for its ability to be released by a signal from the sender due to the abandonment of the call after the complete code has been dialed.

For this test, with switch 900 standing in position 7 ground is connected over brush 905 in position 7, conductor 944, to the winding of relay 1024 and battery. Relay 1024 closes an obvious circuit for relay 1020. The closure of the dialing circuit and the dialing of the free call code take place as previously described. With relay 1024 operated, the ring conductor of the test line is opened at the inner right back contact of relay 1024 so that a sender cannot be satisfied and dismissed following the selection of the test line. With switch 1000 in position 3, relay 1112 is operated as previously described, locking in a circuit from battery through its left winding and inner left front contact, conductor 1134, inner left front contact of relay 1020, outer left back contact of relay 1021 to ground at the outer right front contact of relay 1023. Relay 1112 connects relay 1116 to the sleeve of the first test line as on regular tests. When relay 1116 operates, it connects ground to interrupter 1220 and the test made with relays 1213 to 1218 is made as previously described. When relay 1218 operates it closes a circuit from the sleeve conductor of the second test line, conductor 1324, outer left front contact of relay 1116, outer right front contact of relay 1112, conductor 1135, outer left front contact of relay 1218, conductor 1229, inner right front contact of relay 1020 to the right winding of relay 1112 and battery. Thereby relay 1112 is locked to the sleeve of the test line. Relay 1218 also closes a circuit from ground at its outer right front contact, conductor 1060, third right front contact of relay 1024, brush 1004 in position 3 and thence to the winding of magnet 1005 and battery, advancing switch 1000 to position 4.

Relay 1024 connects ground over its outer left front contact to the terminal of brush 1004 in position 4 thereby immediately advancing switch 1000 to position 5. In positions 5 and 6 of switch 1000 a circuit is closed from battery through the winding of magnet 1005, middle right front contact of relay 1023, second right front contact of relay 1024, interrupter 1025, brush 1001 in positions 5 and 6 to grounded conductor 937. In position 7 this circuit extends from interrupter 1025 over the inner right front contact of relay 1024 to brush 1001 in position 7. Therefore, switch 1000 is advanced through positions 5 to 7 under the control of interrupter 1025 to insure that the sender has been connected to the marker before registering disconnect in the sender. With relay 1024 operated, ground is connected over the outer left front contact of relay 1024 to the terminals of brush 1004 in positions 8 to 11 and over the outer left front contact of relay 1020 to the terminal of brush 1004 in position 12. Therefore switch 1000 is immediately advanced to position 13. In position 13, since no charge has been made, the charging relays are normal and the circuit, previously traced for indicating their return to normal, now serves to advance switch 1000 to position 14. Switch 1000 is moved to position 15 by ground over key 416 and from position 16 by ground directly connected to the terminal of brush 1004.

In position 17 relay 1021 is operated over brush 1001 and grounded conductor 937. Relay 1021 locks over its inner left front contact, fifth left contact of relay 1022 to grounded conductor 1426. With relay 1021 operated, the dialing circuit leading to the sender is opened, causing the sender to release. Relay 1021 also connects ground to brush 1004 in position 17, advancing switch 1000 to position 18.

Under these conditions the sender first disconnects ground from conductor 1323 to permit relays 1823, 1822 and 1802 to release if previously operated by the marker and then connects battery to conductor 1323, completing a circuit over the inner right back contact of relay 1802, right back contacts of relays 1823, 1822 and the left winding of relay 1813 to ground. Relay 1813 operates in this circuit.

Relay 1813 disconnects ground from conductor 1787, which would release the line link switches in a service connection and in the present case opens the holding circuit of relay 1031 which releases and closes a circuit from ground at its left back contact, middle right front contact of relay 1020, outer left back contact of relay 328, conductor 1059, to brush 1004 in position 18 and thence to magnet 1005 and battery, advancing switch 1000 to position 19. The release of the district junctor advances switch 1000 to position 20 as before.

With test switch 1000 in position 20, ground is connected to the winding of relay 933 which functions as previously described to advance test class switch 900 to position 9. In this position relay 113 is reoperated and a test is made of the condensers included in the talking circuit of the district junctor.

*Condenser test*

For the test of the condensers in the talking circuit of the district junctor, with the test class switch 900 in position 9, lamp 924 is lighted over brush 901 and grounded conductor 1428 and relay 113 is operated to indicate to the marker that no charge is to be made. A circuit is also closed from ground over brush 905 in position 9, conductor 943, winding of relay 1105 and battery. Relay 1105 causes test switch 1000 to advance through positions 4 to 11 by connecting ground over its third left front contact to conductor 1133, thereby grounding the terminals of brush 1004 in positions 4 and 8 to 11 directly and in positions 5 to 7 over the inner left back contact of relay 1024.

When switch 1000 reaches position 12, relay 1113 is operated as before, grounding conductor 1125 and completing a circuit over the right front contact of relay 1105, to the winding of relay 1207 and battery. Relay 1207 operates in this circuit locking over its inner right front contact, outer left back contact of relay 1021 to ground at the outer right front contact of relay 1023.

The operation of relay 1207 lights lamp 1019 and connects the tip conductor of the test line over the inner right back contact of relay 1212, outer left back contact of relay 1213, middle right front contact of relay 1207, inner left back contact of relay 1205 to the winding of relay 1208 and connects the ring conductor of the test line over the outer right back contact of relay 1212, outer right back contact of relay 1213, outer right front contact of relay 1207, inner right back contact of relay 1205 to the winding of relay 1208 and battery.

With relay 1207 operated, the incoming tip conductor of the district junctor which extends as previously traced to conductor 1436, is connected over the outer left back contact of relay 1212, outer left front contact of relay 1207, to the alternating current power supply, while the ring conductor which extends to conductor 525 as previously traced is connected over the inner left back contact of relay 1212, third left front contact of relay 1207 and the middle left back contact of relay 1205 to the alternating current supply. At the district junctor the outgoing tip and ring conductors are connected together through the winding of relay 1811 but the tip conductor 1326 is connected over the third left back contact of relay 1802, second left front contact of relay 1800 through condenser 1803 to the left winding of relay 1806 and battery, while the ring conductor 1327 is connected over the third right back contact of relay 1802, inner right front contact of relay 1800, through condenser 1801 to the right winding of relay 1806 and ground. Therefore, if either condenser 1801 or 1803 is short-circuited relay 1208 will operate.

The completion of these circuits holds relay 1806 operated, preventing the disconnection of the district junctor circuit. If relay 1208 is not operated, a circuit is closed from ground over the back contact of relay 1208, second left front contact of relay 1207, outer right back contact of relay 1205, conductor 1226, normal contact of jack 1200 to interrupter 1219, which is connected over conductor 1040 and the middle right front contact of relay 1023 to the winding of magnet 1005 and battery. Therefore, the test switch 1000 advances through positions 12 and 13 under the control of interrupter 1219. In position 14 a circuit is closed from battery through the winding of relay 1205, inner left front contact of relay 1105, conductor 1130, brush 1001 in position 14 to ground over conductor 937. Relay 1205 locks over its middle right front contact, conductor 1228, fourth left back contact of relay 1022 to grounded conductor 1426. With relay 1205 operated ground is disconnected from interrupter 1219 and switch 1000 remains in this position.

The operation of relay 1205 disconnects the incoming tip and ring conductors from each other and connects them to opposite sides of the alternating current power supply. The operation of relay 1205 also disconnects the test line tip and ring conductors from relay 1208 and connects them to the top and bottom, respectively, of the varistor 1204, across which relay 1205 connects relay 1206. If the condensers are in satisfactory condition relay 1206 operates under these circumstances. The operation of relay 1206 closes an obvious circuit for relay 1208 which closes a circuit from ground over the front contact of relay 1208, right back contact of relay 1217, left back contact of relay 1216, outer left front contact of relay 1105, conductor 1055, brush 1004 in position 14 and thence to the winding of the stepping magnet 1005 and battery to advance switch 1000 to position 15. Positions 15 and 16 are passed by in response to ground connected to conductor 1056 over the outer left back contact of relay 1106, conductor 1132 and the second left front contact of relay 1105 and ground connected directly to the terminal of brush 1004 in position 16.

The advance of switch 1000 to position 20 takes place as described for the free call.

When test selector 1000 reaches position 20, ground is connected to the winding of relay 939 which functions to advance test class switch 900 to position 11. Relay 113 is again operated and the circuits are arranged to test the automatic release feature of the district junctor.

*Automatic release test*

For this test switch 900 is in position 11, free call relay 113 is operated and relay 1106 is operated over conductor 1136 and brush 905 in position 11.

In this test the district junctor circuit is tested for its ability to release the calling subscriber's line when the called subscriber disconnects with the calling subscriber's receiver off the switch-hook. Under this condition, the district junctor circuit should open the originating sleeve in four minutes or less.

In the district junctor circuit during a service connection relay 1806 is operated under the control of the calling line and relay 1811 under the control of the called line. If the called subscriber has answered for a time interval sufficiently long to cause relay 1812 to operate and then disconnects, but the calling subscriber fails to disconnect, the release of relay 1811 opens the locking circuit for relay 1813, connects ground over the back contact of relay 1811, middle left front contact of relay 1812 to interrupter 1825. When the interrupter 1825 closes its contact, relay 1824 operates, locking under the control of relays 1812 and 1811. After a two-minute interval interrupter 1826, which is carried on the same shaft as interrupter 1825, closes its contacts, completing a circuit from ground over the interrupter contact, right front contact of relay 1824, right back contact of relay 1813, inner right front contact of relay 1812 to the winding of relay 1802 and battery. When relay 1802 operates, it opens the locking circuit of relay 1800 and disconnects relay 1806 from the calling line, thereby releasing relay 1809 and disconnecting ground from the incoming sleeve conductor 1787 releasing the line link hold magnets. The release of relay 1809 also releases the outgoing connection through the district office switches.

In testing this function of the district junctor, the test proceeds as previously described through position 11 of the test switch 1000. In position 12, relay 1113 is operated to energize timer magnet 501. When contact 500 closes, relay 400 operates and operates relay 1107 which locks and causes the operation of relay 1811. The operation of relay 1107 closes a circuit from magnet 1005 over brush 1004 in position 12, conductor 530, inner left front contact of relay 1107, inner left front contact of relay 1105, inner left back contact of relay 1033, conductor 1053, right front contact of relay 400, right back contact of relay 1022 to ground at the outer left front contact of relay 1032. Switch 1000 advances to position 13 from which it is advanced to position 14 by the normal closure of the charge test circuits as previously traced. When relay 400 releases in response to the opening of timer contact 500, a circuit is closed from magnet 1005 over brush 1004 in position 14, conductor 1055, outer left back contact of relay 1105, outer right front contact of relay 1106, conductor 1137, right back contact of relay 400, right back contact of relay 1022 to ground at the outer left front contact of relay 1032. Switch 1000 advances to position 15, where a circuit is closed from battery through the winding of relay 1033, inner right front contact of relay 1106, brush 1002 in position 15, to ground over conductor 1426. Relay 1033 operates and locks over its inner left front contact, sixth left contact of relay 1022 to grounded conductor 1426. A branch of the operating circuit of relay 1033 extends to lamp 1018 to indicate that the test circuit is timing for automatic release of the district junctor. With relay 1033 operated, the circuit of relay 1811 is opened to start the automatic release of the district junctor. Relay 1033 prepares two circuits, one from the stepping magnet 1005, over brush 1004 in position 15, conductor 1056, outer left front contact of relay 1106, outer left front contact of relay 1033, right normal contact of key 1034, right back contact of relay 1031, inner right front contact of relay 1032, left back contact of relay 1021 to ground at the outer right front contact of relay 1023. The second circuit extends from battery through the winding of relay 1410, conductor 1224, inner left contact of key 1034, third left front contact of relay 1033, conductor 1053, right front contact of relay 400, right back contact of relay 1022, to ground at the outer left front contact of relay 1032. If the district junctor release arrangement works satisfactorily, the removal of ground from conductor 1787 will release relay 1031 and close the first of these circuits. If the release does not take place before the reoperation of relay 400, the second circuit is closed, operating relay 1410 to block the progress of the test. If the test switch 1000 is advanced, the test is completed as previously described.

*False automatic release*

As a variant of the previous test, a test may be made for false ground on the automatic release conductor 1836. To make this test the automatic release key 916 is operated, as well as key 1034. The test proceeds the same as on the regular automatic release test above described until relay 1033 is operated, and lamp 1018 lighted with test switch 1000 in position 15. With key 1034 operated, a circuit is prepared from battery through the winding of relay 1410, conductor 1224, right closed contact of key 1034, right back contact of relay 1031, inner right front contact of relay 1032, outer left back contact of relay 1021 to ground at the outer right front contact of relay 1023 to operate relay 1410 if relay 1031 releases prematurely. Relay 1033 and key 1034 prepare a circuit for advancing switch 1000 to position 15 which extends from brush 1004 in position 15, over conductor 1056, outer left front contact of relay 1106, inner left closed contact of key 1034, third left front contact of relay 1033, conductor 1053, right front contact of relay 400, right back contact of relay 1022 to ground at the outer left front contact of relay 1032. Relay 1033 at its inner right back contact disconnects ground from the tip conductor of the test line thereby releasing relay 1811 and closes a circuit from ground over conductor 1126, middle right front contact of relay 1106, inner right operated contact of key 1034, inner right front contact of relay 1033 to interrupter 1028 which controls relays 1027 and 1030. The first closure of interrupter 1028 operates relay 1030 which locks independent of the interrupter and closes a circuit for relay 1027 which is shunted as long as the contact of interrupter 1028 remains closed. When the interrupter 1028 opens its contact relay 1027 operates. At the next closure of interrupter 1028, relay 1030 is released but relay 1027 is held operated through the interrupter contact until the interrupter opens its contact, when relay 1027 also releases. This cycle of operations continues as long as ground is connected to interrupter 1030. Each time that relay 1028 operates, the circuit of relay 1811 is reclosed at the right front contact of relay 1030 which is in parallel with the back contact of relay 1033. When relay 1811 releases, it grounds interrupter 1825 and opens the locking circuit of relay 1813 which is effective if relays 1814 and 1815 are normal. If interrupter 1825 should happen to be closed at the moment that relay 1811 closes its back contact, relay 1824 will immediately operate and lock under the control of relay 1812 and relay 1811. When now interrupter 1028 closes its contact, relay 1811 reoperates, opens the locking circuit of relay 1824 which starts to release, but being slow acting does not do so immediately. The next closure of the contact of interrupter 1028 releases relay 1030 and, in turn, releases relay 1811 and recloses the holding circuit for relay 1824. Therefore, relay 1811 is caused to release and reoperate once a second. During the release of relay 1811, if there is a false ground on conductor 1836, the circuit previously traced for relay 1802 is closed from the false ground instead of waiting for the closure of interrupter 1826. Therefore, the district junctor is immediately released and ground is removed from conductor 1787. Under this condition relay 1031 releases, completing the circuit for relay 1410 above described. The operation of relay 1410 blocks the progress of the test.

If there is no such false ground on conductor 1836 the reoperation of relay 1810 releases relay 1824 before interrupter 1826 closes its contact and the test circuit awaits the closure of timer 500 to operate relay 400. When relay 400 operates it closes the circuit above traced for advancing switch 1000 to position 16 out of which it is immediately advanced by ground on the terminal of brush 1004.

In position 17 relay 1021 operates as previously described, makes the release test of district junctor relay 1806 and steps switch 1000 to position 18. When testing non-coin districts switch 1000 is advanced from position 18 through the back contact of relay 328 and relay 1020. The balance of the test is the same as on a regular automatic release test.

When test selector 1000 reaches position 20, ground is connected to the winding of relay 933 which functions to advance test class switch 900 to position 13. This position corresponds to the test of the control of the zone metering features of the district and since the district junctor under test is not equipped for zone metering, this test cannot be made thereon. Therefore, when switch 900 reaches position 13 a circuit is closed from ground at the middle right contact of relay 322, conductor 1434, normal contact of key 1402, outer left front contact of relay 1409, conductor 1442, right contact of zone key 910 which is operated since other district junctors are to be tested for this function, brush 903 in position 13, right back contacts of relays 320, 321, 315 and 316, outer left back contact of relay 318, outer right back contact of relay 323, back contact and winding of magnet 906 and battery. Switch 900 advances from position 13 in this circuit and from position 14 under the control of the back contact of relay 933.

In position 15 a circuit is closed from conductor 937, brush 904, conductor 941, back contact of relay 318, conductor 936 to the winding of charge relay 112. In this position the action of the district junctor in the charging of a call to the tip party on a party line is tested.

*Tip party charge*

This test is essentially the same as the test made in position 1 of switch 900. However, with brush 905 in position 15 a circuit is closed from ground over brush 905, conductor 945, inner right front contact of relay 322, to the winding of relay 401 and battery. Relay 401 reverses the connection of relays 509 and 508 to the metering conductors, at the same time transferring relay 410 to the tip party metering conductor. Relay 401 also connects ground from the inner right back contact of relay 1021, back contact of relay 1035, conductor 1062, outer right back contacts of relays 1207 and 1115, conductor 1139, inner left front contact of relay 401, conductor 427, resistance 512, conductor 1221, left back contact of relay 1207, outer left back contact of relay 1212, conductor 1436 and thence as previously traced to the tip conductor 1319 of the district junctor and through the sender link switches 1303 and 1304 to the sender to give the sender an indication of a tip party calling. The sender passes the information to the marker, which in turn operates relay 1823 in the district junctor. Relay 1823 locks, disconnects the metering circuit from conductor 1833 and connects it to conductor 1834, at the same time reversing the connection of ground to these metering conductors. Relay 1823 also provides an auxiliary holding circuit for relay 1822. With both metering and testing circuits associated with conductor 1834, the test proceeds as for the individual test.

When test selector 1000 now reaches position 20, relay 933 is again operated, advancing switch 900 to position 16. In this position relay 934 operates in a circuit from battery through the winding of relay 934, brush 901 in position 16, to ground over conductor 1428. At its inner left front contact relay 934 closes an obvious circuit for relay 935 which, in turn, closes a circuit for meter 930. With relay 934 operated, the closure of the contact of register 930 completes a circuit from ground at the left front contact of relay 931, front contact of meter 930, outer left front contact of relay 934, outer upper contact of key 1400, winding of complete test meter 1405, and battery. Meter 1405 in operating initiates the advance of the connection control circuit to another district. Meter 1405 closes a circuit from ground at its front contact, inner upper normal contact of key 1400, upper normal contact of key 1403, left winding of relay 1412 to battery. Relay 1412 closes a circuit from ground at its inner right contact, inner right contact of relay 934, to resistance 932 and battery in shunt of the winding of relay 931, thereby causing relay 931 to release. With relay 931 released ground is connected over the outer left back contact of relay 931, the seventeenth to twentieth terminals of brush 902, back contact and winding of magnet 906 to battery, thereby advancing switch 900 to position 21. As soon as the brush 901 leaves position 16, relay 934 releases closing a circuit from ground at its left back contact to the twenty-first terminal of brush 902 so that when the brush reaches position 21 it is immediately advanced to normal.

If one of the test class keys 910 to 917 is not operated, a circuit is arranged to pass that position without making the corresponding test. Suppose, for example, that key 917 is not operated, then when switch 900 reaches position 3 a circuit will be closed from battery through the winding and over the back contact of magnet 906, left normal contact of key 917, brush 903 in position 3, over the closed right contact of an operated key to ground over conductor 1442.

Relay 1412 when operated locks in a circuit from battery through its left winding and outer left front contact to ground at the left contact of relay 1408 and extends this locking ground over its inner left front contact to the winding of relay 1415 and battery. Relay 1415 in operating releases relay 1419 which, in turn, releases relay 1416 disconnecting the junctor just tested from the test circuits. Relay 1415 also closes a circuit from battery through the winding and back contact of magnet 1605, brush 1602 in position 1, conductor 1633, inner right front contact of relay 1415, right contact of start key 1422, left back contact of relay 1420 to ground at the right back contact of relay 1416. Switch 1600 advances to position 2 in this circuit. The advance of switch 1600 opens the circuit of hold magnet 1730 thereby disconnecting the test circuit from the district junctor of Fig. 18. When magnet 1730 releases it opens the circuit of relay 1408 in turn releasing relay 1412.

The release of relay 931 causes the release of registers 930 and 1405 thereby also opening the operating circuit for relay 1412. When relay 1412 is released it also releases relay 1415 thereby closing a circuit from battery through the winding and over the back contact of magnet 1605, brush 1602 in position 2, conductor 1634, back contact of relay 1408, inner left back contact of relay 1415, to ground at the outer right front contact of relay 1409. Switch 1600 advances to position 3 in this circuit. With switch 1600 in position 3 the No. 1 hold magnet of the series 1730 to 1739 is operated, connecting the test circuit with the next district junctor. With the corresponding cross-point closed, the conductors extending to the originating side of the next junctor are connected to the test circuit. The hold magnet also connects ground to conductor 1776 thereby operating relay 1408 to cause the start circuit to begin the busy test on the second district junctor circuit as heretofore described.

After the tenth district circuit has been satisfactorily tested and relay 1415 operates as above described, switch 1600 is advanced to position 19. In this position a circuit is closed from battery through the winding and over the back contact of magnet 1616, brush 1612 in position 1, brush 1603 in position 19, to ground at the front contact of relay 1606. Switch 1610 is advanced to position 2 in this circuit. The advance of brush 1613 from position 1 releases the select magnet 1720 restoring the corresponding horizontal row of cross-points from the selected condition. Magnet 1720 in turn releases relay 1606. The advance of switch 1600 releases relays 1408, 1412 and 1415 as previously described. Therefore, the release of relay 1606 closes a circuit from ground over its back contact, conductor 1635, right back contact of relay 1415, conductor 1443, brush 1602 in position 19, back contact and winding of magnet 1605 to battery. Switch 1600 advances to position 21 in this circuit. When switch 1600 has advanced, it closes a circuit from battery through the winding and over the back contact of magnet 1616, brush 1612 in position 2, brush 1604 in position 21 to ground, thereby advancing switch 1610 to the next working position. In this position the select magnet of the next level of crossbar switch 1700 is operated over brush 1613 and the operation of the select magnet in turn closes the circuit for relay 1606. With relay 1606 operated, as an indication that the next switch level has been prepared, a circuit is closed from ground over the contact of relay 1606, brush 1602 in position 21, back contact and winding of magnet 1605 to battery, thereby advancing brush 1600 to normal. The advance of switch 1600 to its first working position 1 is the same as described at the start of testing.

Switch 1610 is advanced from position to position as above described. With switch 1610 in position 19 select magnet 1729 is operated and with switch 1610 in position 1 hold magnet 1730 is operated, closing cross-point 1749 which connects the test circuit with the coin type district junctor of Fig. 7.

The test circuit now makes a complete set of tests of this district.

Coin district

As in the case of the district junctor of Fig. 18, the coin district junctor of Fig. 7 is marked idle by the presence of battery on conductor 732 to which it is connected over the normal contact of jack 716, outer left back contact of relay 726, third left back contact of relay 728, outer left back contact of relay 707, right back contact of relay 717, inner right back contact of relay 707, outer left back contact of relay 709 and resistance 708.

The test circuit tests for this battery before proceeding with the other tests. If this test is successful, relay 1036 is connected across conductors 1436 and 1437 which are extended over the front contacts of relay 1416 to conductors 1781 and 1782. The closure of cross-point 1749 connecting the test circuit to the district junctor circuit extends conductor 1781 to conductor 733 and the inner left back contact of relay 727, and conductor 1782 to conductor 734 and the inner right back contact of relay 727, and thence to the pulsing relay of the sender 1329 to which the junctor is connected under the control of link control circuit 1607 over link switches 1301 and 1302. When the connection with the sender 1329 has been completed, ground is connected to conductor 735, completing a circuit over the middle right back contact of relay 728, through the winding of relay 717 and battery. After the designation has been recorded in the sender 1329 the marker 1300 is summoned and controls the connection of the district junctor with the test line over cross-points 1306, 1309, 1311 and 1316. During the establishment of the connection with the test line the marker operates relay 729 by way of the sender link switches 1301 and 1302 and relay 729 locks over conductor 736 to ground in the marker through the district link. Relay 729 in operating connects ground over conductor 731 to the winding of select magnet 1313 of the primary district switches to which this junctor has access. It also extends conductors 738, 739 and 740 to the marker 1300.

After the marker has established the connection with the test line, it releases relay 729. Relay 729 in releasing connects conductor 741 over which the district and office switches are held, over the left back contact of relay 729 to ground at the outer left front contact of relay 717. The marker tests for this ground and on finding it, disconnects.

After the sender has completed its functions in establishing the connection, it connects ground to conductor 742, completing a circuit over the right back contact of relay 729 and the winding of relay 726 to battery. Relay 726 locks over the inner left back contact of relay 728 and the second left front contact of relay 726. Relay 726 also extends its locking ground over its inner right front contact to conductor 743 through resistance 731. With relay 726 operated, the tip conductor 733 is extended over the inner left back contact of relay 727, third right front contact of relay 726, inner right back contact of relay 728, outer right back contact of relay 727 to ground through the right winding of relay 730, while the ring conductor 734 is extended over the inner right back contact of relay 727, fourth right front contact of relay 726, second left back contact of relay 728, second left back contact of relay 727, to battery through the left winding of relay 730. Relay 730 closes a circuit from ground at the inner left front contact of relay 717, front contact of relay 730, to conductor 735 to hold the outgoing connection and over the middle right back contact of relay 728 to the winding of relay 717 to hold that relay operated. Relay 726 in operating also connects the ring of the test line which extends through the cross-points to conductor 745, outer left back contact of relay 728, outermost right front contact of relay 726, winding of relay 719, winding of coil 718, right front contact of relay 717, inner left front contact of relay 726, outer right back contact of relay 728, conductor 744, which in turn is connected through the cross-points to the tip conductor of the test line. The test circuit makes the alternating current test of the test line, and tests incoming supervisory relay 730 in the same manner in which it tested relay 1806. This test is followed by a test of the outgoing supervisory relay 719.

When relay 719 is operated it connects ground over its front contact, outer right back contact of relay 720, to conductor 746. The interrupter relays 713 and 714 operate and release in synchronism with the contacts of interrupter 715. When interrupter 715 connects ground to conductor 748, relay 713 operates over the back contact of relay 714 and connects conductor 746 over its upper front contact to the right winding of relay 723 and battery. Relay 723 locks directly to conductor 746 independent of the interrupter relays. When the interrupter 715 opens its contact relay 713 releases. Two seconds later interrupter 715 connects ground to conductor 747 operating relay 714 over the back contact of relay 713. Relay 714 connects ground from conductor 746 over its lower front contact, left front contact of relay 723, second right back contact of relay 707, outer left back contact of relay 706, normal contact of charging timer 704, outer right back contact of relay 706, third right back contact of relay 727, to the winding of relay 721 and battery. Relay 721 operated, locks over the third right back contact of relay 727, to ground at the fourth right front contact of relay 721. It also provides an auxiliary holding circuit for relay 726 which may be traced from battery through the winding of relay 726, outer right back contact of relay 729 to ground at the third right front contact of relay 721. In addition, it closes a circuit from battery through the winding of magnet 704 which controls the coin timer, inner left front contact of relay 721, second right back contact of relay 727, to ground at the inner left front contact of relay 717.

When magnet 704 operates, it causes the timer to engage with the drive shaft which is driven by a telechron motor 700 and furnishes the driving power for a plurality of district junctor circuits. The coin timer then proceeds to move off normal.

In the test circuit relay 325 is operated over the group relay and the brush 1614, since relay 325 corresponds to a district junctor of the type shown in Fig. 7 which gives overtime service. With relay 325 operated, relay 328 is operated to modify the test circuits. With relay 328 operated, when the test switch 1000 reaches position 12, operating relay 1113, a circuit is closed from battery through the winding of relay 515, conductor 538, second right front contact of relay 328, conductor 536, outer left front contact of relay 1111 to ground over conductor 1126.

With relay 515 operated, the tip conductor of the test line may be traced over the inner right back contact of relay 1212, outer left back contact of relay 1213, inner right back contact of relay 1207, inner right back contact of relay 1209, middle right front contact of relay 1111, right back contact of relay 1102, inner right back contact of relay 1033, conductor 1050, back contact of relay 329, outer left back contact of relay 404, outer right back contact of relay 403 to ground at the right back contact of relay 408. The ring conductor of the test line may be traced over the outer right back contact of relay 1212, outer right back contact of relay 1213, middle right back contact of relay 1207, outer left back contact of relay 1209, conductor 1225, inner right back contact of relay 1024, conductor 1045, outer right front contact of relay 1111, outer left back contact of relay 1102 to battery through resistance 1103. With relay 515 operated, the incoming tip conductor from the district junctor which extends through the connecting circuits from conductor 733 to conductor 1436 is extended over the outer left back contact of relay 1212, outer left back contact of relay 1207, conductor 1221, inner left front contact of relay 515, conductor 539, middle right back contact of relay 1033, conductor 639, upper normal contacts of keys 625 and 624, inner right back contact of relay 505, winding of relay 507, resistance 506, outer right back contact of relay 505, normal contact of key 619, right back contact of relay 603, conductor 531, seventh left back contact of relay 1022 to grounded conductor 1426. Relay 507 is also connected to the outgoing ring conductor in a circuit which extends as previously traced from the ring conductor 734 of the district junctor to conductor 1437, inner right front contact of relay 515, left back contact of relay 602, middle left back contact of relay 1021 to conductor 539 and thence as above traced to the winding of relay 507 and to ground.

With relay 515 operated, resistance 514 is included in the circuit of the upper winding of relay 409 and resistance 513 is included in the circuit of the lower winding of relay 409 in order to change the time required to operate this relay to a value suitable for measuring the application of the coin current.

If the ability of the district junctor to handle overtime service is not to be tested, that is with key 416 normal, collection takes place following the release of the incoming supervisory relay 730.

With key 416 normal, the operation of relay 1113 closes a circuit from battery through the winding of relay 502, conductor 535, left normal contact of key 416, inner right and outer left contacts of relay 325, inner right back contact of relay 326, conductor 529, inner left back contact of relay 505, conductor 1128, third right back contact of relay 1106, outer left front contact of relay 1108, middle left front contact of relay 1111 to grounded conductor 1125. Relay 502 functions, as previously described, to measure a time interval by operating relays 101 to 106 under the control of interrupter 1219. When relay 106 operates it closes a circuit from ground over the back contacts of relays 218, 219, 215, 214, 110, 109, 108 and 107, upper front contact of relay 106, conductor 530, brush 1004 in position 12, to magnet 1005, thereby advancing switch 1000 to position 13. Switch 1000 is advanced from position 13 by the circuit which tests the normal condition of the charge testing relays. It is advanced from position 14 over conductor 1055, as previously described, from position 15 by ground on the right normal contact of key 416 and from position 16 by direct ground on the terminal of brush 1004.

In position 17 relay 1021 is operated over brush 1001 and locks. Relay 1021 advances switch 1000 to position 18 and reduces the current in the circuit of relay 730 to the release value.

The release of relay 730 opens the circuit of relay 717 which releases, opening the circuit of relay 719 and closing a circuit from battery through resistance 708, left back contact of relay 709, inner right back contact of relay 707, right back contact of relay 717, outer left back contact of relay 707, second right front contact of relay 721, outer left front contact of relay 726, to the right winding of relay 709 and ground. Relay 709 locks over its inner right front contact, third right back contact of relay 707 to resistance 705 and battery. At its inner left contact it connects ground to conductor 754, which extends over the third left back contact of relay 727 and the left back contact of relay 729 to conductor 741 to hold the outgoing end of the connection and in parallel therewith over the second and first right front contacts and winding of relay 726 to hold that relay operated.

Relay 709 connects battery through resistance 708 over the outer left front contact of relay 709, outer left front contact of relay 721 to conductor 749 to operate the line register. Relay 709 also connects ground over its middle right front contact, middle left back contact of relay 707 to conductor 750 to seize the coin control supervisory circuit of Fig. 8.

The connection of ground to conductor 750 operates relay 804 which passes its operating ground to the upper winding of relay 805. Relay 805 closes a circuit for relay 806 over the back contact of relay 803. Relay 804 connects conductors 810 and 811 together thereby preparing a circuit from battery through the winding of relay 630, conductor 810, front contact of relay 804, conductor 811, armature of relay 1750, conductor 1773, rush 1615, conductor 1636 to ground at the uppermost right front contact of relay 515. Relay 806 connects conductors 808 and 809 together which prepares a circuit from battery through the winding of relay 628, conductor 808, front contacts of relays 806 and 805, conductor 809, front contact of relay 630, conductor 638, brush 1604 to ground.

When the connection of the coin supervisory circuit is established ground is connected to conductor 812, closing a holding circuit for relay 709 to battery through its left winding and an operating circuit for relay 707 over its left normal contact and through its winding to battery. Relay 707 in operating locks over its inner and middle left front contacts to ground at the middle and outer right contacts of relay 709. Relay 707 also closes a circuit from ground at its inner right contact, right back contact of relay 717, outer left front contact of relay 707, to the winding of relay 728 and battery. Relay 728 locks over its inner left front contact, to ground at the second left front contact of relay 726 and opens one holding circuit for relay 726. Relay 707 disconnects ground from conductor 750.

With relay 721 operated ground is connected to conductor 751 to tell the coin circuit that the coin is to be collected. In addition, when the coin supervisory circuit is ready to collect the coin it connects ground to conductor 813, closing a circuit for relay 727 which operates. Relay 727 opens the circuit of relay 721 and that relay releases. It also connects the tip and ring conductors 733 and 734 of the subscriber's line, over its inner right and left contacts to conductors 814 and 815, leading to the coin supervisory circuit, disconnecting relay 730 from conductors 733 and 734. Relay 727 also disconnects ground from conductor 741, releasing the district and office switches.

When the coin supervisory circuit has applied coin collect battery over conductors 814 and 815 it releases relays 727 and 709 and then releases.

The release of relay 709 in turn releases relays 707 and 726 and disconnects ground from conductor 743. With relay 726 released, relay 728 also releases.

In the test circuit, the operation of relay 507 closes a circuit from grounded conductor 937, brush 1001 in position 18, conductor 1126, right contact of relay 410, left contact of relay 507, winding of relay 602 and battery. Relay 602 operates relay 603 which locks over key 615 to conductor 1126 and lights lamp 607. Relay 602 also closes a circuit from battery through the winding of relay 414, outer right front contact of relay 602, conductor 632, left back contact of relay 413, right contact of relay 409 to grounded conductor 1126. Relay 414 locks over the inner right back contact of relay 413 to ground over conductor 531. Relay 602 disconnects relay 507 from the ring conductor and with relay 603 closes a circuit from ground on conductor 1126, lower normal contacts of keys 625 and 624, inner right front contact of relay 603, winding of relay 601, outer left front contact of relay 602, inner right front contact of relay 515 to conductor 1437 and thence to the ring conductor of the district junctor as previously traced. Coin battery on the ring conductor operates relay 601 which operates relay 604. Relay 604 locks over key 615 to conductor 1126 and lights lamp 608.

When conductor 1126 was grounded by switch 1000, the circuits of relay 409 were prepared. The operation of relay 507 opens the shunt around condenser 517 permitting relay 409 to operate. With relay 409 operated, a circuit is closed as previously traced for relay 413 which locks to grounded conductor 1126. Relay 413 opens the operating and locking circuits for relay 414. If relays 507 and 602 release before relay 409 in operating operates relay 413 and releases relay 414, a circuit is closed from battery through the winding of relay 415, right front contact of relay 414, inner right back contact of relay 403, conductor 421, back contact of relay 602, conductor 632, back contacts of relays 413 and 409 to grounded conductor 1126. Relay 415 lights lamp 519 and grounds conductor 1224 to prevent the advance of the test. If the pulse if of sufficient length, relay 602 in releasing closes a circuit from battery through the winding of relay 503, inner right front contact of relay 413, left back contact of relay 415, conductor 426, inner right front contact of relay 604, upper normal contact of key 617, outer left front contact of relay 603, to ground at the inner left back contact of relay 602.

Relay 508 advances the test switch 1000 to position 19 where the relays locked during the coin collect test are released. The release of the district junctor advances the test switch 1000 to position 20. The advance of test class switch 900 is the same as previously described.

When the overtime function is to be tested and key 416 is operated, the operation of relay 1113, grounding conductor 1125, closes a circuit from grounded conductor 1125, middle left back contact of relay 1111, outer left front contact of relay 1108, third right back contact of relay 1105, conductor 1128, inner left back contact of relay 505, conductor 529, inner right back contact of relay 326, outer left front contact of relay 325, conductor 338, left operated contact of key 416, conductor 425, winding of timer magnet 606 to battery. The operation of magnet 606 connects cams 612 and 613 to the shaft drive by motor 614. When cam 612 moves off normal it closes a circuit from ground on conductor 425, contact of cam 612, right back contact of relay 609 to the winding of relay 610 and battery. Relay 610 operates and locks through the winding of relay 609 and the inner right front contact of relay 610 to grounded conductor 1061, but relay 609 does not operate as long as the contact of cam 612 remains closed. Relay 610 also connects ground from conductor 1061 over its outer right front contact, conductor 1129 to the winding of relay 1107 and battery. Relay 1107, as in previous cases, simulates the response of the called subscriber thereby starting the timing period in the district junctor. This continues for 4½ minutes.

In the district junctor, the operation of relay 719 starts the timing operation as previously described.

At the end of 265 seconds the contact of cam 703 closes, providing a holding circuit for magnet 704 over cam 703, fourth left front contact of relay 726, to ground at the inner left front contact of relay 717 thus continuing the operation of the timer even though relay 721 may be released in the meantime. About 5 seconds later cam 702 closes its contact, completing a circuit from battery through resistance 705, contact of cam 702, right winding of relay 709 to ground.

Relay 709 summons the coin circuit which, in general, acts as before. However, since relays 730 and 717 are still operated, the operation of relay 709 closes a circuit from battery through the winding of relay 706, middle left front contact of relay 709, fourth left contact of relay 726, inner left front contact of relay 717 to ground. Relay 706 locks over its inner left contact and either over cam contact 703 and the fourth left contact of relay 726 or over the inner left contact of relay 721 and the second right back contact of relay 727 to ground at the outer left contact of relay 717.

When relay 727 operates to disconnect conductors 733 and 734 from relay 730 and connect them through to the coin supervisory circuit, it closes a holding circuit for relay 717 over the middle right back contact of relay 728, outer right front contact of relay 727 to ground at the inner left contact of relay 717.

If collection occurs before the end of the 4½ minute period, the operation of relay 507 operates relay 602 in a circuit from battery, through the winding of relay 602, left contact of relay 507, right contact of relay 410, to ground over conductor 1126. With relay 602 operated, a circuit is closed from battery through the winding of relay 511, outer left back contact of relay 505, inner right front contact of relay 502, left back contact of relay 609, conductor 640, right operated contact of key 416, outer right front contact of relay 325, right back contact of relay 326, conductor 337, second right back contact of relay 1106 to grounded conductor 1126. The operation of relay 511 indicates an overcharge, lighting lamp 523 and blocking the test.

At the end of 4½ minutes cam 612 opens its contact and if no charge has been received relay 609 operates. If now a charge is received, relay 507 operates as before in turn operating relay 502. With relay 602 operated, the connection previously traced between the ring conductor and the winding of relay 507 is opened and that circuit is extended over the outer left front contact of relay 602, winding of relay 601 to ground over conductor 1127. If the coin current is present relay 601 operates and in operating closes an obvious circuit for relay 604 which lights lamp 608. Relay 602 also closes an obvious circuit for relay 603. Relays 603 and 604 lock over their inner left front contacts, contact of key 615 to grounded conductor 1126. At the end of the pulse, relays 507, 601 and 602 release.

As before, the operation of relay 507 opens the shunt around condenser 517 for timing the pulse. If the pulse is satisfactory, relay 503 operates, advancing switch 1000 to position 13. The advance of switch 1000 releases the testing relays, which advance switch 1000 to position 14 from which it is immediately advanced to position 15 during this class of test.

Relays 610 and 609 are locked independent of relay 1113 and therefore do not release. When cam 612 recloses its contact at the end of 5 minutes, it closes a circuit from ground on conductor 425, contact of cam 612, right front contact of relay 609 to the winding of relay 611 and battery. If no pulse has been received when relay 611 operates, the circuit for advancing switch 1000 out of position 12 is opened and the operation of relay 611 closes a circuit from battery through the winding of relay 510, middle left front contact of relay 611, conductor 642, outer right back contact of relay 111, conductor 121, brush 1002 in position 12 to grounded conductor 1426. A branch of this circuit extends to lamp 1012 to indicate that the trouble was with the first charge.

When the coin supervisory circuit has completed coin collection, it releases relay 727 and connects ground to conductor 751 for a short interval, closing a circuit over the outer right back contact of relay 721, through the left winding of relay 723 and battery. Relay 723 operates in this circuit and locks over its inner right front contact and conductor 746 under the control of relay 719. The coin circuit then releases, in turn releasing relays 727 and 709. Relay 709 releases relay 707, but relay 706 remains locked over the contact of cam 703.

When the timer completes the timing cycle of 5 minutes the contacts of cam 701 reclose completing a circuit from ground through the right winding of relay 709, outer right front contact of relay 706, contact of cam 701, outer left front contact of relay 706 to battery through resistance 705. Relay 709 operates and connects ground to conductor 750 as above, causing the coin supervisory circuit to be connected to the district junctor circuit. When the coin circuit is connected with the district junctor relay 707 again operates. With relay 709 operated, the operating circuit of relay 706 is reclosed causing the timer to continue to function.

When the coin supervisory circuit has been reconnected, ground is connected to conductor 814, over the outer left back contact of relay 727, middle right front contact of relay 706 to ground at the inner right back contact of relay 721 as an indication to the coin supervisory circuit that overtime coin monitoring is required. The coin supervisory circuit then operates relay 727 momentarily which connects the incoming tip and ring conductors through to the coin supervisory circuit in order to test the line for the presence of the overtime coin deposit.

With switch 1000 in position 15, relay 1113 is reoperated, operating relay 515 which connects relay 507 to the tip and ring conductors to simulate the deposit of a coin to satisfy the coin circuit which again releases. The coin circuit in releasing removes ground from conductor 812, in turn releasing relay 709 provided timer cam 702 is not closed. Relay 709 releases relays 707, 706 and magnet 704 and the timer then restores to normal. With relays 723 and 719 operated, a circuit is provided to again operate relay 721 under the control of interrupter 715 and relays 713 and 714 and when relay 721 operates timing of the call is resumed.

In the test circuit the reclosure of cam contact 612 at the end of 5 minutes operates relay 611 over the right front contact of relay 609. Approximately 30 seconds later cam 613 closes its contact, closing a circuit from ground over the contact of cam 613, outer left front contact of relay 611, lower normal contact of key 617, conductor 1132, outer left back contact of relay 1106, conductor 1056 to brush 1004 in position 15 and thence to the winding of magnet 1005, thereby stepping switch 1000 to position 16 which is passed by. In position 17 relay 1021 operates and locks, advancing switch 1000 to position 18.

The operation of relay 1021 releases the district junctor and the advance of switch 1000 to position 18 prepares the test circuit to receive the coin collect current.

The district junctor functions in releasing as described hereinbefore.

*Free call*

The test of the coin district junctor for a free call is similar to that of the message rate district junctor. Relay 113 tells the marker that no charge is to be made and relay 515 connects relay 507 for receiving coin current. Relay 328 being operated, ground from brush 905 in position 3 extends over conductor 938, outer right front contact of relay 328 to the winding of relay 329 and battery. Relay 329 grounds conductor 335 to operate relay 505 which rearranges the connection of polarized relay 507 to the tip and ring conductors to render it responsive to coin refund current. Relay 329 also opens the outgoing tip conductor to prevent the operation of relay 719.

With relay 719 non-operated, relays 723 and 721 cannot operate. Ground is connected to conductor 152 over the inner right back contacts of relays 706 and 721 to cause the coin circuit to apply coin refund current which operates relay 507 which advances the test circuit as previously described.

*Operator test call*

For this class of call, relay 111 is operated to inform the marker of the type of call and relay 1101 is operated from switch 900. The operation of the test circuit is the same as for the non-coin district.

In the district junctor for an operator class call, the marker connects ground to conductor 739, operating relay 720 which locks temporarily over its outer left front contact and conductor 753 to ground supplied by the sender and later locks over its middle left front contact, fourth left front contact of relay 726 to ground at the inner left front contact of relay 717.

When the test circuit operates relay 1209, relay 719 is operated and closes a circuit from ground at its front contact, outer right front contact of relay 720 to battery through the winding of relay 728. Relay 726 is not released since the test circuit connects ground to conductor 741 completing a circuit over the left back contact of relay 729, third left back contact of relay 727 to the second and first right front contacts and winding of relay 726 to battery, holding that relay operated.

Relay 728 in operating disconnects relay 730 from the calling line, releasing that relay and relay 717. With relay 728 operated, the incoming tip conductor 733 is extended over the inner left back contact of relay 727, middle right front contact of relay 726, inner right front contact of relay 728, outer left back contact of relay 721, outer right back contact of relay 707, to the outgoing tip conductor 744 and the incoming ring conductor 734 is extended over the inner right back contact of relay 727, fourth right front contact of relay 726, outer left front contact of relay 728, to the outgoing ring conductor 745. When disconnection occurs, the test circuit disconnects ground from conductor 741 thus releasing relay 726 as well as the outgoing and incoming switches. When relay 726 releases it releases relay 728 and the circuit is restored to normal.

*Abandoned call test*

This test as applied to the coin district junctor differs from that already described chiefly in that the advance of switch 1000 from position 18 depends on the receipt of coin refund current from the district junctor. Relay 1024, which is operated from switch 900 to control this test, grounds conductor 335 at its second left front contact to operate relay 505 and prepare the charge testing circuit for coin refund current.

In the district junctor the sender connects battery to conductor 753 for an interval sufficient to insure the operation and locking of relay 709 after the originating marker releases. When the battery is connected to conductor 753, relay 709 will operate and relay 720 will release if it has been previously operated by the originating marker. Relay 709 operated, connects ground to conductor 750 to summon the coin supervisory circuit and also connects ground to conductor 743. When the coin supervisory circuit is connected to the district junctor circuit, ground on conductor 812 operates relay 707. Relay 707 locks under the control of relay 709 and disconnects ground from conductor 750. Relay 717 is released when the sender releases the sender link. With relay 717 released relay 728 is operated if relay 707 is still held operated by the coin supervisory circuit. Since relay 721 has not been operated, ground is connected to conductor 752 to indicate that the coin should be returned. After the coin circuit has completed its functions it connects ground to conductor 751, operating relay 723 for the purpose of releasing the connection with the calling line after which it releases relays 723 and 709. When relay 709 releases it releases relay 707 which in turn releases relay 728 and the circuit is restored to normal.

*Condenser test*

This test takes place as described for the non-coin district. No attempt is made to check for coin return, the test switch advancing from position 18 due to the connection of ground to conductor 1059 by relay 1105.

*Automatic release test*

This test is also similar to that performed on the non-coin district junctor. The test proceeds as for the local charge test permitting relay 719 to operate followed by relay 721. Relay 1033 opens the circuit of relay 719, but relay 730 is held operated. When relay 719 releases it closes a circuit from ground over its back contact, inner right front contact of relay 721, conductor 755 to interrupter 712. When interrupter 712 closes its contact it extends ground on conductor 755 to the winding of relay 710 which operates and locks directly to conductor 755. Approximately 2 minutes later interrupter 711 closes its contact completing a circuit from ground over the contact of interrupter 711, the left front contact of relay 710, left back contact of relay 723, over the second left front contact of relay 721 to the winding of relay 728 and battery. Relay 728 disconnects relay 730 from the calling line, causing relays 730 and 717 to release. The release of relay 717 operates relay 709 to bring about disconnection in the manner previously described.

*False automatic release*

This test is the same as that for the non-coin district junctor. With key 1034 operated, a circuit is also closed from battery through the winding of relay 413, conductor 422, normal contact of key 618, conductor 637, inner right front contact of relay 1033, inner right operated contact of key 1034, second right front contact of relay 1106, to ground at the middle right front contact of relay 1113 which is operated in position 15. Relay 413 serves to block the time measure for the coin pulse during this test. Relay 1033 and key 1034 substitute non-polar relay 600 for polarized relay 507 in the coin battery check circuit to provide an advance circuit if either collect or refund current is received.

The advance of switch 900 to normal and the advance to the next junctor are the same as previously described.

*Advance to next junctor group*

After all the district junctors connected to cross-bar switch 1700 have been tested, switches 1600 and 1610 are both resting in position 19. As above, the operation of relay 1415 advances switch 1600 to position 20, releasing the tenth hold magnet, that is magnet 1739, and relay 1408. With switch 1600 in position 20, switch 1610 is also advanced to position 20, releasing the select magnet 1729 and relay 1606. The release of relay 1606 as before advances switch 1600 to position 21. With switch 1610 in position 20 a circuit is closed from battery through the winding and over the back contact of magnet 1507 of the group switch 1500, brush 1501 in position 1, brush 1613 in position 20 to ground. The advance of switch 1500 from position 1 opens the circuit of multicontact relay 1750 thereby disconnecting the test circuit from cross-bar switch 1700. The release of relay 1750 in turn releases relay 1545. With relay 1545 normal and switch 1600 in position 21, a circuit is closed from ground over brush 1604 in position 21, right back contact of relay 1545, brush 1612 in position 20, back contact and winding of magnet 1616 to battery. Switch 1610 is advanced to position 21 in this circuit. When switch 1610 reaches position 21 a circuit is closed from ground over brush 1613 in position 21, brush 1501 in position 2, back contact and winding of magnet 1507 to battery. Switch 1500 is advanced to position 3 in this circuit, in which position another multicontact relay similar to relays 1750 and 1769 is operated, to connect the test circuit with another cross-bar switch and one hundred additional selectors. The operation of this multicontact relay again operates relay 1545 and advances switch 1610 to normal by closing a circuit from battery through the winding and back contact and magnet 1616, brush 1612 in position 21, right front contact of relay 1545 to ground over brush 1604 in position 21. Switch 1610 is then advanced to position 1 under the control of relay 1409 as described at the beginning of the tests. With switch 1610 in position 1, the first select magnet of the second cross-bar switch is operated to prepare the first level of cross-points and the operation of this select magnet operates relay 1606. Relay 1606 closes a circuit from ground at its right front contact, brush 1602 in position 21, back contact and winding of magnet 1605 and battery, advancing switch 1600 to normal, from which position it is advanced to position 1 under the control of the start relay 1409. With switch 1600 in position 1, the first hold magnet of the second cross-bar switch is operated, closing the corresponding cross-point in the prepared level and connecting a district junctor through to the test circuit. The operation of the hold magnet also operates relay 1408 to start the busy test on the new district junctor.

When all of the district junctor circuits in the office have been tested, switches 1600 and 1610 both advance from terminal 19 to 20 as previously described, which in turn causes switch 1500 to advance one terminal. The release of relay 1606 advances switch 1600 to position 21 while the release of relay 1545 advances switch 1610 to position 21. The terminals of brush 1502 following the last working terminal through terminal 42 are strapped together and connected to ground. Therefore, switch 1500 is immediately advanced to position 43. In this position the end-of-cycle lamp 1558 is lighted over brush 1506 as an indication that all district junctor circuits have been tested. In order to restore the test circuit to normal, start key 1422 is released and the return-to-normal key 1546 is operated. Release of the start key 1422 releases relays 1409 and 1421. With relay 1409 released and key 1546 operated, a circuit is closed from battery through the winding of relay 1548, key 1546, left back contact of relay 1545 to ground at the outer right back contact of relay 1409. Relay 1548 closes a circuit from ground over brush 1614 in position 21, middle right front contact of relay 1548, brushes 1603 and 1602 in position 21, back contact and winding of magnet 1605 to battery, thereby advancing switch 1600 to normal. With switch 1600 normal, a circuit is closed from ground over brush 1604 in its normal position, outer right front contact of relay 1548, brush 1612 in position 21, back contact and winding of magnet 1616 to battery, advancing switch 1610 to normal. With switch 1610 normal a circuit is closed from ground over brush 1613, brush 1502 in position 43, back contact and winding of magnet 1507 to battery, advancing switch 1500 to normal. When switch 1500 reaches its normal position it closes a circuit from ground over brush 1506, inner right front contact of relay 1548 to lamp 1547 and battery, indicating that the test circuit and the connector switches have been restored to normal. Key 1546 is now opened, permitting relay 1548 also to release.

*Transmission testing jacks*

Jacks 1200 and 1201 are used in testing the district junctors with a transmission measuring test set. The local call key 912 is operated in making this test and the test set is connected with the transmission measuring set by plugs in jacks 1200 and 1201. The test proceeds as for a similar call until the test line has been selected. When relay 1115 operates in position 4 of test switch 1000, relay 1212 is operated in a circuit from battery through the winding of relay 1212, closed auxiliary contact of jack 1200, conductor 1226, left back contacts of relays 1113 and 1107, conductor 1122, inner right back contact of relay 1410, conductor 1441, inner left front contact of relay 1115, inner left back contact of relay 1022 to grounded conductor 1426. With relay 1212 operated, the tip and ring conductors of the test line are connected to the tip and ring contacts of jack 1201 while the incoming tip and ring conductors of the district junctor are connected to the tip and ring conductors of jack 1200. After the completion of the transmission test, the operation of key 1403 will cause the test circuit to select the next circuit to be tested.

The test for the continued removal of battery from the busy test conductor 1827 or 732 is made at different times during the test of the junctor. After relay 1416 operates to start the testing and the district junctor functions, the busy test lead is extended over the inner right front contact of relay 1416, to conductor 222 which may be grounded over the front contacts of relay 1102 with switch 1000 in position 7, over the front contact of relay 1101 in position 13 of the test selector 1000, or over the front contact of relay 216 during dialing. Therefore, this conductor is tested throughout the dialing and at least once during each supervisory test.

*Test of message register control conductors*

As previously described, the message register control conductors from the district junctor are grounded on all classes of districts until the charge relay 1812 of the district junctor operates, except during the time that the decoder is making a test of these conductors for the presence of a message register. Relays 508 and 509 are used to check for the presence of this ground at all times as indicated previously. When a connection is first established with the district to be tested relays 508 and 509 are operated, relay 508 in a circuit from battery through the winding of relay 508, conductor 536, inner left back contact of relay 1032, conductor 417, upper winding of relay 410, resistance 412, left back contact of relay 401, conductor 1439, outer left front contact of relay 1416, conductor 1785, contact of relay 1750, contact of cross-point 1740, conductor 1833, inner left back contact of relay 1823, outer left back contact of relay 1805 to ground at the outer left back contact of relay 1812. The circuit of relay 509 extends over conductor 537, inner right back contact of relay 1032, conductor 418, right back contact of relay 401, conductor 1440, middle left front contact of relay 1416, conductor 1786, contact of relay 1750, contact of cross-point 1740, conductor 1834 to ground at the outer left back contact of relay 1823. Relay 508 locks to conductor 417 and relay 509 to conductor 418 and to their respective operating circuits independent of relay 1032. When relay 1032 operates, the operating circuits for these relays are opened and they remain locked to ground supplied by the district junctor. The disappearance of this ground except during decoder test or charge test would cause the corresponding relay to release and ground conductor 1224, operating relay 1410 and blocking the progress of the test. Relay 508 obtains ground for operating relay 1410 over conductor 333, inner right front contact of relay 1032, outer left back contact of relay 1021 to ground at the outer right front contact of relay 1023, while relay 509 obtains ground over conductor 528, front contact of any one of the class relays 318, 319, 320, 321 or 322 corresponding to districts serving two-party lines and conductor 333.

When the test switch 1000 advances to position 2 to start the dialing circuit, relay 1032 is operated, connecting ground over the middle right back contacts of relay 1115, over the second left and third right front contacts of relay 1032 to conductors 417 and 418, respectively, to hold relays 508 and 509 operated during the test by the marker. When switch 1000 reaches position 4, relay 1115 is operated as an indication that the call has progressed beyond trunk test. The local grounds are then removed from the windings of relays 508 and 509 which are again dependent upon the ground furnished by the district junctor.

Zone calls

Zone calls are handled the same as local calls except that, with the zone relay 100 operated, the circuit of overcharge relay 511 is opened so that multiple registration will not cause this relay to operate and block the test.

Subscriber disconnect

With key 616 operated, in connection with a local charge test on a non-coin district junctor, and with key 416 also operated, a test is made to determine that no overtime charge will be registered if the called subscriber has disconnected before the 5-minute initial period has elapsed. When the test switch 1000 is advanced to position 13 after completion of the initial charging test, a circuit is closed from battery through the winding of relay 402, conductor 423, outer upper alternate contact of key 616, conductor 633, left back contact of relay 504, right back contact of relay 414, outer right back contacts of relays 405 and 404, left back contact of relay 503, outer right back contact of relay 413, conductor 424, left back contacts of relays 604 and 603, conductor 634, inner right back contact of relay 111, conductor 121, brush 1002 in position 13, to grounded conductor 1426. Relay 402 locks over its inner right front contact, conductor 531, to ground over the seventh left back contact of relay 1022 and grounded conductor 1426. Relay 402 closes a circuit from ground at its outer right front contact, conductor 1131, middle right back contact of relay 1105, conductor 1054, to brush 1004 in position 13 advancing switch 1000 to position 14.

With relay 402 operated, the circuit from the front contact of relay 400 is transferred from the winding of relay 504 to the winding of relay 408. At the expiration of the 5-minute interval measured by timer 500, relay 400 operates, in turn operating relay 408. Relay 408 locks over its inner left front contact to ground over conductor 531 as above traced. It also connects ground to the upper winding of relay 410 so that a message register pulse, if received, will operate relay 410. The operation of relay 408 disconnects ground from the tip conductor of the test line, releasing relay 1811 in the district junctor circuit. The opening of this tip conductor simulates the disconnection of the called subscriber and, if the district performs satisfactorily, no charge should be received. When timer 500 opens its contact, releasing relay 400, a circuit is closed from battery through the winding of relay 503, outer left front contact of relay 408, right back contact of relay 400, right back contact of relay 1022 to ground at the outer left front contact of relay 1032. The operation of relay 503 advances test switch 1000 from position 15. If, however, the district junctor fails in this feature, and a second message register pulse is received, relay 410 operates, in turn operating relay 403. Relay 511 is operated over the inner left front contact of relay 402, outer left front contact of relay 405, left front contact of relay 403 to ground at the outer right back contact of relay 515.

With key 616 operated, the coin district junctors are tested for their ability to release without making an overtime charge if the calling subscriber disconnects at the end of the 5 minute talking interval. When testing coin district junctors with key 616 operated, the collection of the coin at the end of the 4½ minute interval proceeds as previously described, and test switch 1000 is advanced to position 13. In position 13, the release of the charge testing relays operates relay 402 as in the case of the non-coin district junctor, advancing switch 1000 to position 14. Switch 1000 advances to position 15 in the usual manner.

At the end of 5 minutes, relay 611 is operated as previously described. With key 616 operated, relay 611 closes a circuit from ground at its outer right front contact, outer lower contact of key 616, conductor 644, to the winding of relay 1021 and battery. Relay 1021 simulates release by the calling subscriber. At its inner right front contact, relay 611 connects ground over the inner upper closed contact of key 616, conductor 335, to the winding of relay 505 and battery, preparing the test circuit for receiving coin return current. At its outer left front contact relay 611 connects ground from the inner lower operated contact of key 616 over the lower normal contact of key 616 to conductor 1132 to advance the test switch from position 15. Thereafter the test proceeds as for a free call.

Test for holding circuit for district timer

On each registration received from the message register districts, a test is made to determine whether the holding circuit of the district timer is functioning properly. When the message register pulse is received, operating relay 410, relay 403 is operated as before described. The operation of relay 403 opens the tip conductor of the terminating test line, causing relay 1811 in the district junctor circuit to release. The operation of relay 404 also opens this same conductor and holds it open until the test switch 1000 advances from position 12 or 15. If the holding circuit of the timer is not effective, the message register pulse will be shortened below the length required by the pulse timing arrangement previously described and relay 415 will operate, blocking the test and lighting lamp 519. In the district junctor it will be observed that the control magnet 1817 of the timer locks over its front contact to the normally closed contact of cam 1820, over the locking circuit of relay 1822 independent of momentary switchhook flashing by the called party. The alternate contact of cam 1821 which times the message register pulse is closed only for a brief interval as the timer advances from its normal position. As the timer approaches the end of each interval, the contact of cam 1820 opens and the timer will advance to the succeeding timing cycle only if relays 1813, 1812 and 1822 are operated. This insures that charging for any interval will not occur unless both the calling and the called subscribers are still connected to the talking circuit at the start of each interval.

Keys 618, 619, 620, 621, 622 and 623 are used in connection with manual tests of the coin control circuits to impose test conditions on the relays of the coin control circuit, the tests themselves taking place as described in connection with the test of the district junctor.

*Return to normal*

If it is desired to return the test circuit to normal before completing an entire cycle of tests, start key 1422 is released and return-to-normal key 1546 is operated. Under these conditions, relay 1409 remains locked under the control of relay 1023 until the completion of a particular test which may have been in progress. When relay 1409 releases, the multicontact relay such as relay 1750 releases, in turn releasing relay 1545, thereby completing the circuit previously traced for relay 1548. Relay 1548 operated, connects ground over its middle right contact and the odd-numbered terminals of brush 1602 through terminal 19 and relay 1409 released connects ground to the even-numbered terminals of brush 1602 through terminal 18 thereby advancing switch 1600 to position 20. The release of the multicontact relay opens the circuit of relay 1606 which, with relay 1415 released, advanced switch 1600 to position 21 from which it is advanced by relay 1409 released. Relay 1548 connects ground to the odd-numbered terminals of brush 1612 through terminal 19 and relay 1409 released connects ground to the even-numbered terminals of brush 1612 through terminal 18 thereby advancing switch 1610 to position 20. Switch 1610 is advanced from position 20 to position 21 in a circuit from ground over the third right back contact of relay 1409, right back contact of relay 1545, brush 1612 in position 20, back contact and winding of magnet 1616 to battery. Similarly, relay 1548 at its outer left front contact connects ground to the odd-numbered terminals of brush 1501 and the odd-numbered working terminals of brush 1502 while relay 1409 at its inner right back contact connects ground to the even-numbered terminals of brush 1501 and the even-numbered working terminals of brush 1502, thereby advancing switch 1500 to position 43. As at the end of the complete test, ground over the normal terminal of brush 1604 and the outer right front contact of relay 1548 advances switch 1610 to normal. When switch 1610 reaches normal, ground over the normal contact of brush 1613 advances switch 1500 to normal. Thereupon lamp 1547 lights as an indication that all of the switches have been restored to normal.

With relay 1409 released, relay 931 is released, connecting ground over its outer contacts to the terminals of brush 902 thereby restoring the test class switch to normal. Relay 1409 also opens the locking circuits of relays 1549 and 1550 thereby restoring the busy and trouble timing switch to one of its normal positions.

*Particular circuit selection*

When it is desired to test a particular circuit or to start an automatic test at some point other than the fixed automatic starting point, the following circuit operation takes place. In order to reach any district junctor circuit it must be known in which cross-bar switch it lies. There is a position on the group switch 1500 corresponding to each cross-bar switch. The setting of switch 1500, therefore, determines which cross-bar switch is to be chosen for the start of a particular circuit test. By the operation of key 1544, ground at the outer right back contact of relay 1409 is connected over the contact of key 1544 to the winding of magnet 1507 and battery. On the release of this key the switch is advanced one terminal. Key 1544 is therefore manually operated and released until the desired terminal is reached. If it becomes necessary to step over a number of terminals, key 1543 may be used thereby including interrupter 1540 in the circuit. By holding key 1543 operated, switch 1500 will step under the control of interrupter 1540. Upon the release of key 1543 switch 1500 will stop. During the above procedure, group lamps 1520 to 1539 are lighted successively to indicate the position of switch 1500.

In order now to reach a particular district junctor, key 1555 or 1556 may be used to control magnet 1616 either step by step or under the control of interrupter 1540 to advance switch 1610 to the desired level. The arrival of switch 1610 in the proper position is indicated by the lighting of the lamps 1640 to 1649. Keys 1542 and 1541 function in a similar manner for switch 1600 during the selection of the desired district junctor, the progress of the switch being indicated by lamps 1620 to 1629. When the desired district junctor has been reached the start key 1422 is operated and the test circuit will start to function in the same manner as heretofore described, the only difference being that the advance of the switches does not take place on a particular circuit test.

*Automatic pass busy*

If it is desired to pass by the district junctor circuits which are busy rather than to wait for them to become idle, key 1429 is operated. When relay 1420 operates to connect the windings of relay 1417 to the busy test conductor, it also opens the circuit of relay 1421 which releases slowly if the district junctor is busy. When relay 1421 closes its back contact, a circuit is closed from ground at the right back contact of relay 1416, outer left front contact of relay 1420, middle left back contact of relay 1410, outer right back contact of relay 1421 to busy lamp 1425 and over the inner right back contact of relay 1421, inner left front contact of relay 1420, left back contact of relay 1411, key 1429, inner lower normal contact of key 1400 to the winding of pass-busy meter 1404 and battery. Meter 1404 operates, closing ground at its front contact to the left winding of relay 1412 over normal contacts of keys 1400 and 1403, thereby operating relay 1412. Relay 1412 locks in a circuit from battery through its left winding and outer left front contact under the control of relay 1408. It also extends this locking ground to the winding of relay 1415 which also operates. The operation of relay 1415 opens the circuit of relay 1420, in turn releasing meter 1404. With relay 1416 released and relay 1415 operated, a circuit is closed from ground at the right back contact of relay 1416, outer left back contact of relay 1420, right contact of start key 1422, right front contact of relay 1415, conductor 1633, brush 1602 in working position, back contact and winding of magnet 1605 to battery. Magnet 1605 operates in this circuit to advance switch 1600 one step. The advance of switch 1600 opens the circuit of relay 1408 thereby releasing relays 1412 and 1415 and closing a circuit from ground at the outer right front contact of relay 1409, left back contact of relay 1415, back contact of relay 1408, conductor 1634, intermediate contacts of brush 1602, back contact and winding of magnet 1605 to battery thereby advancing switch 1600 to the next working position where the next hold magnet is operated and the district junctor is tested.

Test circuit control advance key

In the event the test circuit stops in any position where actual testing is going on due to a failure of the district junctor circuit under test to properly function, key 1402 is provided to permit continuing the routine test either by advancing to the next district junctor or by starting a new test on the same district junctor if repeated tests are being made. With the repeat key 1400 normal, the operation of key 1402 closes a circuit from ground over its lower contact, inner upper normal contact of key 1400, upper normal contact of key 1403 to the left winding of relay 1412 and battery. Relay 1412 in operating causes the test circuit to advance to the next district junctor for test as heretofore described. The operation of key 1402 also opens the locking circuit of relay 931, causing the test class switch 900 to advance to normal. The release of key 1402 permits relay 1420 to operate to start the busy test on the next junctor.

When it is desired to make a repeated test of a particular district junctor circuit, key 1400 is operated either in the beginning or before the test selector 1000 reaches position 21. With key 1400 operated, when relay 934 is operated at the completion of a cycle of tests, a circuit is closed from battery through the register 1406, uppermost contact of key 1400, middle left front contact of relay 934, right back contact of relay 933, left contact of relay 935 to ground. Register 1406 closes an obvious circuit for relay 1413. With key 1400 operated, the control advance key 1402 operates relay 1413 in a circuit from ground at its lower contact, inner upper alternate contact of key 1400 to the winding of relay 1413 and battery. With relay 1413 operated, the locking circuit of relay 1419 is opened, and relay 1419 releases, in turn releasing relay 1416 and relay 1023. The release of relay 1023 restores that part of the circuit to normal. Relay 1413 also opens the holding circuit for relay 1410 if that relay operated to block the advance of the test. When key 1400 is operated, the locking circuit for relay 931 is closed from battery through resistance 932, winding and inner left front contact of relay 931, conductor 1442, outer left front contact of relay 1409, lowermost left contact of key 1400, conductor 1434 which receives ground over the operated district class relay of Fig. 3 to insure that the repeated test is of the same class.

Vacant cross-points

Where a cross-point is not connected to a district junctor, for example cross-point 1799, the operation of relay 1420 and the connection of the test circuit to the cross-point over relay 1750, for example, closes a circuit from battery through retardation coil 1424, third right contact of relay 1420, conductor 1784, contact 1703 of relay 1750, contact of cross-point 1799, which is cross-connected over armature 1706 of relay 1750 to conductor 1788, winding of relay 1411 to ground. Relay 1411 closes a circuit from ground at the right back contact of relay 1416, outer left front contact of relay 1420, middle left back contact of relay 1410, inner right back contact of relay 1421 which is not held operated due to absence of battery on conductor 1774, inner left front contact of relay 1420, front contact of relay 1411 to the right winding of relay 1412 and battery. Relay 1412 locks and operates relay 1415 as previously described. Relay 1415 causes relay 1420 to release which, in turn, causes switch 1600 to advance one terminal, opening the circuit of relay 1408 and permitting relay 1412 to release. The test circuit proceeds from this point to advance to the next cross-point as heretofore described.

When a group of twenty districts is not equipped, the corresponding armature of group relay 1750, which is connected to ground over pairs of terminals on brush 1614, is cross-connected to terminal 1789 which is connected directly to the armature of stepping magnet 1616. Switch 1616 will therefore step over the two positions in which these district junctors would have been tested. In addition, ground is disconnected from the contact springs of the select magnets belonging to the vacant levels.

Time alarm

Switch 1510 it used for busy or trouble timing. When relay 1409 operates, it connects ground over its third right front contact, left back contacts of relays 1415 and 1413, inner lower normal contact of key 1403, conductor 1444, normal contact of the message register timer 501, normal contact of coin timer 606, conductor 636, right back contact of relay 1419, brush 1513 in its busy normal position, winding of relay 1550 to battery. Relay 1550 locks to this energizing circuit independent of brush 1513. Switch 1510 serves both for busy and trouble timing. If on the preceding call, switch 1510 was serving trouble timing and therefore relay 1549 was operated, upon the release of relay 1419 in connection with that particular call, relay 1549 is released, closing a circuit from ground over its left back contact, strapped terminals 17 to 21, brush 1511, back contact and winding of magnet 1515 to battery, advancing switch 1510 to the busy normal position where the circuit for relay 1550 is immediately closed. Relay 1550 closes a circuit from ground through interrupter 1551, outer right front contact of relay 1550, normal and first eight strapped terminals of brush 1512, to the winding of magnet 1515 and battery. Switch 1510 therefore advances to position 9 under the control of interrupter 1551 which is arranged to close its contact for 1 second and then hold it open for 29 seconds. If the district junctor circuit remains busy long enough, switch 1510 advances to position 9 where it closes a circuit for lamp 1552 which extends from battery through lamp 1552, brush 1513 in position 9, to ground over the locking circuit of relay 1550. In parallel with lamp 1552 a circuit is extended over the inner right front contact of relay 1550 to conductor 1557 to operate an alarm. This alarm signal may be silenced by operating key 1403 which opens the locking circuit of relay 1550. The alarm may also be silenced by operating the automatic pass-busy key 1429, which causes the advance of the test switch to the next district junctor and during this period operates relay 1415 to open the locking circuit of relay 1550. Furthermore, the alarm may be silenced by the operation of key 1402 to restart the test and which also causes the operation of relay 1415 and the release of relay 1550. With relay 1550 released, ground is connected over the left back contact of relay 1550, terminals 1 to 15 of brush 1511, back contact and winding of magnet 1515 to battery, in which circuit switch 1510 is advanced to position 16. If the district junctor circuit becomes idle before switch 1510 reaches position 9, the operation of relay 1419 to start the the test releases relay 1550 which in this case also advances switch 1510 to position 16. With relay 1419 operated and switch 1510 in position 16, a circuit extends as previously traced to conductor 636 and over the outer right front contact of relay 1419, brush 1514 in position 16, winding of relay 1549 and battery. Relay 1549 also locks to its operating circuit independent of brush 1514, connects interrupter 1551 over its inner right front contact, terminals 16, 17 and 18 of brush 1512 to the winding of magnet 1515 and battery, so that switch 1510 is advanced under the control of interrupter 1551 to position 19. If the switch reaches this position before the termination of the test, the locking ground for relay 1549 is extended over brush 1514, outer right front contact of relay 1549, to the normal contact and winding of relay 1410 and battery.

Relay 1410 serves to block the progress of the call. Relay 1410 closes a circuit from ground at its outer right front contact to lamp 1552 and closes a circuit from ground at the third right front contact of relay 1409, lowermost normal contact of key 1403, inner right front contact of relay 1410 to conductor 1557 to operate the alarm. Relay 1410 when operated, closes a locking circuit for itself over its inner left front contact and over the inner left front contact of relay 1419, or if operated during the busy test over the second left front contact of relay 1420, left back contacts of relays 1413 and 1415, to ground at the third right front contact of relay 1409. At its outer right back contact relay 1410 opens the circuit of magnet 1005 thereby preventing the advance of the test selector 1000, even if the trouble may clear itself without manual assistance. The alarm may be silenced and relay 1549 released by operating key 1403. However, relay 1410 does not release by this action. The release of relay 1549 restores the switch 1510 to normal position.

In order to advance test selector 1000, key 1402 is operated thereby operating relay 1413 or 1412, according as repeat key 1400 is operated or not. The operation of either of these relays opens the locking circuit of relays 1410 and 1419 causing these relays to release, in turn releasing relay 1416. Relays 1412 or 1413 cannot release until the advance key 1402 is restored. With relay 1419 released, relay 1023 is released and a circuit is closed from battery through the winding and over the back contact of magnet 1005, conductor 1041, brush 1003 in position 1 to 20, outer left back contact of relay 1023 to ground. Switch 1000 is advanced to position 21, from which position it is advanced to normal by the closure of a circuit from battery through the winding and over the back contact of magnet 1005, conductor 1401, outer right back contact of relay 1410, conductor 1435, brush 1004 in position 21, to ground at the middle left back contact of relay 1032. Where the test progresses satisfactorily, switch 1000 will have reached normal before the trouble timing switch 1510 reaches the trouble position. Under this condition relay 1549 is released after the release of relay 1419 on every call and returns the switch to normal as above described.

*Stopping automatic test circuit*

If it is desired at any time to stop the automatic advancement of the test circuit, start key 1422 is released. The release of key 1422 opens the operating circuit for relays 1421 and 1409 and opens the circuit for the stepping magnet 1605 by which switch 1600 is advanced from working positions. Under this condition the test which was under progress will be completed before the test circuit releases. Under the completion of the particular test, relay 1409 releases which, in turn, causes relays 1408, 1606, 1545, 1421, 1419, 1416 and 1549 to release. Switches 1500, 1600 and 1610, however, will remain in the positions where they were when key 1422 was released. If it is not desired to wait for the completion of the test in progress at the time, after key 1422 has been released, key 1402 may be operated which will disconnect the test circuit immediately by operating relays 1412 and 1413 and thereby releasing relays 1419 and 1416. If it is desired to start the test again, key 1422 is reoperated and the test circuit will start to test on the last district tested. If it is not desired to test the last district over again, key 1542 may be operated and released once to advance to the next district junctor circuit before key 1422 is reoperated. If it is not desired to start testing from this point again, the return-to-normal key 1546 is operated to restore the switches 1500, 1600 and 1610 to normal.

What is claimed is:

1. In a telephone system, district junctors, coin control circuits associable with said junctors, a test circuit for said district junctors, means for connecting said test circuit with one of said district junctors, means for causing association of a coin control circuit with said district junctors, means in said test circuit for simulating a call from a coin line, and means for testing the polarity and duration of the impulse of current supplied by the coin control circuit in response thereto.

2. In a telephone system, district junctors, coin control circuits associable with said junctors, a test circuit for said district junctors, means for connecting said test circuit with one of said district junctors, means for causing association of a coin control circuit with said district junctors, means in said test circuit for simulating a call from a coin line, means for testing the polarity and duration of the impulse of current supplied by the coin control circuit in response thereto, means to vary the operation of said district junctor to cause said coin control circuit to apply either coin collect current or coin refund current, and means under the control of said varying means to render said polarity testing means responsive to the proper coin current.

3. In a telephone system, district junctors, coin control circuits associable with said junctors, a test circuit for said district junctors, means for connecting said test circuit with one of said district junctors, means for causing association of a coin control circuit with said district junctors, means in said test circuit for simulating a call from a coin line, means for testing the polarity and duration of the impulse of current supplied by the coin control circuit in response thereto, a test class switch, means in different positions of said switch to control the operation of said district junctor to cause said coin control circuit to apply either coin collect current or coin refund current, and means under the control of said test class switch to render said polarity testing means responsive to the proper coin current.

4. In a telephone system, a district junctor, a test circuit for said junctor, means to connect said test circuit with said junctor, means in said junctor responsive to said connection to establish a busy condition on said junctor, means in said test circuit responsive to said busy condition, and means controlled by said responsive means for preventing the advance of said test circuit if said condition is removed prematurely.

5. In a telephone system, a district junctor, means in said junctor for charging for calls, a conductor over which current is applied by said charging means, means in said district junctor for connecting ground to said conductor when not in use, a test circuit for said district junctor, means for connecting said test circuit with said district junctor, and means in said test circuit for preventing the advance of said test circuit if said ground is improperly removed from said conductor.

6. In a telephone system, a district junctor, means in said junctor for charging for calls, a conductor over which current is applied by said charging means, means in said district junctor for connecting ground to said conductor when not in use, a test circuit for said district junctor, means for connecting said test circuit with said district junctor, a relay in said test circuit, means to hold said relay operated over said conductor, and means under the control of said relay for preventing the advance of said test circuit if said ground is improperly removed from said conductor.

7. In a telephone system, a district junctor, means in said junctor for charging for calls, a conductor over which current is applied by said charging means, means to test said conductor before applying said current, means in said district junctor for connecting ground to said conductor when not in use for testing or charging, a test circuit for said district junctor, means for connecting said test circuit with said district junctor, a relay in said test circuit, means to hold said relay operated over said conductor, means under the control of said relay for preventing the advance of said test circuit if said ground is improperly removed from said conductor, and auxiliary means for holding said relay while said conductor is tested in said junctor.

8. In a telephone system, a district junctor serving two-party lines, means in said junctor for charging for calls, two conductors over which current is applied by said charging means in accordance with the party served, means in said district junctor for connecting ground to said conductors when not in use, a test circuit for said district junctor, means for connecting said test circuit with said district junctor, and means in said test circuit for preventing the advance of said test circuit if said ground is improperly removed from either of said conductors.

9. In a telephone system, a district junctor serving two-party lines, means in said junctor for charging for calls, two conductors over which current is applied by said charging means in accordance with the party served, means in said district junctor for connecting ground to said conductors when not in use, a test circuit for said district junctor, means for connecting said test circuit with said district junctor, two relays in said test circuit, means to hold said relays operated over said conductors, and means under the control of said relays for preventing the advance of said test circuit if said ground is improperly removed from either of said conductors.

10. In a telephone system, district junctors serving one-party lines and district junctors serving two-party lines, means in said junctors for charging for calls, said one-party junctors having one conductor over which current is applied by said charging means and said two-party junctors having two conductors to which charging current is applied in accordance with the party served, means in said junctors for connecting ground to said conductors when said conductors are not in use, a test circuit for said district junctors, means for connecting said test circuit with said district junctors one at a time, two relays in said test circuit, means to hold said relays operated over said conductors, means under the control of said relays for preventing the advance of said test circuit if said ground is improperly removed from said conductor, and means to render one of said relays ineffective when testing one-party district junctors.

11. In a telephone system, district junctors, a test circuit for said junctors, means for associating said test circuit with one of said district junctors comprising a plurality of cross-bar switches, each switch having a plurality of select magnets and a plurality of hold magnets, a step-by-step switch for selecting a particular cross-bar switch, a second step-by-step switch for selecting a particular select magnet, and a third step-by-step switch for selecting a particular hold magnet, means for advancing said step-by-step switches in succession, and means responsive to each selecting operation for initiating the advance of the next step-by-step switch and of the test circuit.

12. In a telephone system, district junctors, a test circuit for said junctors, means for associating said test circuit with one of said district junctors comprising a plurality of cross-bar switches, each switch having a plurality of select magnets and a plurality of hold magnets, step-by-step switches for controlling the selection of a district junctor for test by selecting one of said cross-bar switches and a select magnet and a hold magnet thereof, the working positions of said step-by-step switches being separated by neutral positions, means responsive to the completion of a testing operation to advance a switch to a neutral position, means responsive to said advance to release a corresponding switch element, means responsive to the release of said element to advance said switch to the next working position, and means operated in said working position to start a testing operation.

13. In a telephone system, district junctors serving coin lines, means associated with said coin district junctors for applying charging current to the talking conductors of said junctors, district junctors serving message register lines, means associated with said message register district junctors for applying charging current to the message register conductors of said junctors, a test circuit, means for connecting said test circuit with said district junctors, means in said test circuit for timing the duration of the charging current applied by district junctors, and means to vary the operation of said timing means in accordance with the type of district junctor under test.

14. In a telephone system, district junctors serving coin lines, means associated with said coin district junctors for applying charging current to the talking conductors of said junctors, district junctors serving message register lines, means associated with said message register district junctors for applying charging current to the message register conductors of said junctors, a test circuit, means for connecting said test circuit with said district junctors, means in said test circuit for receiving charging current from coin district junctors, other means for receiving charging current from message register district junctors, timing means, and means to associate either of said charge receiving means with said timing means for testing the duration of said charging current in accordance with the type of district junctor under test.

15. In a telephone system, district junctors serving coin lines, means associated with said coin district junctors for applying charging current to the talking conductors of said junctors, district junctors serving message register lines, means associated with said message register district junctors for applying charging current to the message register conductors of said junctors, a test circuit, means for connecting said test circuit with one of said district junctors, means in said test circuit for receiving charging current from coin district junctors, other means for receiving charging current from message register district junctors, timing means, means to associate either of said charge receiving means with said timing means for testing the duration of said charging current, and means to vary the operation of said timing means in accordance with the type of district junctor under test.

JOHN B. RETALLACK.